(12) United States Patent
Fan et al.

(10) Patent No.: US 11,796,794 B2
(45) Date of Patent: Oct. 24, 2023

(54) MULTI-OBJECTIVE, ROBUST CONSTRAINTS ENFORCED GLOBAL TOPOLOGY OPTIMIZER FOR OPTICAL DEVICES

(71) Applicant: The Board of Trustees of the Leland Stanford Junior University, Stanford, CA (US)

(72) Inventors: Jonathan Fan, Los Altos, CA (US); Jiaqi Jiang, Stanford, CA (US); Mingkun Chen, Cupertino, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 169 days.

(21) Appl. No.: 17/317,624

(22) Filed: May 11, 2021

(65) Prior Publication Data

US 2021/0356738 A1    Nov. 18, 2021

Related U.S. Application Data

(60) Provisional application No. 63/023,766, filed on May 12, 2020.

(51) Int. Cl.
| | |
|---|---|
| *G02B 27/00* | (2006.01) |
| *G06N 3/04* | (2023.01) |
| *G01M 11/02* | (2006.01) |

(52) U.S. Cl.
CPC ..... *G02B 27/0012* (2013.01); *G01M 11/0228* (2013.01); *G01M 11/0242* (2013.01); *G06N 3/04* (2013.01)

(58) Field of Classification Search
CPC .............. G02B 6/2935; G02B 6/29355; G02B 27/0012; G02F 1/21; G06F 2119/02;
(Continued)

(56) References Cited

U.S. PATENT DOCUMENTS

| | | |
|---|---|---|
| 5,051,938 A | 9/1991 | Hyduke |
| 6,374,385 B1 | 4/2002 | Hamalainen et al. |

(Continued)

FOREIGN PATENT DOCUMENTS

| | | |
|---|---|---|
| EP | 0502943 B1 | 2/1999 |
| EP | 1255157 A1 | 11/2002 |

(Continued)

OTHER PUBLICATIONS

Sell et al., "Ultra-High-Efficiency Anomalous Refraction with Dielectric Metasurfaces", ACS Photonics, vol. 5, No. 6, Mar. 15, 2018, pp. 2402-2407, https://doi.org/10.1021/acsphotonics.8b00183.
(Continued)

*Primary Examiner* — Isiaka O Akanbi
(74) *Attorney, Agent, or Firm* — KPPB LLP

(57) ABSTRACT

A method for optimization of photonic devices is disclosed. The method includes receiving a set of unconstrained latent variables; mapping the set of unconstrained latent variables to a constrained space to generate a constrained device; calculating the permittivity across each element of the constrained device; determining a permittivity-constrained width gradient based at least partially on the permittivity across each element; and optimizing the set of unconstrained latent variables by at least partially using the permittivity-constrained width gradient.

18 Claims, 46 Drawing Sheets
(41 of 46 Drawing Sheet(s) Filed in Color)

(58) Field of Classification Search
CPC ........ G06F 30/27; G06N 3/045; G06N 3/048; G06N 3/047
USPC ........................................................ 356/128
See application file for complete search history.

(56) References Cited

U.S. PATENT DOCUMENTS

| | | | |
|---|---|---|---|
| 10,268,232 | B2 | 4/2019 | Harris et al. |
| 11,460,753 | B2 | 10/2022 | Hughes et al. |
| 2004/0107172 | A1 | 6/2004 | Wang |
| 2007/0047966 | A1 | 3/2007 | Hironishi et al. |
| 2008/0050124 | A1 | 2/2008 | Tsuchida et al. |
| 2008/0154815 | A1 | 6/2008 | Martinez |
| 2010/0039649 | A1* | 2/2010 | Digonnet ............ G01D 5/3538 356/460 |
| 2011/0188800 | A1 | 8/2011 | Futami |
| 2012/0070151 | A1 | 3/2012 | Shin et al. |
| 2013/0294782 | A1 | 11/2013 | Liboiron-ladouceur et al. |
| 2015/0078754 | A1 | 3/2015 | Aflatouni et al. |
| 2015/0261058 | A1 | 9/2015 | Silverstone et al. |
| 2016/0162798 | A1 | 6/2016 | Marandi et al. |
| 2017/0148433 | A1 | 5/2017 | Catanzaro et al. |
| 2017/0200526 | A1* | 7/2017 | Guo ................ H01L 31/022491 |
| 2017/0351293 | A1 | 12/2017 | Carolan et al. |
| 2017/0351952 | A1 | 12/2017 | Zhang et al. |
| 2018/0045953 | A1* | 2/2018 | Fan ......................... G02B 1/002 |
| 2018/0089558 | A1 | 3/2018 | Wittenberg et al. |
| 2020/0144437 | A1* | 5/2020 | Gosciniak ............. H01L 31/108 |
| 2020/0257751 | A1* | 8/2020 | Engheta ................... G01B 9/02 |
| 2020/0401920 | A1* | 12/2020 | Killoran ................. G06N 20/00 |
| 2021/0116781 | A1 | 4/2021 | Hughes et al. |
| 2021/0192342 | A1 | 6/2021 | Hughes et al. |
| 2021/0390396 | A1 | 12/2021 | Fan et al. |

FOREIGN PATENT DOCUMENTS

| | | |
|---|---|---|
| EP | 3791229 A1 | 3/2021 |
| EP | 3791332 A1 | 3/2021 |
| JP | 2021523410 A | 9/2021 |
| JP | 2021523461 A | 9/2021 |
| KR | 10-2021-0005273 A | 1/2021 |
| KR | 10-2021-0006962 A | 1/2021 |
| WO | 2017210550 A1 | 12/2017 |
| WO | 2017214729 A1 | 12/2017 |
| WO | 2019217835 A1 | 11/2019 |
| WO | 2019217836 A1 | 11/2019 |
| WO | 2020014490 A1 | 1/2020 |

OTHER PUBLICATIONS

Sell et al., "Visible Light Metasurfaces Based on Single-Crystal Silicon", ACS Photonics, vol. 3, No. 10, Sep. 27, 2016, pp. 1919-1925, DOI: 10.1021/acsphotonics.6b00436.

Shen et al., "An integrated-nanophotonics polarization beamsplitter with 2.4×2.4 μm2 footprint", Nature Photonics, vol. 9, Jun. 2015, first published May 18, 2015, pp. 378-382, https://doi.org/10.1038/nphoton.2015.80.

Shen et al., "Deep learning with coherent nanophotonic circuits", Nature Photon, 2017, vol. 11, pp. 441-446, https://doi.org/10.1038/nphoton.2017.93.

Shi et al., "Optimization of Multilayer Optical Films with a Memetic Algorithm and Mixed Integer Programming", ACS Photonics, ACS Photonics, Just Accepted Manuscript, published online Dec. 15, 2017, 24 pgs., https://doi.org/10.1021/acsphotonics.7b01136.

Silva et al., "Performing Mathematical Operations with Metamaterials", Science, vol. 343, No. 6167, Jan. 10, 2014, pp. 160-163, DOI: 10.1126/science.1242818.

Singh et al., "Ultrasensitive terahertz sensing with high-Q Fano resonances in metasurfaces", Applied Physics Letters, vol. 105, No. 17, Oct. 27, 2014, pp. 171101-1-171101-5, DOI: 10.1063/1.4895595.

Srivastava et al., "Dropout: A Simple Way to Prevent Neural Networks from Overfitting", Journal of Machine Learning Research, vol. 15, No. 1, Jun. 1, 2014, pp. 1929-1958.

Su et al., "Fully-automated optimization of grating couplers", Optics Express, vol. 26, No. 4, Feb. 4, 2018, pp. 4023-4034, https://doi.org/10.1364/OE.26.004023.

Tait et al., "Demonstration of a silicon photonic neural network", 2016 IEEE Photonics Society Summer Topical Meeting Series (SUM), 2016, pp. 72-73.

Tittl et al., "Imaging-based molecular barcoding with pixelated dielectric metasurfaces", Science, vol. 360, No. 6393, Jun. 8, 2018, 5 pgs.

Vercruysse et al., "Analytical level set fabrication constraints for inverse design", Scientific Reports, vol. 9, No. 8999, 2019, published online Jun. 21, 2019, 7 pgs., https://doi.org/10.1038/s41598-019-45026-0.

Vieu et al., "Electron beam lithography: resolution limits and applications", Applied Surface Science, Sep. 1, 2000, vol. 164, Issues 1-4, pp. 111-117, https://doi.org/10.1016/S0169-4332(00)00352-4.

Wang et al., "Robust design of topology-optimized metasurfaces", Optical Materials Express, vol. 9, No. 2, Feb. 1, 2019, published online Jan. 10, 2019, pp. 469-482, https://doi.org/10.1364/OME.9.000469.

Wang et al., "Robust topology optimization of photonic crystal waveguides with tailored dispersion properties", Journal of the Optical Society of America B, vol. 28, No. 3, Mar. 2011, pp. 387-397, DOI:10.1364/JOSAB.28.000387.

Wen et al., "Robust Freeform Metasurface Design Based on Progressively Growing Generative Networks", ACS Photonics, vol. 7, No. 8, Jun. 19, 2020, pp. 2098-2104. https://doi.org/10.1021/acsphotonics.0c00539.

Williamson et al., "Reprogrammable Electro-Optic Nonlinear Activation Functions for Optical Neural Networks", IEEE Journal of Selected Topics in Quantum Electronics, vol. 26, No. 1, Jan.-Feb. 2020, pp. 1-12, DOI:10.1109/.JSTQE.2019.2930455.

Williamson et al., "Tunable Nonlinear Activation Functions for Optical Neural Networks", 2020 Conference on Lasers and Electro-Optics (CLEO), 2020, pp. 1-2.

Wills, "Doing Neural Nets with Photons", The Optical Society, Jun. 19, 2017, 4 pgs.

Woods et al., "Photonic Neural Networks", Optical Computing, vol. 8, Apr. 2012, pp. 257-259.

Wu et al., "Beam Synthesis with Low-Bit Reflective Coding Metamaterial Antenna: Theoretical and Experimental Results", International Journal of Antennas and Propagation, vol. 2018, Article ID 5058789, Mar. 26, 2018, 10 pages, https://doi.org/10.1155/2018/5058789.

Xiao et al., "Diffractive Spectral-Splitting Optical Element Designed by Adjoint-Based Electromagnetic Optimization and Fabricated by Femtosecond 3D Direct Laser Writing", ACS Photonics, vol. 3, No. 5, Apr. 25, 2016, pp. 886-894, DOI: 10.1021/acsphotonics.6b00066.

Yablonovitch et al., "Optical projection lithography at half the Rayleigh resolution limit by two photon exposure", Opt. Eng., 1998, Materials, fundamentalsand Applications Topical Meeting, 1998, pp. 126-128.

Yang et al., "Analysis of material selection on dielectric metasurface performance", Optics Express, vol. 25, No. 20, Oct. 2, 2017, pp. 23899-23909, https://doi.org/10.1364/OE.25.023899.

Yang et al., "Freeform Metagratings Based on Complex Light Scattering Dynamics for Extreme, High Efficiency Beam Steering", Annalen der Physik, vol. 530, No. 1, Jan. 2018, 1700302,19 pgs.

Yang et al., "Topology-optimized metasurfaces: impact of initial geometric layout", Optics Letters, vol. 42, No. 16, Aug. 15, 2017, pp. 3161-3164, https://doi.org/10.1364/OE.25.023899.

Yeom et al., "Maximum achievable aspect ratio in deep reactive ion etching of silicon due to aspect ratio dependent transport and the microloading effect", Journal of Vacuum Science and Technology, vol. 23, Nov./Dec. 2005, pp. 2319-2329, DOI:10.1116/1.2101678.

Yin et al., "Ultra Wideband Polarization-Selective Conversions of Electromagnetic Waves by Metasurface under Large-Range Incident Angles", Scientific Reports, vol. 5, No. 12476, Jul. 23, 2015, 10 pgs., DOI:10.1038/srep 12476.

(56) References Cited

OTHER PUBLICATIONS

Yu et al., "Flat optics with designer metasurfaces", Nature Materials, vol. 13, Feb. 2014, published online Jan. 23, 2014, pp. 139-150, DOI:10.1038/NMAT3839.
Yu et al., "Light Propagation with Phase Discontinuities: Generalized Laws of Reflection and Refraction", Science, vol. 334, No. 6054, Oct. 21, 2011, pp. 333-337, doi: 10.1126/science.1210713.
Zheng et al., "Metasurface holograms reaching 80% efficiency", Advanced Online Publication, published online Feb. 23, 2015, pp. 1-6, DOI:10.1038/NNANO.2015.2.
Zhou et al., "Minimum length scale in topology optimization by geometric constraints", Computer Methods in Applied Mechanics and Engineering, vol. 293, Aug. 15, 2015, pp. 266-282, DOI:10.1016/j.cma.2015.05.003.
Gulrajani et al., "Improved Training of Wasserstein GANs", in Advances in Neural Information Processing Systems, 2017, 11 pgs.
Harris, "Programmable nanophotonics for quantum information processing and artificial intelligence", Thesis, Massachusetts Institute of Technology, 2017, 126 pgs.
Hermans et al, "Towards trainable media: Using waves for neural network-style training", arXiv preprint arXiv:1510.03776, Sep. 30, 2015, 20 pgs.
Huang et al., "Implementation of on-chip multi-channel focusing wavelength demultiplexer with regularized digital metamaterials", Nanophotonics, vol. 9. No. 1, 2020, published online Nov. 19, 2019, pp. 159-166, https://doi.org/10.1515/nanoph-2019-0368.
Hughes et al, "Training of photonic neural networks through in situ backpropagation and gradient measurement", Optica, vol. 5, No. 7, Jul. 2018, first published Jul. 19, 2018, pp. 864-871, https://doi.org/10.1364/OPTICA.5.000864.
Hughes et al., "Adjoint Method and Inverse Design for Nonlinear Nanophotonic Devices", ACS Photonics, vol. 5, No. 12, Dec. 3, 2018, pp. 4781-4787, DOI: 10.1021/acsphotonics.8b01522.
Hughes et al., "Forward-Mode Differentiation of Maxwell's Equations", ACS Photonics, Oct. 21, 2019, vol. 6, pp. 3010-3016, DOI: 10.1021/acsphotonics.9b01238.
Hugonin et al., "Reticolo software for grating analysis", Institut d'Optique, Orsay, France. (2005), 57 pgs.
Inampudi et al., "Neural network based design of metagratings", Applied Physics Letters, vol. 112, Jun. 13, 2018, pp. 241102-1-241102-5, https://doi.org/10.1063/1.5033327.
Jafar-Zanjani et al., "Adaptive Genetic Algorithm for Optical Metasurfaces Design", Scientific Reports, vol. 8, No. 11040, Jul. 23, 2018, 16 pgs., DOI:10.1038/s41598-018-29275-z.
Jensen et al., "Topology optimization for nano-photonics", Laser & Photonics Reviews, vol. 5, No. 2, Mar. 2011, pp. 308-321, DOI: 10.1002/lpor.201000014.
Jensen et al., "Topology optimization of photonic crystal structures: a high-bandwidth low-loss T-junction waveguide", Journal of the Optical Society of America B, vol. 22, Issue 6, Jun. 2005, pp. 1191-1198, https://doi.org/10.1364/JOSAB.22.001191.
Jiang et al., "Data-driven metasurface discovery", arXiv:1811.12436, Nov. 29, 2018, 14 pgs.
Jiang et al., "Deep neural networks for the evaluation and design of photonic devices", arXiv:2007.00084v1 [eess.IV] Jun. 30, 2020, 29 pgs.
Jiang et al., "Free-Form Diffractive Metagrating Design Based on Generative Adversarial Networks", ACS Nano, Jul. 17, 2019, vol. 13, 7 pgs., DOI: 10.1021/acsnano.9b02371.
Jiang et al., "Global Optimization of Dielectric Metasurfaces Using a Physics-Driven Neural Network", Nano Letters, Jul. 11, 2019, vol. 19, No. 8, pp. 5366-5372, https://doi.org/10.1021/acs.nanolett.9b01857.
Jiang et al., "Simulator-based training of generative neural networks for the inverse design of metasurfaces", Nanophotonics, vol. 9, Issue 5, 2019, published online Nov. 19, 2019, 11 pgs., DOI: https://doi.org/10.1515/nanoph-2019-0330.
Joy, "The spatial resolution limit of electron lithography", Microelectronic Engineering, vol. 1, Issue 2, Oct. 1983, pp. 103-119, https://doi.org/10.1016/0167-9317(83)90024-2.
Khoram et al., "Controlling the minimal feature sizes in adjoint optimization of nanophotonic devices using b-spline surfaces", Optics Express, vol. 28, Issue 5, 2020, pp. 7060-7069, https://doi.org/10.1364/OE.384438.
Khorasaninejad et al., "Metalenses at Visible Wavelengths: Diffraction-Limited Focusing and Subwavelength Resolution Imaging", Science, vol. 352, No. 6290, Jun. 3, 2016, pp. 1190-1194, doi: 10.1126/science.aaf6644.
Khorasaninejad et al., "Metalenses: Versatile multifunctional photonic components", Science, vol. 358, Dec. 1, 2017, 10 pgs., DOI: 10.1126/science.aam8100.
Kildishev et al., "Planar Photonics with Metasurfaces", Science, vol. 339, No. 6125, Mar. 15, 2013, pp. 1232009-1-1232009-6, DOI: 10.1126.science.1232009.
Kim et al., "Highly tunable refractive index visible-light metasurface from block copolymer self-assembly", Nature Communications, vol. 7, No. 12911, Sep. 29, 2016, 9 pgs., DOI: 10.1038/ncomms12911.
Kingma et al., "Adam: A Method for Stochastic Optimization", arXiv.org, Retrieved from: https://arxiv.org/abs/1412.6980v1 [cs.LG], Dec. 22, 2014, 9 pgs.
Kuznetsov et al., "Optically resonant dielectric nanostructures", Science, vol. 354, No. 6314, Nov. 18, 2016, 11 pgs., DOI: 10.1126/science.aag2472.
Lalau-Keraly et al., "Adjoint shape optimization applied to electromagnetic design", Optics Express, vol. 21, No. 18, Sep. 9, 2013, first published Sep. 6, 2013, pp. 21693-21701, DOI: 10.1364/OE.21.021693.
Leelar et al., "Learning with Deep Photonic Neural Networks", 2017 IEEE Workshop on Recent Advances in Photonics (WRAP), 2017, pp. 1-7.
Liebmann et al., "TCAD development for lithography resolution enhancement", IBM Journal of Research and Development, vol. 45, No. 5, Sep. 2001, pp. 651-665, DOI: 10.1147/rd.455.0651.
Lin et al., "Topology-Optimized Multilayered Metaoptics", arXiv:1706.06715v1 [physics.optics] Jun. 21, 2017, 9 pgs.
Liu et al., "Training Deep Neural Networks for the Inverse Design of Nanophotonic Structures", ACS Photonics, vol. 5, No. 4, Feb. 25, 2018, pp. 1365-1369.
Ma et al., "Deep-Learning-Enabled On-Demand Design of Chiral Metamaterials", ACS Nano, vol. 12, No. 6, Jun. 1, 2018, pp. 6326-6334, DOI: 10.1021/acsnano.8b03569.
Malkiel et al., "Plasmonic nanostructure design and characterization via Deep Learning", Light: Science & Applications, vol. 7, No. 60, Sep. 5, 2018, 8 pgs., DOI 10.1038/s41377-018-0060-7.
Marty et al., "Advanced etching of silicon based on deep reactive ion etching for silicon high aspect ratio microstructures and three-dimensional micro- and nanostructures", Microelectronics Journal, vol. 36, Issue 7, Jul. 2005, pp. 673-677, https://doi.org/10.1016/j.mejo.2005.04.039.
Minkov et al., "Inverse Design of Photonic Crystals through Automatic Differentiation", ACS Photonics, vol. 7, 2020, pp. 1729-1741, https://dx.doi.org/10.1021/acsphotonics.0c00327.
Mirza et al., "Conditional Generative Adversarial Nets", arXiv:1411.1784v1 [cs.LG], Nov. 6, 2014, 7 pgs.
Molesky et al., "Outlook for inverse design in nanophotonics", Nature Photonics, vol. 12, Oct. 26, 2018, pp. 659-670, DOI: https://doi.org/10.1038/s41566-018-0246-9.
Ng et al., "Ultra-High Aspect Ratio Trenches in a Single crystal silicon with epatixial gap tuning", 2013 Transducers and Eurosensors XXVII: The 17th International Conference on Solid-State Sensors, pp. 182-185.
Paszke et al., "PyTorch: An Imperative Style, High-Performance Deep Learning Library", 33rd Conference on Neural Information Processing Systems (NeurIPS 2019), Vancouver, Canada, 12 pgs.
Pendry et al., "Transformation Optics and Subwavelength Control of Light", Science, vol. 337, No. 6094, Aug. 3, 2012, pp. 549-552, DOI: 10.1126/science.1220600.
Peurifoy et al., "Nanophotonic particle simulation and inverse design using artificial neural networks", Science Advances, vol. 4, No. 6, Jun. 1, 2018, eaar4206, 8 pgs., DOI: 10.1126/sciadv.aar4206.

(56) References Cited

OTHER PUBLICATIONS

Phan et al., "High-efficiency, large-area, topology-optimized metasurfaces", Light: Science & Applications, vol. 8, No. 48, 2019, published online May 29, 2019, pp. 1-9, https://doi.org/10.1038/s41377-019-0159-5.
Piggott et al., "Inverse design and demonstration of a compact and broadband on-chip wavelength demultiplexer", Nature Photonics, Advance Online Publication May 11, 2015, 5 pgs., DOI: 10.1038/NPHOTON.2015.69.
Rogers et al., "A super-oscillatory lens optical microscope for subwavelength imaging", Nature Materials, vol. 11, Advance Online Publication Mar. 25, 2012, pp. 432-435, DOI: 10.1038/nmat3280.
Schevenels et al., "Robust topology optimization accounting for spatially varying manufacturing errors", Computer Methods in Applied Mechanics and Engineering, vol. 200, Issues 49-52, Dec. 1, 2011, published online Aug. 26, 2011, pp. 3613-3627, https://doi.org/10.1016/j.cma.2011.08.006.
Sell et al., "Large-Angle, Multifunctional Metagratings Based on Freeform Multimode Geometries", Nano Letters, vol. 17, No. 6, May 1, 2017, pp. 3752-3757, DOI: 10.1021/acs.nanolett.7b01082.
Sell et al., "Periodic Dielectric Metasurfaces with High-Efficiency, Multiwavelength Functionalities", Advanced Optical Materials, vol. 5, No. 23, Dec. 1, 2017, 7 pgs., DOI: 10.1002/adom.201700645.
Extended European Search Report for European Application No. 19799849.5, Search completed Nov. 30, 2021, dated Dec. 16, 2021, 11 Pgs.
Extended European Search Report for European Application No. 19799982.4, Search completed Jan. 18, 2022, dated Feb. 3, 2022, 12 Pgs.
International Preliminary Report on Patentability for International Application PCT/US2019/041414, Report dated Jan. 12, 2021, dated Jan. 21, 2021, 6 Pgs.
International Preliminary Report on Patentability for International Application PCT/US2019/031747, Report dated Nov. 10, 2020, dated Nov. 19, 2020, 4 Pgs.
International Preliminary Report on Patentability for International Application PCT/US2019/031748, Report dated Nov. 10, 2020, dated Nov. 19, 2020, 4 Pgs.
International Search Report and Written Opinion for International Application No. PCT/US2019/031747, Search completed Jul. 10, 2019, dated Jul. 24, 2019, 9 Pgs.
International Search Report and Written Opinion for International Application No. PCT/US2019/031748, Search completed Jul. 12, 2019, dated Jul. 29, 2019, 9 Pgs.
International Search Report and Written Opinion for International Application No. PCT/US2019/041414, Search completed Sep. 13, 2019, dated Oct. 8, 2019, 15 Pgs.
Arjovsky et al., "Wasserstein Generative Adversarial Networks", Proceedings of the 34th International Conference on Machine Learning, 2017, pp. 214-223.
Arbabi et al., "Dielectric Metasurfaces for Complete Control of Phase and Polarization with Subwavelength Spatial Resolution and High Transmission", Nature Nanotechnology, Aug. 31, 2015, 27 pgs., doi:10.1038/nnano.2015.186.
Arbabi et al., "Full-Stokes Imaging Polarimetry Using Dielectric Metasurfaces", ACS Photonics, vol. 5, No. 8, Jul. 16, 2018, pp. 3132-3140.
Azunre et al., "Guaranteed global optimization of thin-film optical systems", New Journal of Physics, Jul. 24, 2019, vol. 21, 073050, 19 pgs., https://doi.org/10.1088/1367-2630-ab2e19.
Bayati et al., "Inverse Designed Metalenses with Extended Depth of Focus", ACS Photonics, vol. 7, Mar. 25, 2020, pp. 873-878, https://dx.doi.org/10.1021/acsphotonics.9b01703.
Campbell et al., "Review of numerical optimization techniques for meta-device design [Invited]", Optical Materials Express, vol. 9, No. 4, Apr. 2019, pp. 1842-1863, https://doi.org/10.1364/OME.9.001842.
Carolan et al., "Universal linear optics", Science, vol. 349, Issue 6249, Aug. 14, 2015, pp. 711-716, DOI: 10.1126/science.aab3642.

Chen et al., "Geometric phase coded metasurface: from polarization dependent directive electromagnetic wave scattering to diffusion-like scattering", Scientific Reports, vol. 6, 35968, Oct. 24, 2016, 10 pgs., DOI: 10.1038/srep35968.
Chung et al., "High-NA achromatic metalenses by inverse design", Optics Express, vol. 28, No. 5, Mar. 2, 2020, first published Feb. 24, 2020, pp. 6945-6965, DOI: https://doi.org/10.1364/OE.385440.
Colburn et al., "Metasurface optics for full-color computational imaging", Science Advances, vol. 4, No. 2, Feb. 9, 2018, 7 pgs., DOI: 10.1126/sciadv.aar2114.
De Marinis et al., "Photonic Neural Networks: A Survey", in IEEE Access, vol. 7, Dec. 2, 2019, date of current version Dec. 19, 2019, pp. 175827-175841, DOI: 10.1109/ACCESS.2019.2957245.
Decker et al., "High-Efficiency Dielectric Huygens' Surfaces", Advanced Optical Materials, vol. 3, No. 6, Jun. 2015, pp. 813-820.
Devlin et al., "Arbitrary spin-to-orbital angular momentum conversion of light", Science, vol. 358, Nov. 17, 2017, published online Nov. 2, 2017, pp. 896-901, DOI: 10.1126/science.aao5392.
Egorov et al., "Genetically optimized all-dielectric metasurfaces", Optics Express, vol. 25, No. 3, Feb. 7, 2017, first published Feb. 1, 2017, pp. 2583-2593, https://doi.org/10.1364/OE.25.002583.
Estakhri et al., "Inverse-designed metastructures that solve equations", Science, vol. 363, No. 6433, Mar. 22, 2019, pp. 1333-1338, DOI: 10.1126/science.aaw2498.
Fan, "Freeform metasurface design based on topology optimization", MRS Bulletin, vol. 45, Mar. 2020, pp. 196-201, doi:10.1557/mrs.2020.62.
Filipovich et al., "Training Deep Neural Networks in Situ with Neuromorphic Photonics", 2020 IEEE Photonics Conference (IPC), 2020, pp. 1-2.
Frei et al., "Geometry projection method for optimizing photonic nanostructures", Optics Letters, vol. 32, Issue 1, Jan. 1, 2007, first published Dec. 13, 2006, pp. 77-79, https://doi.org/10.1364/OL.32.000077.
Goodfellow et al., "Deep Learning", The MIT Press, Cambridge, Massachusetts, 2016, 26 pgs.
Goodfellow et al., "Generative Adversarial Nets", 2014. Generative adversarial nets. In Advances in Neural Information Processing Systems, pp. 2672-2680, arXiv:1406.2661v1 [stat.ML] Jun. 10, 2014.
Green, "Self-consistent optical parameters of intrinsic silicon at 300 K including temperature coefficients", Solar Energy Materials and Solar Cells, vol. 92, No. 11, Nov. 2008, pp. 1305-1310, doi:10.1016/j.solmat.2008.05.0009.
"Artificial Intelligence Funding Trends", Retrieved from https://venturescanner.medium.com/artificial-intelligence-funding-trends-q3-2017-4e8a9b80fe53, published online on Sep. 2, 2017, 3 pages.
Abu-Mostafa et al., "Optical Neural Computers", Scientific American, vol. 256, No. 3, Mar. 1987, pp. 88-95, https://www.jstor.org/stable/24979343.
Ahmed et al., "A 100 GB/s transimpedance amplifier in 65 nm CMOS technology for optical communications", 2014 IEEE International Symposium on Circuits and Systems (ICAS), Jun. 1-5, 2014, pp. 1885-1888, DOI: 10.1109/ISCAS.2014.6865527.
Alibart et al., "Pattern classification by memristive crossbar circuits using ex situ and in situ training", Nature Communications, vol. 4, Issue 2072, Jun. 25, 2013, 7 pgs., https://doi.org/10.1038/ncomms3072.
Annoni et al., "Unscrambling light—automatically undoing strong mixing between modes", Light: Science & Applications, vol. 6, e17110, Dec. 1, 2017, article preview online Jun. 30, 2017, 10 pgs., doi:10.1038/lsa.2017.110.
Bao et al., "Monolayer Graphene as a Saturable Absorber in a Mode-Locked Laser", Nano Research, vol. 4, No. 3, 2011, pp. 297-307, DOI 10.1007/s12274-010-0082-9.
Brunner et al., "Parallel photonic information processing at gigabyte per second data rates using transient states", Nature Communications, vol. 4, Jan. 15, 2013, pp. 1364-1367, https://doi.org/10.1038/ncomms2368.
Capmany et al., "Microwave photonics combines two worlds", Nature Photonics, vol. 1, Jun. 1, 2007, pp. 319-330, DOI:10.1038/nphoton.2007.89.

(56) References Cited

OTHER PUBLICATIONS

Clements et al., "Optimal design for universal multiport interferometers", Optica vol. 3, Issue 12, Dec. 2016, pp. 1460-1465, https://doi.org/10.1364/OPTICA.3.001460.
Crespi et al., "Anderson localization of entangled photons in an integrated quantum walk", Nature Photonics, vol. 7, Apr. 2013, first published Mar. 3, 2013, pp. 322-328, https://doi.org/10.1038/nphoton.2013.26.
Crespi et al., "Integrated multimode interferometers with arbitrary designs for photonic boson sampling", Nature Photonics, vol. 7, Jul. 2013, first published May 26, 2013, pp. 545-549, https://doi.org/10.1038/nphoton.2013.112.
Depuy et al., "59-dBOmega 68-GHz Variable Gain-Bandwidth Differential Linear TIA in 0.7-μm InP DHBT for 400-GB/s Optical Communication Systems", 2015 IEEE Compound Semiconductor Integrated Circuit Symposium (CSICS), Oct. 11-14, 2015, 4 pgs., DOI: 10.1109/CSICS.2015.7314463.
Duport et al., "Fully analogue photonic reservoir computer", Scientific Reports, 2016, vol. 6, No. 22381, 12 pgs., DOI: 10.1038/srep22381.
Georgieva et al., "Feasible adjoint sensitivity technique for EM design optimization", IEEE Transactions on Microwave Theory and Techniques, vol. 50, Issue 12, Dec. 2002, pp. 2751-2758, DOI: 10.1109/TMTT.2002.805131.
Ghelfi et al., "A fully photonics-based coherent radar system", Nature, vol. 507, Mar. 20, 2014, first published Mar. 19, 2014, pp. 341-345, https://doi.org/10.1038/nature13078.
Graves et al., "Hybrid computing using a neural network with dynamic external memory", Nature, vol. 538, Oct. 27, 2016, first published Oct. 12, 2016, pp. 471-476, https://doi.org/10.1038/nature20101.
Graves et al., "Neural Turing Machines", arXiv:1410.5401v2 [cs.NE], Dec. 10, 10, 2014, 26 pgs.
Harris et al., "Quantum transport simulations in a programmable nanophotonic processor", Nature Photonics, vol. 11, 2017, pp. 447-452, https://doi.org/10.1038/nphoton.2017.95.
Hermans et al., "Photonic Delay Systems as Machine Learning Implementation", Journal of Machine Learning Research, vol. 16, 2015, pp. 2081-2097.
Hermans et al., "Trainable hardware for dynamical computing using error backpropagation through physical media", Nature Communications, vol. 6, Issue. 6729, Mar. 24, 2015, 8 pgs., DOI: https://doi.org/10.1038/ncomms7729.
Hughes et al., "Method for computationally efficient design of dielectric laser accelerator structures", Optics Express, vol. 25, Issue 13, Jun. 26, 2017, pp. 15414-15427, https://doi.org/10.1364/OE.25.015414.
Hughes et al., "On-Chip Laser Power Delivery System for Dielectric Laser Accelerators", arXiv:1709.04441v1 [physics.optics], Sep. 13, 2017, 14 pgs.
Jiang et al., "Low-dimensional nanomaterial saturable absorbers for ultrashort-pulsed waveguide lasers", Optical Materials Express, vol. 8, Issue 10, Oct. 1, 2018, first published Sep. 10, 2018, pp. 3055-3071, https://doi.org/10.1364/OME.8.003055.
Jiao et al., "A 70 dBohm 2.3 GHz low noise transimpedance amplifier", 2013 IEEE Third International Conference on Consumer Electronics ¿ Berlin (ICCE-Berlin), Sep. 9-11, 2013, pp. 322-325, DOI: 10.1109/ICCE-Berlin.2013.6697985.
Jutamulia et al., "Overview of hybrid optical neural networks", Science, vol. 28, 1996, pp. 59-72.
Koos et al., "Nonlinear silicon-on-insulator waveguides for all-optical signal processing", Optics Express, vol. 15, No. 10, May 14, 2007, first published May 1, 2007, pp. 5976-5990, doi: 10.1364/oe.15.005976.
Larger et al., "Photonic information processing beyond Turing: an optoelectronic implementation of reservoir computing", Optic Express, vol. 20, No. 3, Jan. 30, 2012 first published Jan. 27, 2012, pp. 3241-3249.
Lecun et al., "Deep learning", Nature, May 27, 2015, vol. 521, No. 7553, pp. 436-444, doi: 10.1038/nature14539.
Lecun et al., "Gradient-Based Learning Applied to Document Recognition", Proceedings of the IEEE, Nov. 1998, vol. 86, No. 11, pp. 2278-2324.
Li et al., "Reconfigurable controlled two-qubit operation on a quantum photonic chip", New Journal of Physics, vol. 13, 115009, Nov. 2011, 8 pgs., doi:10.1088/1367-2630/13/11/11/115009.
Marpaung et al., "Integrated microwave photonics", Laser & Photonic Reviews, vol. 7, Issue 4, Jul. 2013, pp. 506-538, first published Jan. 16, 2013, https://doi.org/10.1002/lpor.201200032.
Merolla et al., "A million spiking-neuron integrated circuit with a scalable communication network and interface", Science, Aug. 8, 2014, vol. 345, No. 6197, pp. 668-673, doi: 10.1126/science.1254642.
Metcalf et al., "Multiphoton quantum interference in a multiport integrated photonic device", Nature Communications, vol. 1, No. 1356, Jan. 15, 2013, pp. 1-7, DOI:10.1038/ncomms2349.
Miller, "Arbitrary and Reconfigurable Optics—New Opportunities for Integrated Photonics", Frontiers in Optics 2017, OSA Technical Digest (online) (Optica Publishing Group, 2017), paper FTu4A.1, 1 pg., https://doi.org/10.1364/FIO.2017.FTu4A.1.
Miller, "Attojoule Optoelectronics for Low-Energy Information Processing and Communications", Journal of Lightwave Technology, vol. 35, Issue 3, Feb. 1, 2017, pp. 346-396, DOI: 10.1109/JLT.2017.2647779.
Miller, "Perfect optics with imperfect components", Optica, vol. 2, Issue 8, 2015, pp. 747-750, https://doi.org/10.1364/OPTICA.2.000747.
Miller, "Self-aligning universal beam coupler", Optics Express vol. 21, Issue 5, Mar. 11, 2013, first published Mar. 6, 2013, pp. 6360-6370, https://doi.org/10.1364/OE.21.006360.
Miller, "Setting up meshes of interferometers—reversed local light interference method", Optics Express, vol. 25, Issue 23, Nov. 13, 2017, pp. 29233-29248, https://doi.org/10.1364/OE.25.029233.
Miller et al., "Self-configuring universal linear optical component [Invited]", Photonics Research. vol. 1, Issue 1, Jun. 2013, pp. 1-15, https://doi.org/10.1364/PRJ.1.000001.
Nozaki et al., "Amplifier-Free Bias-Free Receiver Based on Low-Capacitance Nanophotodetector", IEEE Journal of Selected Topics in Quantum Electronics, vol. 24, Issue: 2, Mar.-Apr. 2018, first published Dec. 20, 2017, 11 pgs., DOI: 10.1109/JSTQE.2017.2777105.
Pai et al., "Matrix optimization on universal unitary photonic devices", arXiv:1808.00458v3 [eess.SP] May 22, 2019, 18 pgs.
Pallipuram et al., "A comparative study of GPU programming models and architectures using neural networks", The Journal of Supercomputing, vol. 61, Sep. 2012, first published May 31, 2011, pp. 673-718, https://doi.org/10.1007/s11227-011-0631-3.
Park et al., "Monolayer graphene saturable absorbers with strongly enhanced evanescent-field interaction for ultrafast fiber laser mode-locking", Optics Express vol. 23, Issue 15, Jul. 27, 2015, first published Jul. 22, 2015, pp. 19806-19812, https://doi.org/10.1364/OE.23.019806.
Peng et al., "Neuromorphic Photonic Integrated Circuits", IEEE Journal of Selected Topics in Quantum Electronics , vol. 24, Issue: 6, Nov.-Dec. 2018, 15 pgs., DOI: 10.1109/JSTQE.2018.2840448.
Prezioso et al., "Training and operation of an integrated neuromorphic network based on metal-oxide memristors", Nature, vol. 521, May 7, 2015, pp. 61-64, includes supplementary info, doi: 10.1038/nature14441.
Psaltis et al., "Adaptive optical networks using photorefractive crystals", Applied Optics, vol. 27, No. 9. May 1, 2019, pp. 1752-1759.
Psaltis et al., "Holography in artificial neural networks", Nature, vol. 343, Jan. 25, 1990, pp. 325-330.
Reck et al., "Experimental realization of any discrete unitary operator", Physical Review Letters, vol. 73, No. 1, Jul. 1, 1994, pp. 58-61, doi:10.1103/PhysRevLett.73.58.
Rosenbluth et al., "A high performance photonic pulse processing device", Optics Express, vol. 17, Issue 25, Dec. 2009, first published Nov. 30, 2009, pp. 22767-22772, https://doi.org/10.1364/OE.17.022767.

(56) References Cited

OTHER PUBLICATIONS

Settaluri et al., "First Principles Optimization of Opto-Electronic Communication Links", IEEE Transactions on Circuits and Systems-I: Regular Papers, vol. 64, No. 5, May 2017, pp. 1270-1283, 10.1109/TCSI.2016.2633942.

Shadbolt et al., "Generating, manipulating and measuring entanglement and mixture with a reconfigurable photonic circuit", Nature Photonics, vol. 6, Jan. 2012, first published Dec. 11, 2011, pp. 45-49. https://doi.org/10.1038/nphoton.2011.283.

Shainline et al., "Superconducting Optoelectronic Circuits for Neuromorphic Computing", Phys. Rev. Applied vol. 7, No. 3, 034013, Mar. 23, 2017, 35 pgs., arXiv:1610.00053 [cs.NE] Nov. 10, 2016.

Shastri et al., "Spike processing with a graphene excitable laser", Scientific Reports, vol. 6, No. 19126, 2016, 12 pages.

Shin et al., "Choice of the perfectly matched layer boundary condition for frequency-domain Maxwell's equations solvers", Journal of Computational Physics, vol. 231, Issue 8, Apr. 20, 2012, pp. 3406-3431, https://doi.org/10.1016/j.jcp.2012.01.013.

Spring et al., "Boson Sampling on a Photonic Chip", Science, vol. 339, Issue 6121, Dec. 20, 2012, pp. 798-801, DOI: 10.1126/science.1231692.

Sun et al., "Large-scale nanophotonic phased array", Nature, vol. 493, Jan. 10, 2013, first published Jan. 9, 2013, pp. 195-199, https://doi.org/10.1038/nature11727.

Tait et al., "A silicon photonic modulator neuron", arXiv:1812.11898v1 [physics.app-ph] Dec. 9, 2018, 16 pgs.

Tait et al., "Broadcast and Weight: An Integrated Network for Scalable Photonic Spike Processing", Journal of Lightwave Technology, vol. 32, 2014, pp. 4029-4041.

Tait et al., "Neuromorphic photonic networks using silicon photonic weight banks", Scientific Reports, vol. 7, No. 7430, Aug. 7, 2017, 19 pgs., DOI:10.1038/s41598-017-07754-z.

Tait et al., "The Dream: An Integrated Photonic Thresholder", Journal of Lightwave Technology IEEE USA, vol. 31. No. 8, Apr. 15, 2013, pp. 1263-1272, DOI: 10.1109/JLT.2013.2246544.

Trabelsi et al., "Deep Complex Networks", arXiv:1705.09792v4 [cs.NE] Feb. 25, 2018, 19 pgs.

Trentin, "Networks with trainable amplitude of activation functions", Neural Networks, vol. 14, Issues 4-5, May 2001, pp. 471-493, https://doi.org/10.1016/S0893-6080(01)00028-4.

Vandoorne et al., "Experimental demonstration of reservoir computing on a silicon photonics chip", Nature Communications, vol. 5, No. 3541, Mar. 24, 2014, 6 pgs., https://doi.org/10.1038/ncomms4541.

Veronis et al., "Method for sensitivity analysis of photonic crystal devices", Optics Letters vol. 29, Issue 19, Oct. 1, 2004, pp. 2288-2290, https://doi.org/10.1364/OL.29.002288.

Wagner et al., "Multilayer optical learning networks", Applied Optics, vol. 26, Issue 23, 1987, pp. 5061-5076, https://doi.org/10.1364/AO.26.005061.

Wu et al., "High aspect ratio silicon etch: A review", Journal of Applied Physics, 2010, vol. 108, pp. 051101-1-051101-20.https://doi.org/10.1063/1.3474652.

Yu et al., "A low-noise high-gain transimpedance amplifier with high dynamic range in 0.13im CMOS", IEEE International Symposium on Radio-Frequency Integration Technology (RFIT), Nov. 2012, pp. 37-40, DOI:10.1109/RFIT.2012.6401606.

Yu et al., "Design of AGC amplifier for CMOS Image Sensor", 2012 IEEE International Symposium on Radio-Frequency Integration Technology (RFIT), Nov. 21-23, 2012, pp. 34-36, DOI: 10.1109/RFIT.2012.6401605.

\* cited by examiner

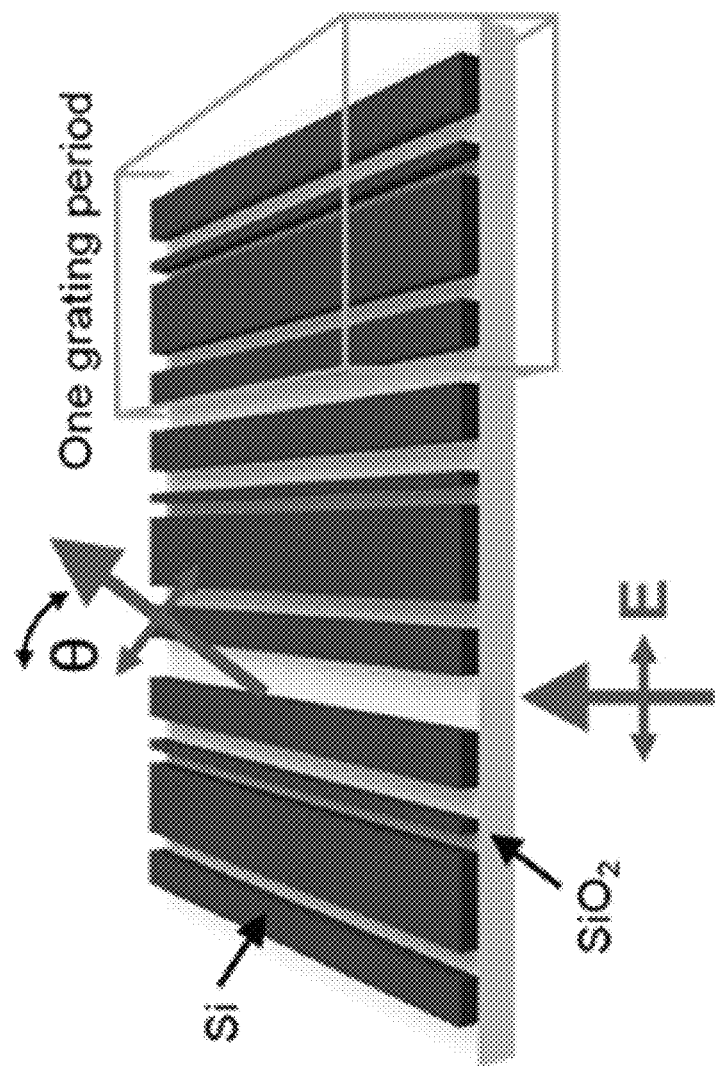

Permittivity profile
$\varepsilon(x)$ $w_1, w_2, \ldots, w_i, \ldots, w_{M-1}, w_M$ Period, $L$

Algorithm 1: Reparameterization for local optimization

Parameters: $q_{min}$, minimum feature size constraint. $M$, number of features. $\alpha$, step size. $\beta_1$ and $\beta_2$, momentum coefficients used in Adam.

initialization;
Sample $u \sim \mathcal{U}^M \cdot (-1, 1)$;
while $i < $ *Total iterations* do

$\quad T = T_0$, set binarization level;
$\quad w = f(u, q_{min})$, width vector in feature space;
$\quad \varepsilon = h(x, w^{(k)}, T)$, permittivity profile in device space;
$\quad \text{FH} = \text{FH}(\varepsilon)$, $\mathbf{g}_\varepsilon = \frac{d \text{FH}}{d\varepsilon}$ $\leftarrow$ forward and adjoint simulations;
$\quad \mathbf{g}_w \leftarrow \mathbf{g}_\varepsilon \cdot \frac{d\varepsilon}{dw} \cdot \frac{dw}{du}$;
$\quad u \leftarrow u + \alpha \cdot \text{Adam}(u, \mathbf{g}_u)$;

end
$w^* = f(u)$, $\varepsilon^* = h(x, w^*, T)$, $\text{FH}^* = \text{FH}(\varepsilon^*)$

Fig. 5

Algorithm 2: Fixed-topology reparameterized GLOnets

Parameters: $w_{min}$, minimum feature size constraint, $M$, number of features, $K$, batch size, $\sigma$, loss function coefficient, $\alpha$, step size, $\beta_1$ and $\beta_2$, momentum coefficients used in Adam.

initialization;

while $i < $ *Total iterations* do
$\quad T := T_0$, set binarization level;
$\quad$ Sample $\{z^{(k)}\}_{k=1}^{K} \sim \mathcal{U}^{M-1}(-1,1)$;
$\quad \{u^{(k)}\} = G_\phi(\{z^{(k)}\})\}_{k=1}^{K}$, latent vectors;
$\quad \{u^{(k)}\} = f(u^{(k)}, w_{min})\}_{k=1}^{K}$, width vectors;
$\quad \{\varepsilon^{(k)}\} = h(x, u^{(k)}, T)\}_{k=1}^{K}$, permittivity profiles;
$\quad \{\text{Eff}^{(k)}\}_{k=1}^{K}, \{g_\varepsilon^{(k)}\}_{k=1}^{K} \leftarrow$ forward and adjoint simulations;
$\quad g_\phi \leftarrow \nabla_\phi L(\{\varepsilon^{(k)}\}_{k=1}^{K}, \{g_\varepsilon^{(k)}\}_{k=1}^{K}, \{\text{Eff}^{(k)}\}_{k=1}^{K})$;
$\quad \phi \leftarrow \phi - \alpha \cdot \text{Adam}(\phi, g_\phi)$;

end

$u^* \leftarrow \text{argmax}_{u \in \{u^{(1)}, u^{(2)}, ..., u^{(K)}\}} \text{Eff}(u)$,
$w^* = f(u^*)$, $\varepsilon^* = h(x, w^*, T)$, $\text{Eff}^* = \text{Eff}(\varepsilon^*)$

Fig. 9B

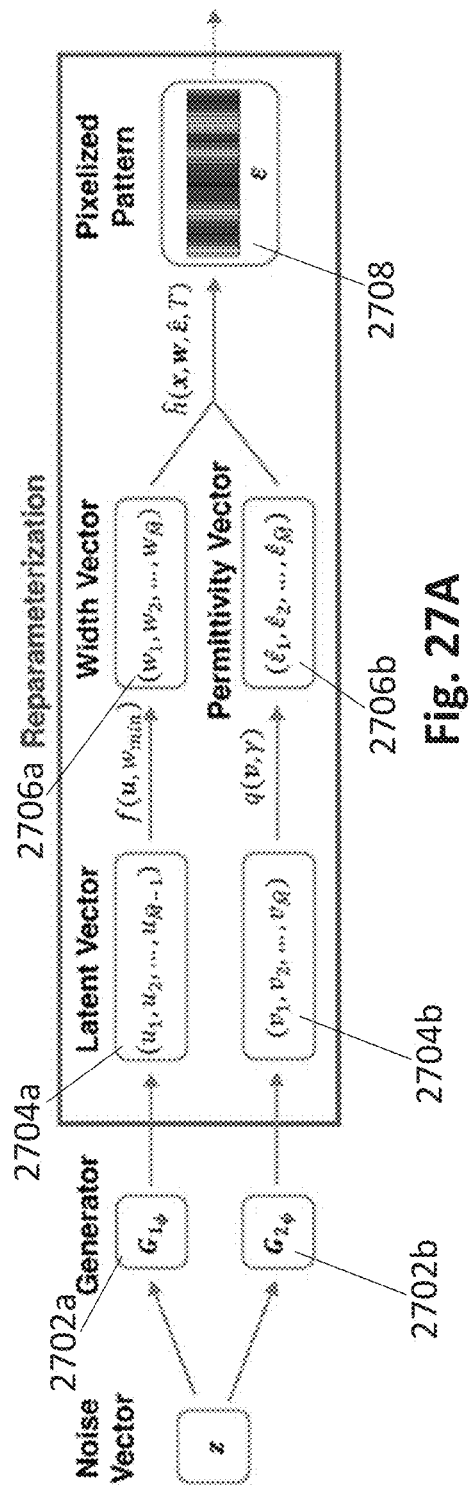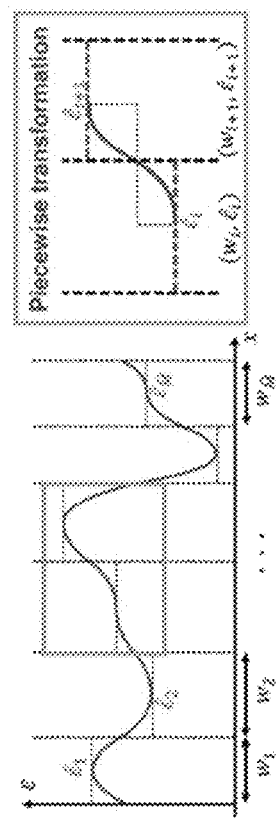
Fig. 27A
Fig. 27B

Fig. 29

Fig. 31A Original version

Fig. 31B Fully binary

MULTI-OBJECTIVE, ROBUST CONSTRAINTS ENFORCED GLOBAL TOPOLOGY OPTIMIZER FOR OPTICAL DEVICES

CROSS-REFERENCE TO RELATED APPLICATIONS

This application claims the benefit of and priority under 35 U.S.C. § 119(e) to U.S. Provisional Patent Application Ser. No. 63/023,766 entitled "Multi-objective, Robust Constraints Enforced Global Topology Optimizer for Photonic Devices," filed May 12, 2020, which is incorporated herein by reference in its entirety for all purposes.

STATEMENT OF FEDERAL SUPPORT

This invention was made with government support under Contract No. DE-AR0001212 awarded by the Department of Energy. The Government has certain rights in the invention.

FIELD OF THE INVENTION

This disclosure relates to systems and methods for optimizing fabrication of optical devices.

BACKGROUND

Optical devices such as metasurfaces may benefit from optimization. Metasurfaces are wavefront shaping devices with subwavelength-scale structures which have been demonstrated for a broad range of applications in sensing, imaging, and information processing. Inverse design using topology optimization has proven to be highly effective for designing metasurfaces with optimized performance, which uses adjoint based gradient computations to iteratively update the dielectric distribution of the device to achieve better performance. A challenge in the inverse design of metasurfaces is to not only optimize device performance but also guarantee device fabricability, for example, enforcing control on the minimum feature size of the pattern so that the fabrication requirement will not go beyond the ability of lithography and etching. Although existing strategies to restrict the minimum feature size such as applying filters and employing analytical penalty functions are able to tackle the problem to some extent, they all lack the ability to strictly avoid the existence of tiny features.

SUMMARY OF THE INVENTION

Various embodiments are directed to a method for optimization of photonic devices. The method receives a set of unconstrained latent variables, maps the set of unconstrained latent variables to a constrained space to generate a constrained device, and calculates the permittivity across each element of the constrained device. The method further determines a permittivity-constrained variable gradient based at least partially on the permittivity across each element and optimizes the set of unconstrained latent variables by at least partially using the permittivity-constrained variable gradient.

In various other embodiments, mapping the unconstrained space to a constrained space includes reparameterization of the unconstrained latent variables.

In still various other embodiments, the reparameterization of the unconstrained latent variables includes solving for a set of constrained width space $\{w_i\}$ through the following equations:

$$v_i = \text{Sigmoid}(u_i), v_M = 1;$$

$$k_i = v_i\sqrt{1 - \sum_{j=1}^{i-1} k_j^2}, k_1 = v_1; \text{ and}$$

$$w_i = \frac{k_i}{\sum_{j=1}^{M} k_j}(L - Mw_{min}) + w_{min},$$

where the set of unconstrained latent variables are $\{u_i\}$ and wherein $w_{min}$ is a minimum width of each feature of the constrained width space, M is the total number of features, and $\sum_{i=1}^{M} w_i = L$.

In still various other embodiments, calculating the permittivity across each element of the constrained device includes performing a gray-space relaxation of the set of constrained width space to determine a function of refractive index across each element in the set of constrained width space.

In still various other embodiments, the gray-space relaxation comprises solving for $$n_i(x) = \left[\exp\left(\pm\frac{x^2 - \left(\frac{w_i}{2}\right)^2}{T}\right) + 1\right]^{-1},$$

where x is the position across the width of a certain element, where x=0 is at the middle of the element, and T controls the binarization of the pattern.

In still various other embodiments, the method further includes determining an efficiency-constrained variable gradient of the constrained device based on the permittivity-constrained variable gradient.

In still various other embodiments, the efficiency-constrained variable gradient is further based on an efficiency-permittivity gradient.

In still various other embodiments, the efficiency-constrained variable gradient is calculated using the following equation:

$$\frac{\partial Eff}{\partial w} = \frac{\partial Eff}{\partial \varepsilon} \times \frac{\partial \varepsilon}{\partial w}$$

where $$\frac{\partial \varepsilon}{\partial w}$$

is the permittivity-constrained width gradient and $$\frac{\partial Eff}{\partial \varepsilon}$$

is the efficiency-permittivity gradient.

In still various other embodiments, an efficiency-latent variable gradient is calculated at least partially using a latent variable gradient of the latent unconstrained variables in relation to constrained device calculated using the following equations:

$$v_i = \text{Sigmoid}(u_i), v_M = 1;$$

$$k_i = v_i \sqrt{1 - \sum_{j=1}^{i-1} k_j^2}, k_1 = v_1; \text{ and}$$

$$w_i = \frac{k_i}{\sum_{j=1}^{M} k_j}(L - Mw_{min}) + w_{min},$$

where the set of unconstrained latent variables are $\{u_i\}$ and wherein $w_{min}$ is a minimum width of each feature of the constrained width space, M is the total number of features, and $\Sigma_{i=1}^{M} w_i = L$.

In still various other embodiments, the efficiency grating in relation to the unconstrained latent variables is calculated at least partially using the following equation:

$$\frac{\partial \text{Eff}}{\partial u} = \frac{\partial \text{Eff}}{\partial w} \times \frac{\partial w}{\partial u},$$

where $$\frac{\partial w}{\partial u}$$

is the constrained width-latent variables gradient and $$\frac{\partial \text{Eff}}{\partial w}$$

is the efficiency-constrained width gradient.

In still various other embodiments, the efficiency-permittivity gradient is calculated using an adjoint variable method.

In still various other embodiments, the adjoint variable method includes forward and adjoint simulation.

In still various other embodiments, the method of further includes using a generator to generate the set of unconstrained latent variables; and iteratively updating the generator at least partially based on the permittivity-constrained variable gradient.

In still various other embodiments, the unconstrained latent variables comprise unconstrained latent widths and mapping the set of unconstrained latent variables comprises mapping the unconstrained latent widths to the constrained space to generate constrained widths. The method further includes receiving a set of unconstrained latent permittivities and mapping the set of unconstrained latent permittivities to a constrained space to generate constrained average permittivities of the constrained device. Calculating the permittivity profile across each element of the constrained device is further based on the constrained widths and the constrained average permittivities of the constrained device.

In still various other embodiments, the method further includes determining a permittivity-constrained average permittivity gradient of the constrained device and optimizing the set of unconstrained latent permittivities at least partially based on the permittivity-constrained average permittivity gradient of the constrained device.

In still various other embodiments, the method further includes binarizing the permittivity across each element of the constrained device, where determining a permittivity-constrained variable gradient is based on the binarized permittivity across each element.

Various embodiments are directed to a method for optimization of photonic devices, the method including receiving a set of variables including a set of refractive indices including a set of corresponding thicknesses, calculating a reflection gradient with respect to the set of refractive indices and their set of corresponding thicknesses, and optimizing the set of variables at least partially using the reflection gradient to obtain an optimized device including a set of optimized refractive indices with corresponding optimized thicknesses.

In various other embodiments, the method further includes calculating the reflection spectrum of the set of variables, where calculating the reflection gradient includes calculating a partial differential of the reflection spectrum.

In still various other embodiments, calculating the reflection spectrum comprises using a transfer matrix method.

In still various other embodiments, the method further includes: using a generator to generate the set of variables; using the set of variables to calculate a corresponding reflection gradient; and iteratively updating the generator at least partially using the reflection gradient.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description will be more fully understood with reference to the following figures and data graphs, which are presented as various embodiment of the disclosure and should not be construed as a complete recitation of the scope of the disclosure.

FIG. 2A illustrates an example schematic of metagratings including silicon nanoridges in accordance with an embodiment of the invention.

FIG. 5 illustrates an example pseudo-code describing the algorithm of FIGS. 3 and 4.

FIG. 9B illustrates pseudocode for the reparameterization technique of FIG. 9A.

FIG. 27A illustrates a flowchart of a reparameterization process for a variable-topology global optimizer.

FIG. 27B illustrates schematics of the piecewise transformation used for device reparameterization.

FIG. 29 illustrates an example algorithm for newly configured GLOnets where physical devices in this form are generated using two separate generative networks, one for section widths and the other for refractive indices being optimized.

DETAILED DESCRIPTION

Figure 1:
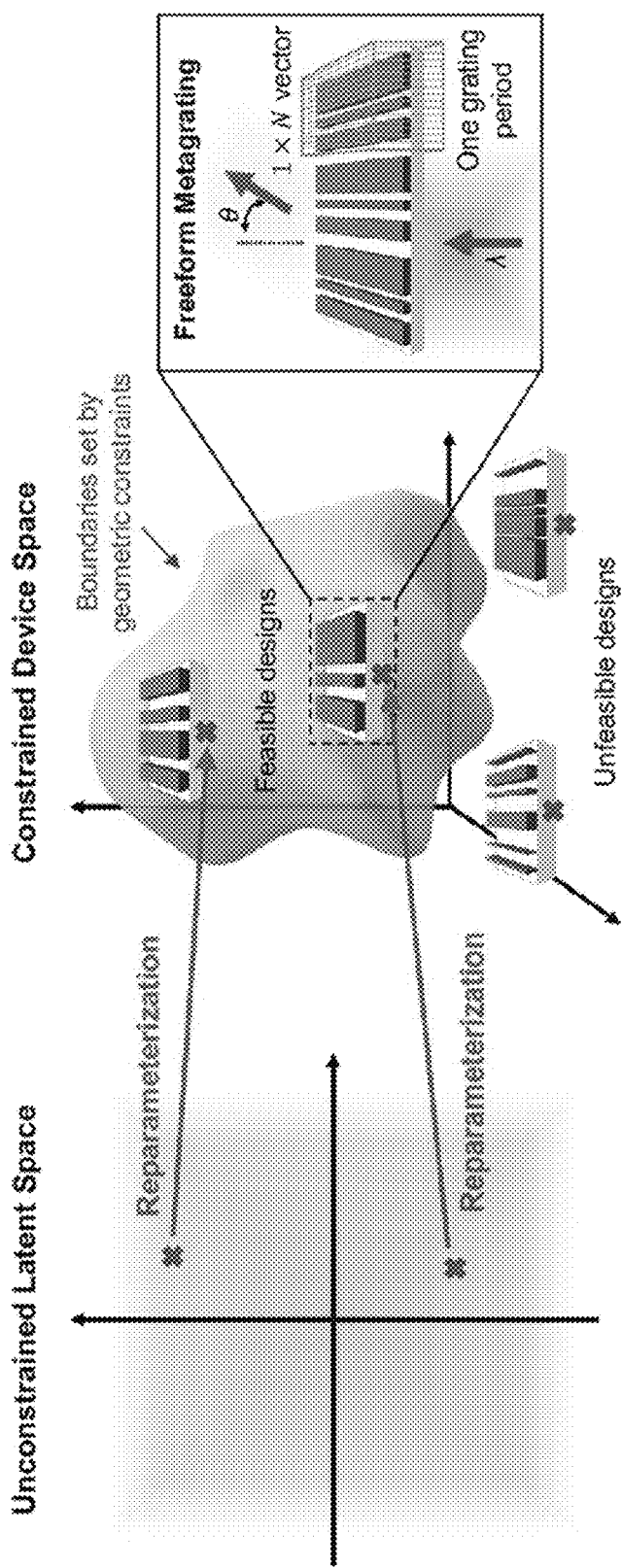
FIG. 1 illustrates an overview of reparameterization for an example metagrating design.

Nanophotonic devices may be capable of manipulating and guiding electromagnetic waves propagating in free space and on chip, and they have a broad range of applications in imaging, sensing, and optical communications. Among the most effective methods to design these devices is gradient-based topology optimization, which has been used to realize metagratings, metalenses, and on-chip photonic devices that utilize complex electromagnetic wave dynamics to achieve exceptional performance. Topology optimization is performed by discretizing the device structure into small voxels, initializing each voxel with grayscale dielectric permittivity values c, and then iteratively modifying these permittivity values in a manner that improves a figure of merit (FoM). These modifications are based on gradient terms $$\frac{\partial(FoM)}{\partial \varepsilon}$$

that can be computed for each pixel using the adjoint variables method or autodifferentiation. Topology optimization can be performed in the context of local optimization, in which local gradients are directly used to perform gradient descent on grayscale device structures, or global optimization with global topology optimization networks (GLOnets), in which local gradient calculations are combined with generative neural network training to perform global population-based optimization.

A critical concern in the inverse deign methods for optical devices may be guaranteeing device fabricability, making it desirable to incorporate practical experimental constraints such as the minimum feature size or robustness to fabrication imperfections. Existing techniques such as applying threshold filters and adding penalties to the figure of merit may be able to push the output devices towards the desired constrained design space. However, they may lack the ability to enforce hard constraints such as avoiding the appearance of tiny features smaller than the minimum specified feature size.

Further, a critical issue concerning topology-optimized devices is the practical implementation of hard geometric constraints imposed by experimental considerations. A particularly important geometric constraint is minimum feature size (MFS), which arises due to limitations in lithography patterning resolution and etching aspect ratio. The imposition of MFS constraints also enables proper base patterns to be defined and used in algorithms that enforce fabrication robustness, in which base patterns are codesigned with their geometrically eroded and dilated forms. Without these constraints, topology-optimized devices often possess complex geometric shapes with very small feature sizes, making them difficult if not impossible to experimentally fabricate in a reliable manner.

Current methods to impose MFS constraints fall in one of three classes. The first is to set the device voxel dimensions or spacing between features to match the desired MFS. While this method works, it adds significant granularity to the device design space, limiting the final device performance. The second method is to use regularization terms that penalize the FoM when the MFS constraint is violated. While this technique will generally push devices toward regions of the design space that satisfy the desired constraints, it does not guarantee their enforcement. A third method is to optimize the device in an unconstrained manner and then use threshold filters to incorporate constraints. This method can be applied during the iterative optimization process or after unconstrained optimization is performed, and while it has the potential to work well, it only works when optimized devices in the unconstrained space locally map onto high performance optima in the constrained space.

Various embodiments of this disclosure relate enforcing strict geometric constraints within an inverse optimizer, while maintaining the fine pixel-level granularity of the physical design space, by reparameterizing the physical design space itself. FIG. 1 is an overview of reparameterization for an example metagrating design. The freeform metagratings including silicon nanoridges are described by 1×N vectors. To enforce hard physical constraints, mathematical transformations are used to map devices represented in an unconstrained latent space to a constrained device space. The idea, outlined in FIG. 1, is to initially define devices in a latent space free of constraints and then transform these devices to a physical device space with hard constraints using analytic and differentiable mathematical transformations. These devices are evaluated and optimized within this physical device space, and modifications to these devices are mapped back to their latent representations. The implementation of reparameterization for the design of high efficiency metagratings using local optimization are demonstrated based on the adjoint variables method, and GLOnets-based global optimization. While much of the disclosure relates to the application of reparameterization to the enforcement of feature size constraints, the concept provides a general formalism to incorporate physical information into black box inverse design tools.

Further, various embodiments of this disclosure relate to a method that accurately imposes constraints through reparametrization. In some embodiments, the method may impose hard constraints in the optimization process through reparametrizing the problem. The pixelated device pattern is reparametrized by a new set of parameters where the constraints in the old design space are naturally eliminated, and optimization is performed in this new design space instead. This method may be used to design metasurfaces such as metagratings including silicon nanoridges with strict restrictions on minimum feature size.

In some embodiments, via a sequence of mathematical transformations, the method uses variables in an unconstrained latent space to reparametrize the original constrained device space such that the constraints are naturally imposed through the reparameterization process. Adjoint based optimization may then be performed with this newly introduced unconstrained variable space where performance gradients are first calculated regarding the original constrained device space and then backpropagated to the unconstrained latent space.

Example Photonic Devices

Figure 2B:
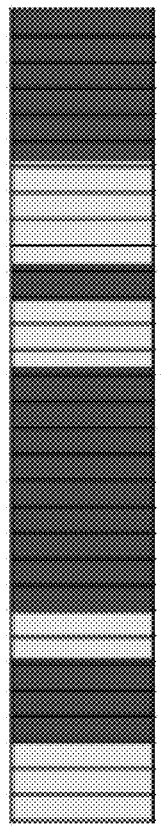
FIG. 2B illustrates the permittivity profile ε(x) of the metagratings disclosed in FIG. 2A.

Photonic devices including metasurfaces such as high efficiency metagratings including silicon nanoridges may be fabricated with accurate control on the minimum feature size are designed. Silicon nanoridges may deflect normally incident light to the +1 diffraction order. FIG. 2A illustrates an example schematic of metagratings including silicon nanoridges in accordance with an embodiment of the invention. Deflection efficiency of the metagrating may be the figure of merit here which may be defined as the electromagnetic power deflected into the first diffraction order normalized with the total input power with normal incidence. In the original device space, the metagrating may be defined by the permittivity profile c(x) within each grating period which may denotes the material distribution at a pixel level, where c(x) is normalized so that 0 represents air and 1 represents silicon. FIG. 2B illustrates the permittivity profile ε(x) of the metagratings disclosed in FIG. 2A. In adjoint-based topology optimization, ε(x) may be iteratively adjusted to increase deflection efficiency according to the gradient calculated from a forward and an adjoint simulation.

At all stages of optimization, an individual metagrating period may be defined by a permittivity profile ε=ε(X), which denotes the material distribution at each voxel located at x within an individual grating period. ε(x) is normalized so that 0 represents air and 1 represents silicon. The metagrating period has a width L that is subdivided into N=256 voxels, so that both x and E are vectors with dimension N. Our FoM is deflection efficiency, which is defined as the electromagnetic power deflected into the +1 diffraction order normalized to the total incident beam power. The deflection efficiency is denoted as Eff=Eff(ε) and calculated with a rigorous coupled-wave analysis (RCWA) electromagnetic solver such as Reticolo.

The objective is to find a permittivity profile that maximizes the deflection efficiency, which can be cast as the following optimization:

maximize Eff(ε)

subject to $\varepsilon \in \{0,1\}^N$

To define feature size constraints on the pixelized pattern ε(x), the pixelized pattern may be transformed to a vector of discrete width values, w, with which MFS constraints can be readily defined and incorporated. For devices of fixed topology, each element in w represents ridge widths and air gap values which may generalize to devices of varying topology. By reframing the pixelized patterns to a vector of geometric values, the original optimization problem may be reformulated for devices of fixed topology to be:

maximize $Eff(w)$ subject to $w_i \geq w_{min}, i = 1, 2, \ldots, M$ $$\sum_{i=1}^{M} w_i = L$$

$w_{min}$ denotes the MFS, $w_i$ denotes the width of each structural feature, which can be a silicon ridge or air gap, and M denotes the total number of silicon and air features. The total device width should be equal to the grating period L.

Figure 2C:
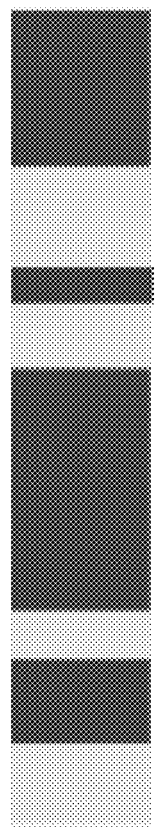
FIG. 2C illustrates a cross sectional view of metagratings described in connection with FIG. 2A.

By first transforming the pixelated pattern into a pattern represented by the ridge width and ridge separation values, the minimum feature size can be described as $w_i \geq w_{min}$ with i=1, 2, . . . , M where $w_{min}$ denotes the minimum feature size, $w_i$ denotes the width of each bar (silicon ridge or air gap), and M denotes the total number of bars. FIG. 2C illustrates a cross sectional view of metagratings described in connection with FIG. 2A. Another constraint to this width space is $\Sigma_{i=1}^N w_i = L$ where L denotes the periodicity of the metagrating.

Processes Including Reparameterization

Figure 3:
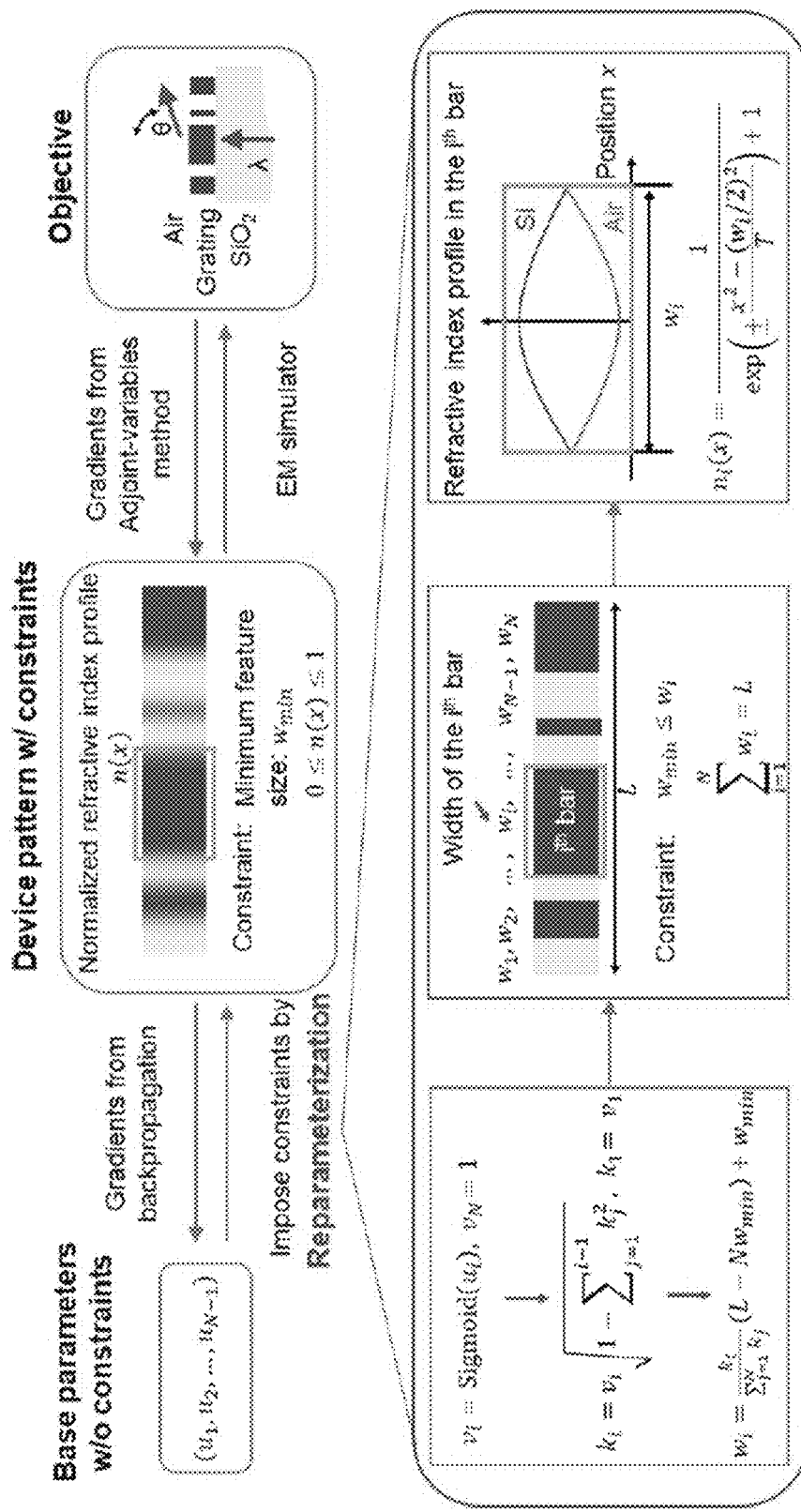
FIG. 3 illustrates a schematic of an inverse design method with reparameterization in accordance with an embodiment of the invention.
Figure 4:
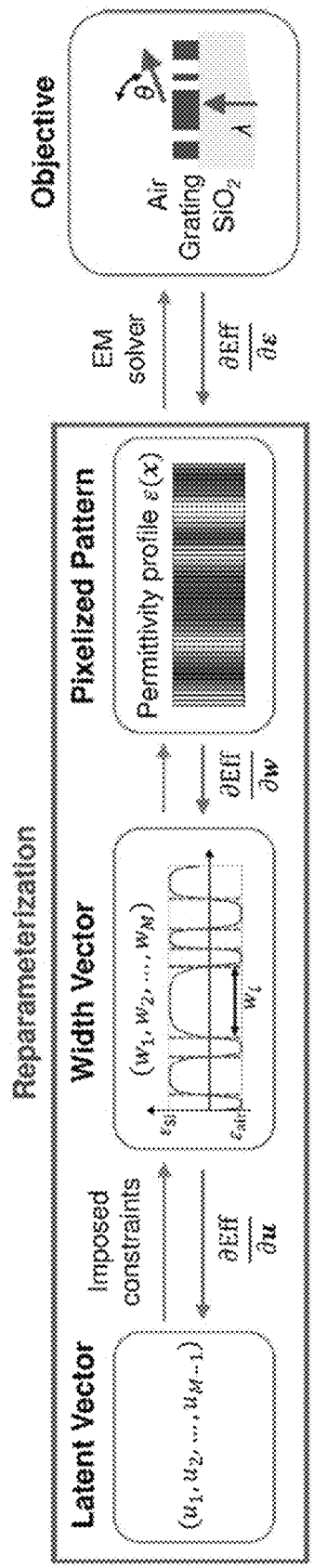
FIG. 4 is flowchart of the reparameterized gradient-based local optimizer in accordance with an embodiment of the invention.

The reparametrized inverse design process may be used to design high efficiency metagratings with accurate control on the minimum feature size. FIG. 3 illustrates a schematic of an inverse design method with reparameterization in accordance with an embodiment of the invention. FIG. 4 is flowchart of the reparameterized gradient-based local optimizer in accordance with an embodiment of the invention. FIG. 5 illustrates an example pseudo-code describing the algorithm of FIGS. 3 and 4. Latent vectors are transformed to physical devices, and gradients calculated for physical devices are backpropagated to update the latent vectors. Device patterns may be reparametrized by the base parameters ($u_1, u_2, \ldots, u_{N-1}$) without constraints, and constraints may be naturally imposed through mapping from base parameters to device patterns. Shown in the flow chart of the upper panel, each iteration includes a forward simulation from parameters to objective and a backward propagation of gradients to update the parameters. The method may start with a base parameter set $\{u_i\}$ that may have no constraints and map it into a device pattern described by a pixilated refractive index profile n(x) with restrictions on various parameters such as the minimum feature size through a series of transformations, also known as the reparameterization, where the constraints may be naturally imposed. The refractive index profile n(x) may be normalized so that 0 represents air and 1 represents silicon. The constraint-enforced device pattern may be inputted into an electromagnetic simulator such as a rigorous coupled-wave analysis solver to evaluate various objectives such as the deflector efficiency in the +1 diffraction order. As for the backward calculation, the gradient of the refractive index profile may be first attained from the adjoint variable method and then backpropagated to the base parameters. Therefore, gradient descent may be used to update those base parameters instead of the device pattern.

The reparameterization process of mapping $\{u_i\}$ into n(x) is elaborated in the lower panel of FIG. 3. The base parameter set $\{u_i\}$ may be mapped through a set of differentiable functions into $\{w_i\}$ which describes the width of the air/silicon bars which may describe the refractive index profile of the metagrating. The reparameterization technique may incorporate experimental constraints and may include but is not limited to two steps:

the first step may be to map from an unconstrained variable space $\{u_i\}$ to a constrained width space $\{w_i\}$ where the constraint is naturally imposed;

the second step may be to map from the width space $\{w_i\}$ to the original device space ε(x) where a binarized pattern is relaxed to gray-scale such that the gradient is able to propagate.

As illustrated in the leftmost box on the lower panel of FIG. 3, the reparameterization process may start with an unconstrained variable space $\{u_i\}$ with i=1, 2, . . . , M−1. A set of differentiable transformation functions may be performed:

$$v_i = \text{Sigmoid}(u_i) = \frac{e^{u_i}}{e^{u_i}+1}, v_M = 1, v_M = 1, i = 1, \ldots, M-1 \quad (1)$$

$$k_i = v_i \sqrt{1 - \sum_{j=1}^{i-1} k_j^2}, k_1 = v_1, i = 2, \ldots, M \quad (2)$$

$$w_i = \frac{k_i}{\sum_{j=1}^{M} k_j}(L - Mw_{min}) + w_{min}, i = 1, \ldots, M \quad (3)$$

The transformation of u to w may be defined as w=f(u, $w_{min}$). In this manner, MFS constraints on the metagrating pattern, have been imposed onto the width vector w.

Through the transformations described in the leftmost box on the lower panel of FIG. 3, constraints on the metagrating pattern may be imposed as $w_{min} \leq w_i$ and $\Sigma_{i=1}^N w_i = L$, where N is the total number of air/silicon bars, and L is the period of the grating. Next, a gray-scale relaxation may be performed using equation 4 to map from $\{w_i\}$ to ε=n(x)=f(x, w,T):

$$n_i(x) = \left[\exp\left(\pm\frac{x^2 - \left(\frac{w_i}{2}\right)^2}{T}\right) + 1\right]^{-1} \quad (4)$$

Figure 6A:
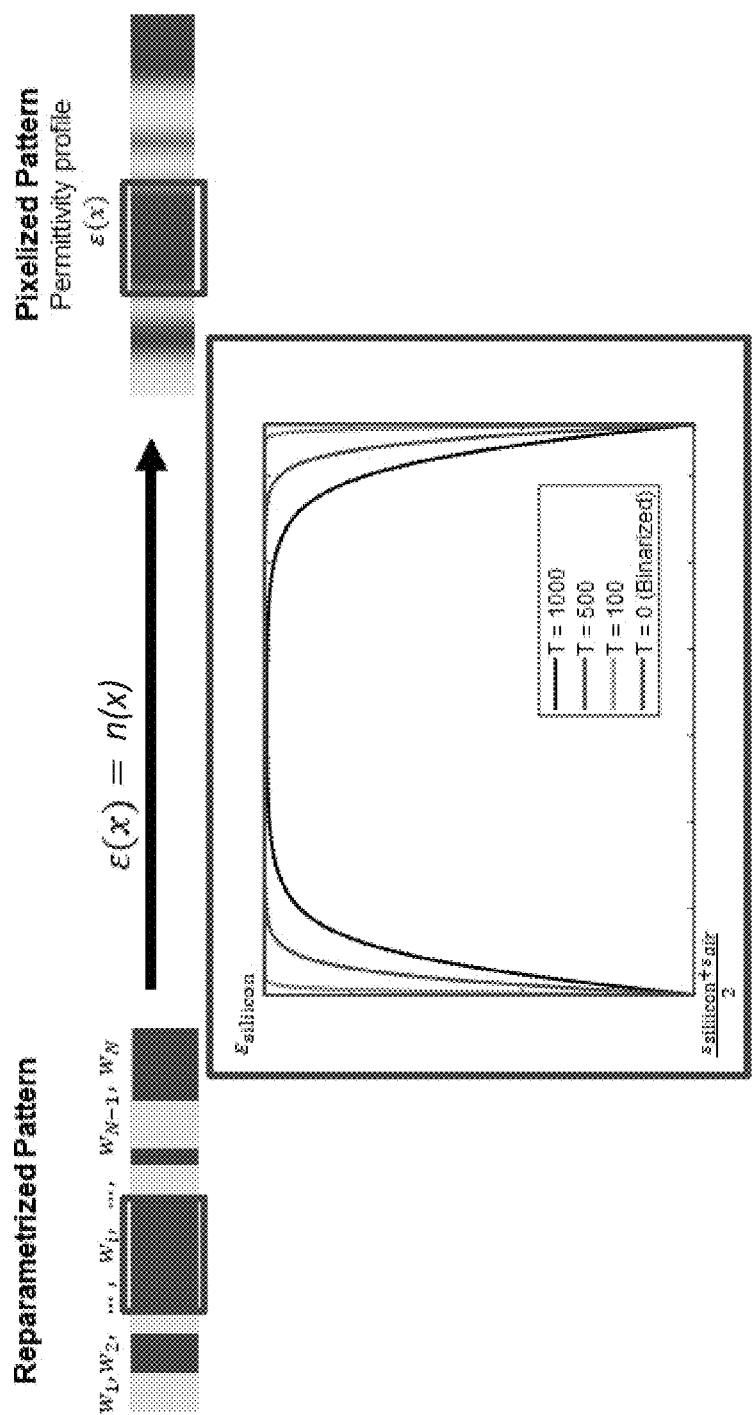
FIG. 6A illustrates a graphical representation of the effect of different levels of T.
Figure 6B:
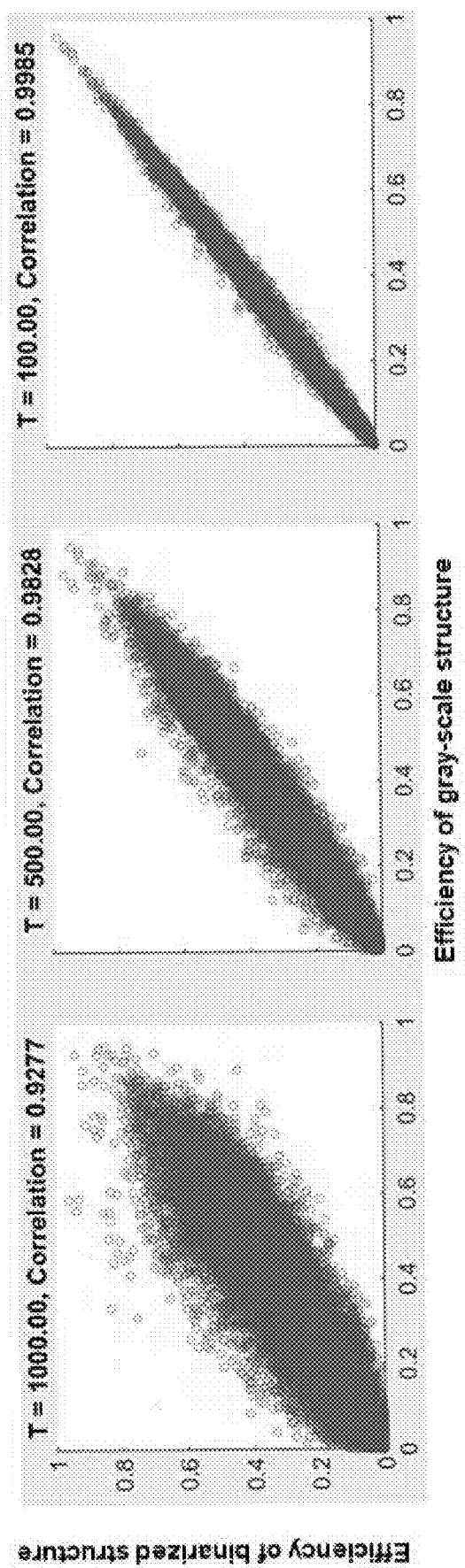
FIG. 6B is various graphs illustrating a study between the efficiency of binarized structure and gray-scale structure of devices with similar width for different T values.

FIG. 6A illustrates a graphical representation of the effect of different levels of T. Equation 4 characterizes the gray-scale pattern, where the ± sign indicates + for Si and − for air, and T controls the binarization of the pattern and decreases during the course of the iterative optimization so that the refractive index is binarized to either air or Si. T is a hyperparameter, analogous to a temperature term, which controls the degree of binarization of the pattern. $\tilde{x}^{(i)}$ represents the position of pixels corresponding to the ith section, and it is defined such that the center of $w_i$ falls onto the position of $\tilde{x}^{(i)}=0$. Optimizing in a binarized space can be extremely hard as it is hard to propagate the efficiency gradient from the original device space $\varepsilon(x)$ to the width space $\{w_i\}$ in the iterative optimization process. Thus, equation 4 may be used to relax the binarized structure into grey scale. Although the more gray-scale the easier the gradient can be propagated, the landscape of the design space can be changed dramatically when the structure is relaxed from binarized to gray-scale. Thus, there is a tradeoff between propagating the gradient and how accurate the design space may be described with a gray-scale relaxation. The top images of FIG. 6A illustrate the reparameterized pattern after gray-scale relaxation. The bottom plots of FIG. 6A illustrate various results after gray scale relaxation for different T values. FIG. 6B is various graphs illustrating a study between the efficiency of binarized structure and gray-scale structure of devices with similar width for different T values. As illustrated, for a population of 60,000 different devices and for T≤1000, higher than 0.9 correlation may be achieved, indicating a high-level of similarity between the gray-scale space and the binarized space.

With a physical device in hand, $$\frac{\partial Eff}{\partial \varepsilon}$$

may be evaluated using the adjoint variables method, in which forward and adjoint simulations are performed using the RCWA simulator. This gradient term may be then used to calculate $$\frac{\partial Eff}{\partial u}$$

using back-propagation, which may be based on the chain rule. Backpropagation can be used in the algorithm because the entire reparameterization process can be described as a continuous and differentiable computation graph. In practice, backpropagation may be performed by programming the algorithm in PyTorch and using built-in autodifferentiation packages. Finally, u may be updated using the adaptive moment estimation (Adam) algorithm, which may be a variant of gradient descent, and the entire process is iteratively repeated.

Figure 7A:
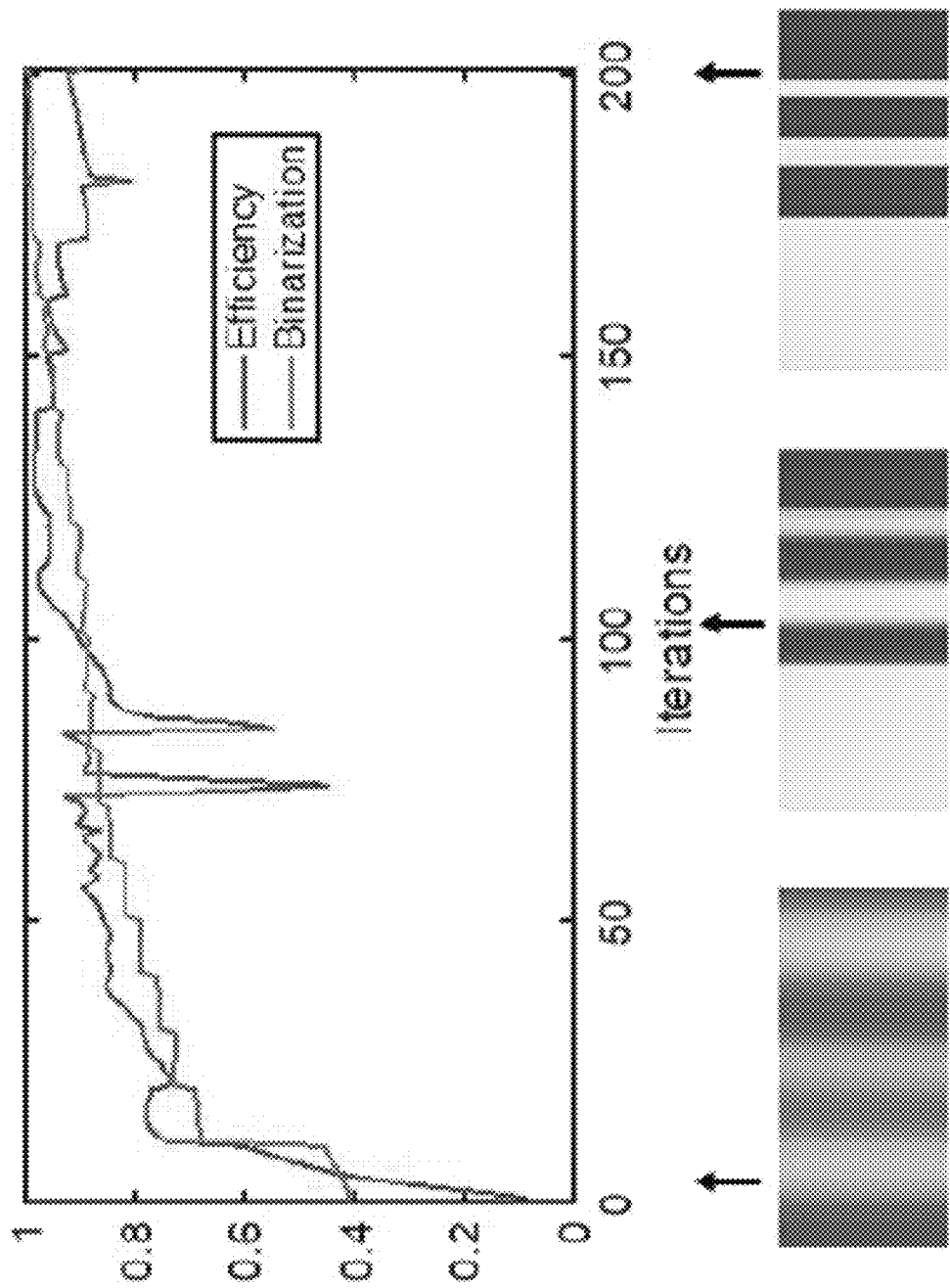
FIG. 7A is a plot illustrating an optimization process using the method described in connection with FIGS. 3 and 4 with constraints on the minimum feature size of 40 nm.

A metagrating may be designed that deflects normally incident TM-polarized light at a wavelength of 850 nm to 65 degrees. FIG. 7A is a plot illustrating an optimization process using the method described in connection with FIGS. 3 and 4 with constraints on the minimum feature size of 40 nm. The plot on top illustrates deflection efficiency and binarization over the course of the optimization process, and corresponding device patterns. The topology of the metagratings may be fixed at 6 air/Si bars and the pattern may gradually become binary over the course of optimization. The deflection efficiency of the final design reaches 89.4%.

Figure 7B:
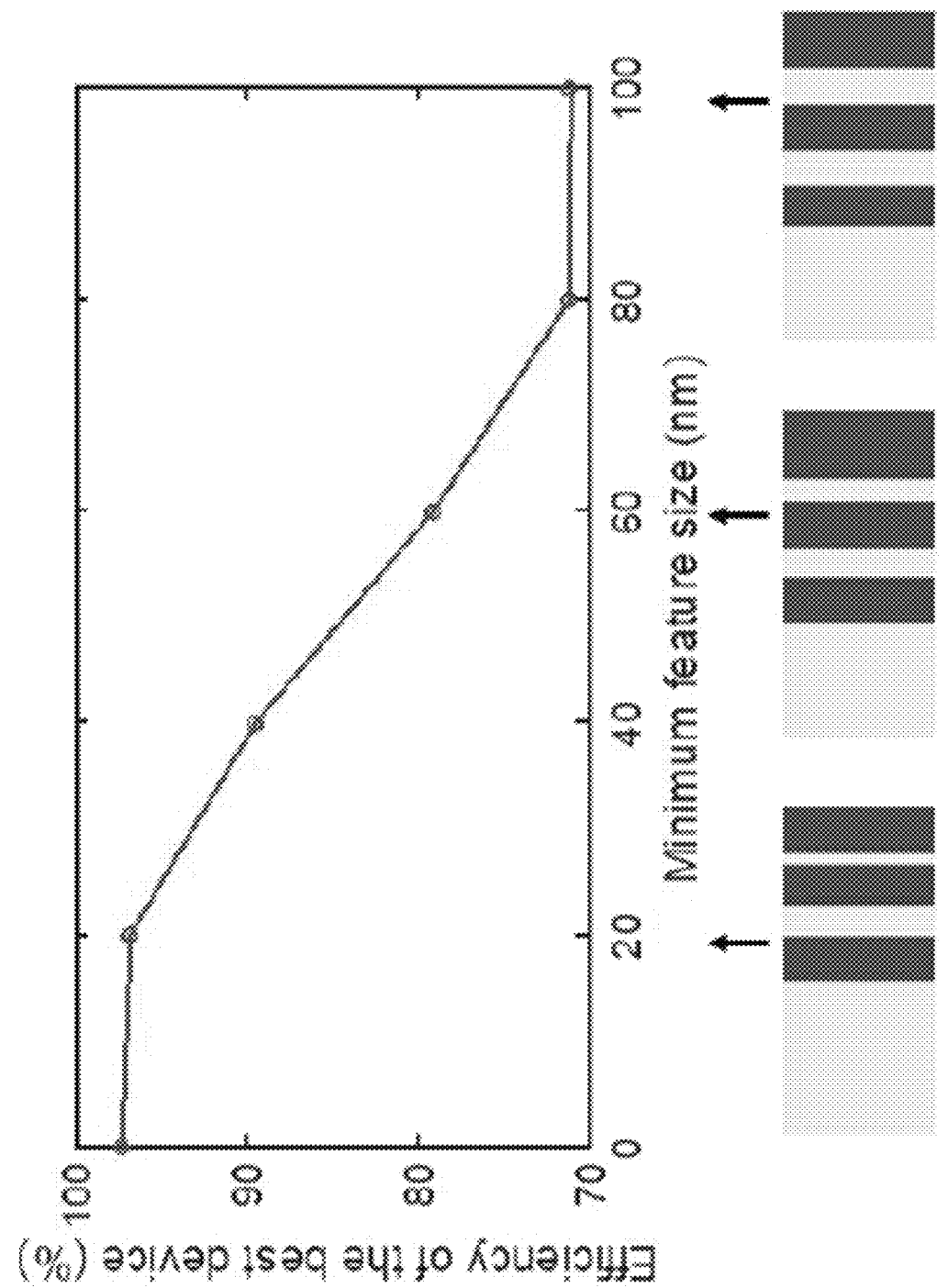
FIG. 7B is a plot illustrating the efficiency of the best optimized devices with constraints on different minimum feature sizes and their corresponding device patterns.

FIG. 7B is a plot illustrating the efficiency of the best optimized devices with constraints on different minimum feature sizes and their corresponding device patterns. This plot illustrates the design of a series of metagratings with different minimum feature sizes. As illustrated, when increasing the minimum feature size constraint from none to 100 nm, the best optimized devices experience an efficiency drop from 97.3% to 71.1% while keeping the similar geometry features. The best device achieved with no minimum feature size constraint may performance at a 97.3% efficiency.

In some embodiments, the method may be used to enforce fabrication constraints through reparameterization. In the new reparameterized design space, those constraints may be naturally eliminated, and fabrication optimization may be achieved. The device designed by the method may be able to achieve extremely high performance and strictly satisfy fabrication constraints. Implementations of this design scheme may include variations in the topology, enrichment in constraints, and diversification of structural geometries.

Reparameterized local optimization may be used to design metagratings that deflect normally incident transversemagnetic-polarized light at a wavelength of 850 nm to 65 degrees. In one example, the MFS constraint may be set to 60 nm, the topology is fixed to contain three silicon ridges (M=6), and the device thickness is 335 nm. The refractive index of silicon may be used and only the real part of the index may be used to simplify the design problem. Complex refractive indices can be readily incorporated into the optimization procedure without loss of generality. For the disclosed system, the role of the imaginary part of the index may be small, and its inclusion results in a less than 2% drop in the total deflection efficiency for all of the optimized devices.

Figure 8A:
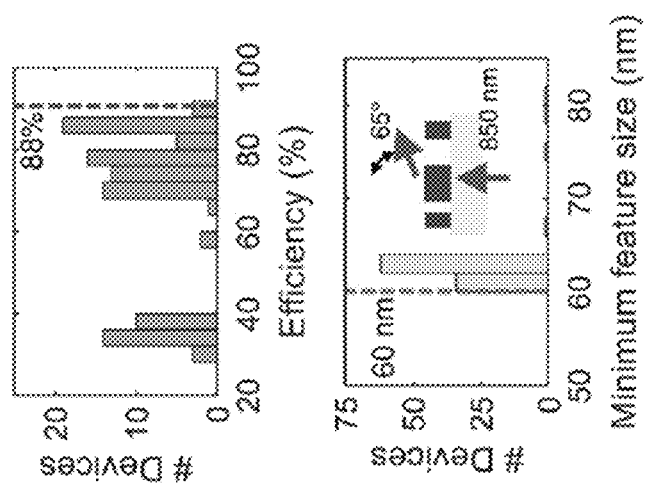
FIG. 8A illustrates histograms of device efficiency and minimum feature size for 100 locally optimized metagratings.

FIG. 8A illustrates histograms of device efficiency and minimum feature size for 100 locally optimized metagratings. The inset shows the device operating parameters. FIG. 8A shows a wide distribution of efficiency values, indicating that the design space is highly nonconvex with many local optima. The MFS distribution of these devices, also plotted in FIG. 8A, indicates that all devices have feature sizes larger than 60 nm, demonstrating that reparameterization enforces hard geometric constraints.

Figure 8B:
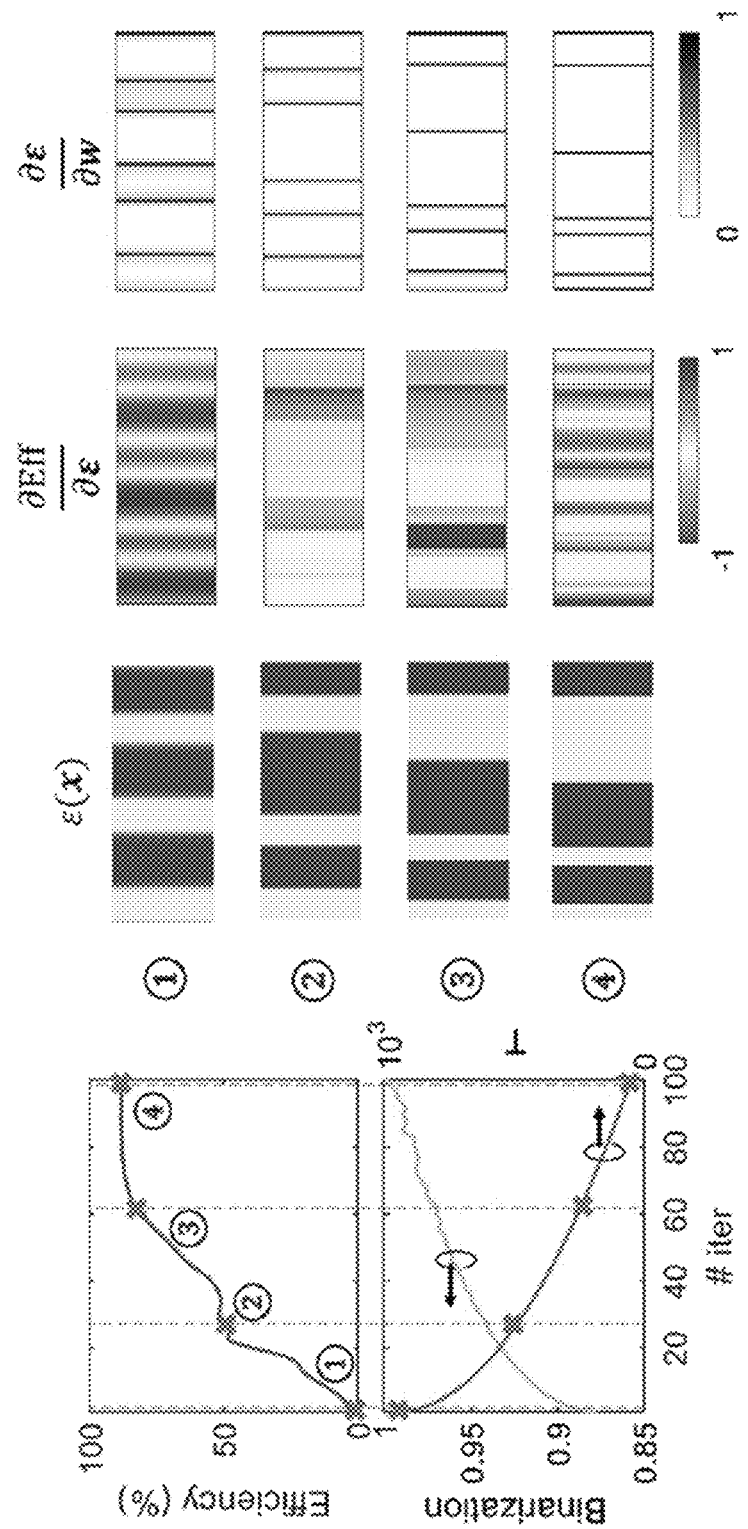
FIG. 8B illustrates charts describing efficiency, binarization, and T as a function of iteration number for a representative device optimization, together with device layouts and gradients for specific iterations.

FIG. 8B illustrates charts describing efficiency, binarization, and T as a function of iteration number for a representative device optimization, together with device layouts and gradients for specific iterations. Over the course of device optimization, the device efficiency increases, the pattern becomes more binary, and gradient contributions become more localized to the air-silicon boundaries. The initial device pattern is random and set to have a large T. In the high T regime, the device possesses substantial regions of gray-scale dielectric material, and the degree of binarization, defined as $\Sigma_{j=1}^{N}|2\varepsilon(x_j)-1|/N$, is low (as the device becomes more binary, this term gets closer to 1). In addition, $$\frac{\partial \varepsilon}{\partial w}$$

spans many voxels, which translate to large $$\frac{\partial Eff}{\partial w} = \frac{\partial Eff}{\partial \varepsilon} \times \frac{\partial \varepsilon}{\partial w}$$

upon backpropagation. These gradients allow relatively large changes to the device layout to be made each iteration in the early stages of optimization, while the algorithm is broadly searching for a local optimum. It is noted that the initial magnitude of T cannot be too large and must be judiciously chosen because the grayscale and binary design spaces are different, and these differences become more substantial as T increases. Sufficient correlation between these two design spaces is required for gradients within the grayscale design space to reliably improve the device over the course of binarization. As the local optimizer evolves, T is gradually reduced and the device becomes more binarized. At this stage, $$\frac{\partial \varepsilon}{\partial w}$$

becomes more localized to the air-silicon interfaces and the gradients provide fine-tuning of the device layout, in a manner akin to conventional boundary optimization. Upon the completion of optimization, T is decreased to zero, and the device is fully binarized and contains only silicon and air material.

Reparameterization not only is able to enforce robust physical constraints, it also reduces the computational cost for the optimization process because it serves to reduce the dimensionality of the physical design space itself. Through reparameterization, N dimensional (N=256) pixelized device patterns are reduced to a M−1-dimensional latent vector representations, leading to over an order of magnitude reduction in the dimensionality of the design parameters. This results in a physical design space that is dramatically smaller with fewer local optima, yielding a simplified optimization problem that requires less computational cost for both local and global optimization algorithms.

Embodiments Including Generators

Figure 9A:
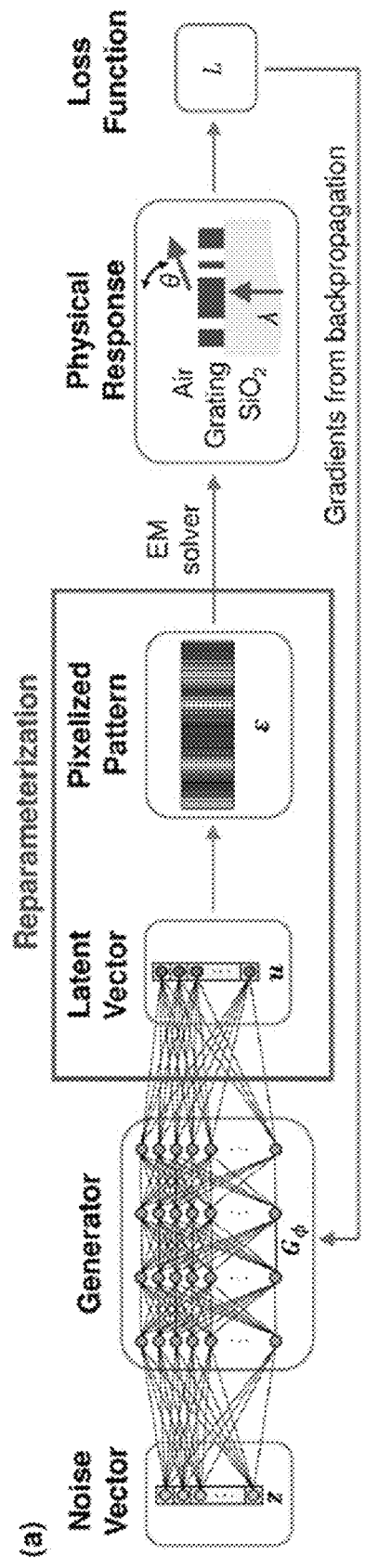
FIG. 9A illustrates an example flowchart of reparameterized GLOnets in accordance with an embodiment of the invention.

In some embodiments, reparameterization may be applied to GLOnets to enable population-based global optimization of fixed-topology devices with hard geometric constraints. FIG. 9A illustrates an example flowchart of reparameterized GLOnets in accordance with an embodiment of the invention. A distribution of latent vectors is produced by a generative neural network and reparameterized to constrained physical devices. Network weights are iteratively updated to minimize the loss function using backpropagation. FIG. 9B illustrates pseudocode for the reparameterization technique of FIG. 9A. Reparameterized GLOnets involve the iterative generation of devices from the network, evaluation of a loss function, and update of network weights that minimize the loss function. Unlike the original GLOnets architecture, in which a generative neural network produces a distribution of physical devices, the generator in the reparameterized GLOnets generates a distribution of latent vectors u from uniformly distributed noise vectors z∈ $U^{M-1}$ (−1,1). This nonlinear mapping from z to u is performed using a series of fully connected layers: u=$G_\phi$(z), where $\phi$ are the network weights. From a statistical perspective, the generator maps a uniform distribution of noise vectors to a probability distribution:

$$G_\phi : U^{M-1}(-1,1) \rightarrow P_\phi(u) \quad (5)$$

where $P_\phi(u)$ denotes the probability of generating u in the latent device space. The reparameterization process then follows, which maps u to the physical device pattern ε using the same formalism specified for the reparameterized local optimizer.

The next step is the evaluation of the loss function using metrics calculated from the generated devices. The loss function is engineered so that minimizing the loss function maximizes the probability that the neural network generates the optimal latent vector u*, which maps onto the globally optimized device ε*. For reparameterized GLOnets, the loss function is defined to be:

$$L(\varepsilon, g_\varepsilon, \mathit{Eff}) = -\frac{1}{K}\sum_{k=1}^{K} \frac{1}{\sigma}\exp\left(\frac{\mathit{Eff}^{(k)}}{\sigma}\right)\varepsilon^{(k)} \cdot g_\varepsilon^{(k)} \quad (6)$$

The efficiencies, Eff, and efficiency gradients, $$g_\varepsilon^{(k)} = \frac{\partial \mathit{Eff}}{\partial \varepsilon},$$

of the physical devices are calculated with forward and adjoint electromagnetic simulations. K is the batch size, and σ is a hyperparameter that biases network training toward devices possessing relatively high efficiencies and large gradients. To minimize the loss function, backpropagation is performed to modify network weights $\phi$ in the generator. As the mapping functions that link the noise vector, latent vector, and physical device pattern profile are continuous and differentiable, backpropagation is performed via the chain rule in a straightforward manner. Upon the completion of network training, the network generates latent vectors that map to physical devices clustered around the global optimum.

Figure 10:
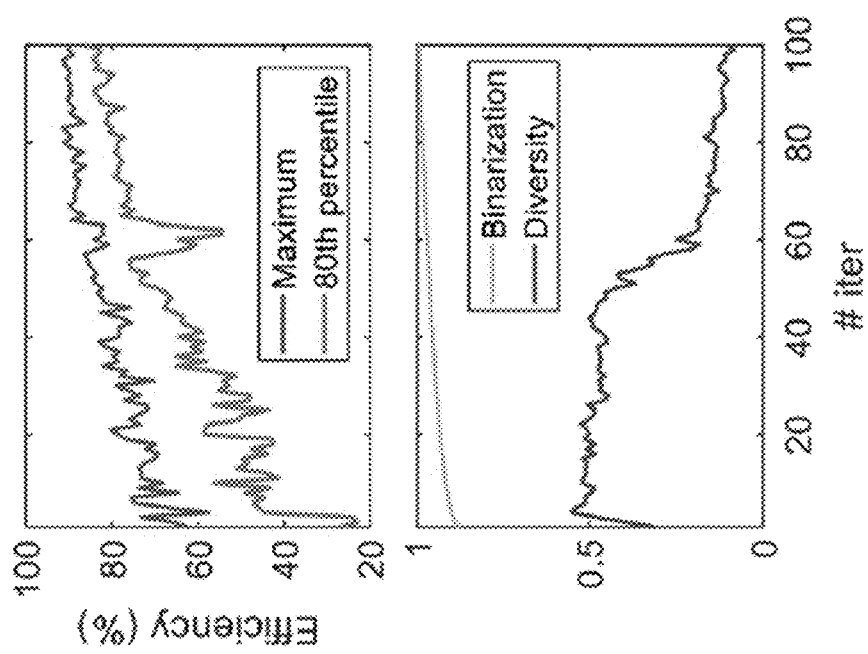
FIG. 10 illustrates efficiency, diversity, and binarization as a function of iteration number for a representative GLOnets training run.
Figure 11:
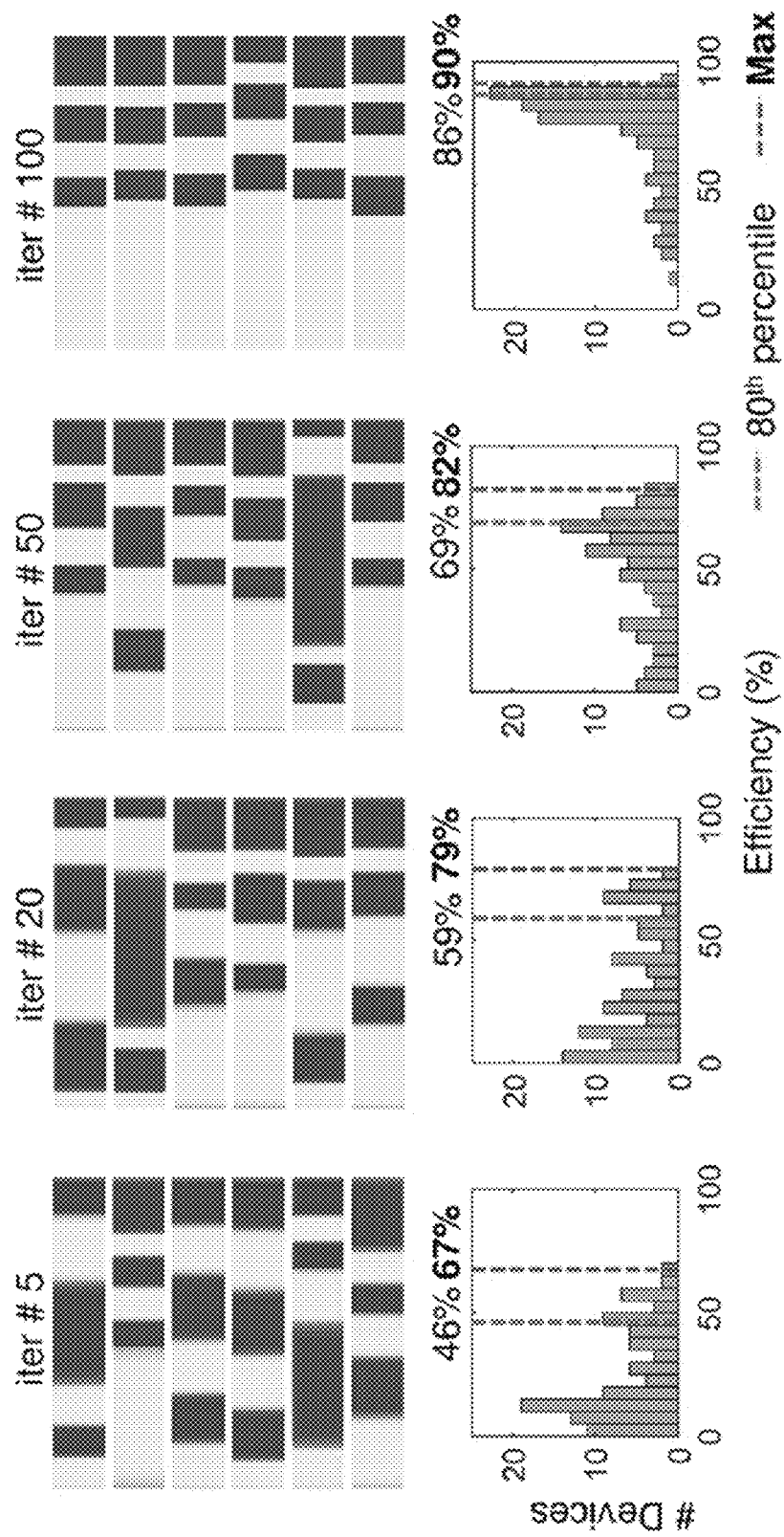
FIG. 11 illustrates histograms of generated device efficiencies and images of representative physical devices as a function of iteration number.

Reparameterized GLOnets are used to optimize metagratings with the same specifications as those designed by local optimization which are discussed in connection with FIGS. 7A and 7B. FIGS. 10 and 11 are summaries of results for a single network trained over the course of 100 iterations with a batch size of 100 devices. FIG. 10 illustrates efficiency, diversity, and binarization as a function of iteration number for a representative GLOnets training run. FIG. 11 illustrates histograms of generated device efficiencies and images of representative physical devices as a function of iteration number. Over the course of optimization, the devices become more binary, and the distribution of generated devices narrows and shifts to high efficiency values. At the start of network training, the reparameterized generator has no knowledge of good metagrating designs and outputs a diversity of grayscale devices with modest efficiencies. Device diversity for a given batch is computed as $$\frac{1}{M}\sum_{i=1}^{M}\sqrt{\frac{\sum_{k=1}^{K}\left(w_i^{(k)} - \bar{w}_i\right)^2}{K-1}}.$$

Over the course of network training, the best generated device and the overall device distribution shift toward higher efficiency regimes (top panel, FIG. 10), and the devices become more binarized and less diverse (bottom panel, FIG. 10). Upon the completion of network training, the best sampled device is simulated to have an efficiency of 90%, which is higher than the best locally optimized device in FIG. 7A.

The evolution of the device distribution over the course of network training is examined in more detail in FIG. 11, which shows representative device layouts and performance histograms at different moments of optimization. In early iterations, the reparameterized generative network outputs a diverse distribution of grayscale devices, indicating that the network is broadly sampling the device design space in its search for good optima. The performance histograms show mostly modest to low efficiency devices. At later iterations, the network has identified and converged to more narrow regions of the design space and outputs less diverse distributions of devices. The final network produces binary devices that are clustered around the global optimum.

Figure 12A:
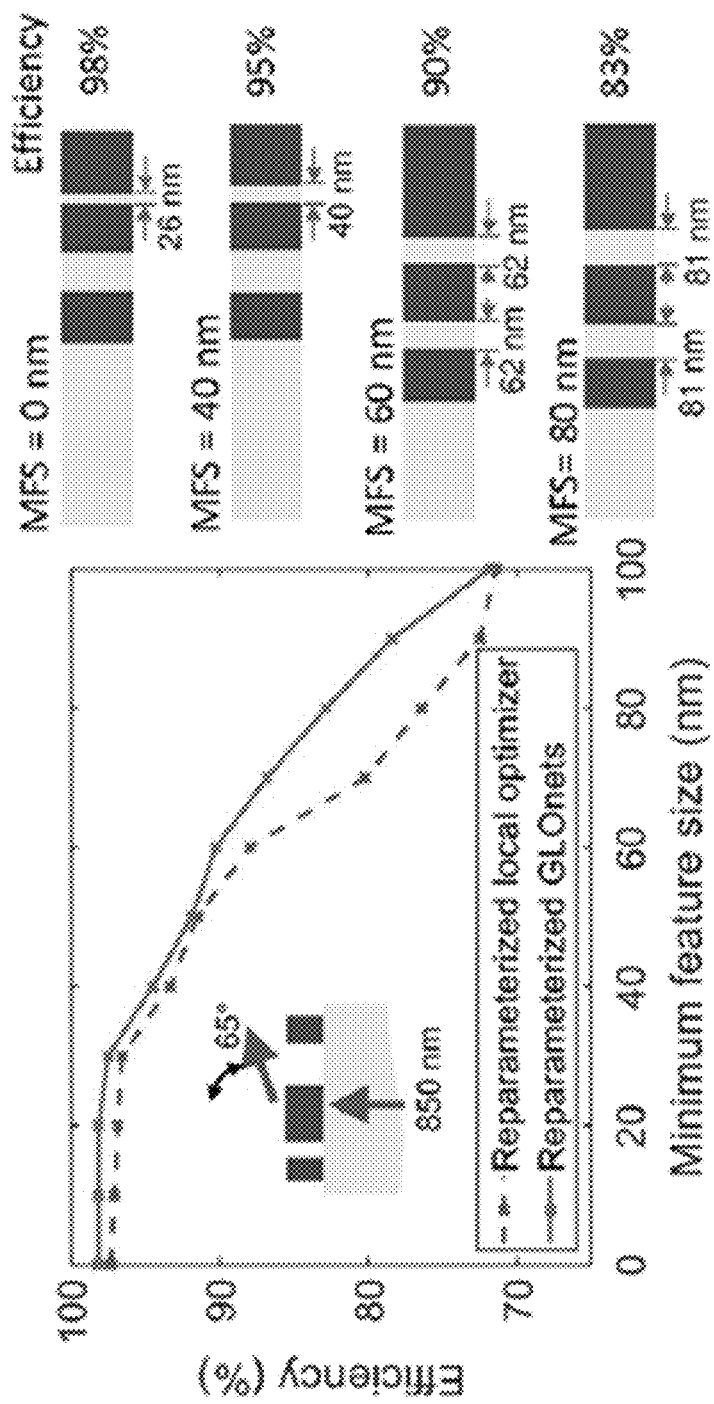
FIG. 12A illustrates a benchmark comparison of devices designed using reparameterized GLOnets and the reparameterized local optimizer, for devices comprising three silicon ridges and parameters matching those in FIG. 7A.

FIG. 12A illustrates a benchmark comparison of devices designed using reparameterized GLOnets and the reparameterized local optimizer, for devices comprising three silicon ridges and parameters matching those in FIG. 7A. To further map out the metagrating design space, sets of devices with differing MFSs and topologies are optimized. Globally and locally optimized devices containing three silicon ridges, and the results are summarized in FIG. 12A. Each data point in the reparameterized GLOnets curve represents the best device from a single trained network, while each data point in the reparameterized local optimizer curve represents the best of 100 individual optimizations. All data points are calculated using the same number of RCWA simulations. A comparison between these curves indicates that GLOnets consistently outperform the local optimizer for nearly all MFSs, demonstrating its ability to effectively perform global optimization. Both curves show a decrease in efficiency as the MFS constraint is increased, indicating that small features are advantageous in enhancing light diffraction efficiency. The presence of small features in high performing devices is visualized in images of the device layouts, which show that the best globally optimized devices possess at least one feature near or at the MFS length scale. For MFS constraints smaller than 20 nm, the reparameterized GLOnets generate the same optimal device with a deflection efficiency of 98%. This plateauing follows because the unconstrained globally optimal device has a MFS of 26 nm.

Figure 12B:
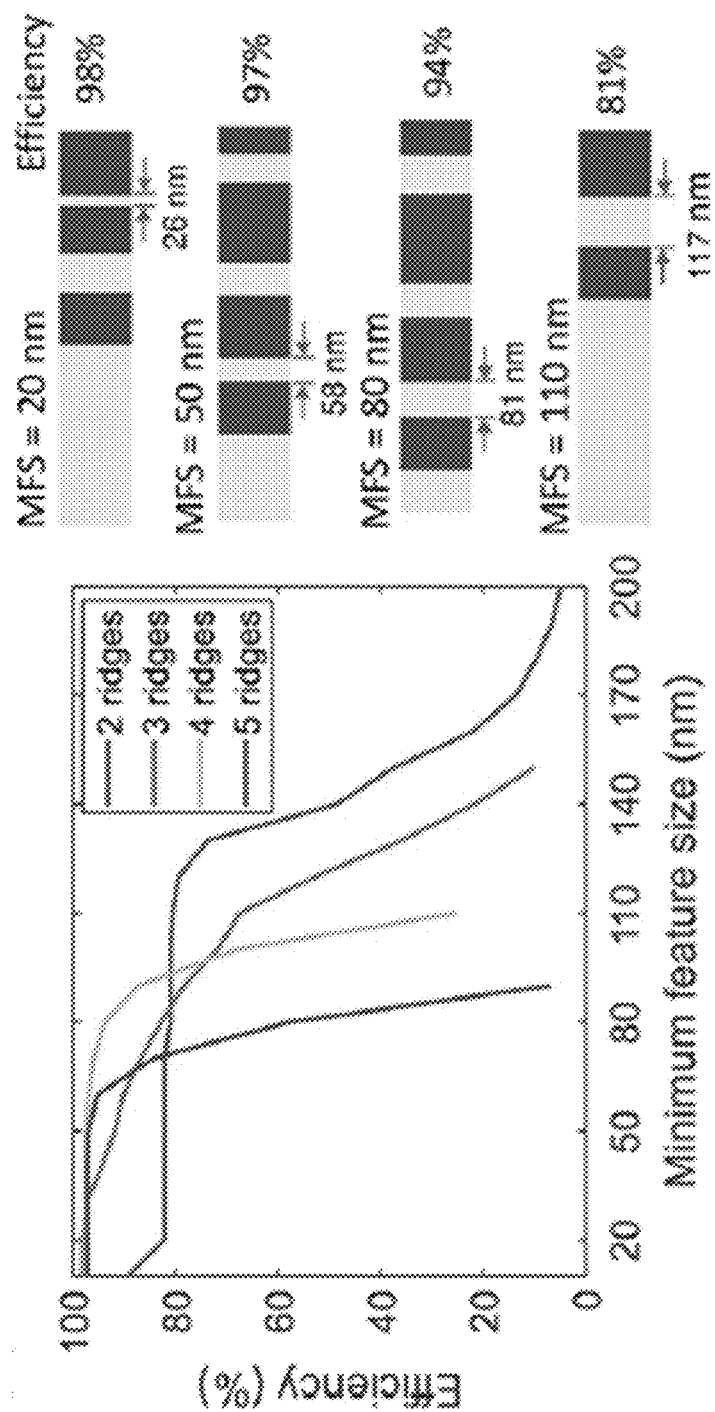
FIG. 12B illustrates a plot of GLOnets-designed device efficiencies for differing device topologies. The topology of the globally optimized device strongly depends on the MFS constraint.

FIG. 12B illustrates a plot of GLOnets-designed device efficiencies for differing device topologies. The topology of the globally optimized device strongly depends on the MFS constraint. Globally optimized efficiencies for devices with differing topologies are summarized in FIG. 12B, together with layouts of the best devices for a given MFS constraint. These data indicate that the topology and layout of the best device is a strong function of MFS. For no constraints up to a 30 nm MFS, devices containing three silicon ridges produce the highest overall efficiencies. Devices with four and five ridges also have efficiencies near the global optimum and have the benefit of larger feature sizes. Above a MFS of 30 nm, the efficiencies of three ridge devices drop dramatically and the four and five ridge devices are optimal. Above an MFS of 90 nm, two ridge devices have the highest overall efficiency.

Figure 13:
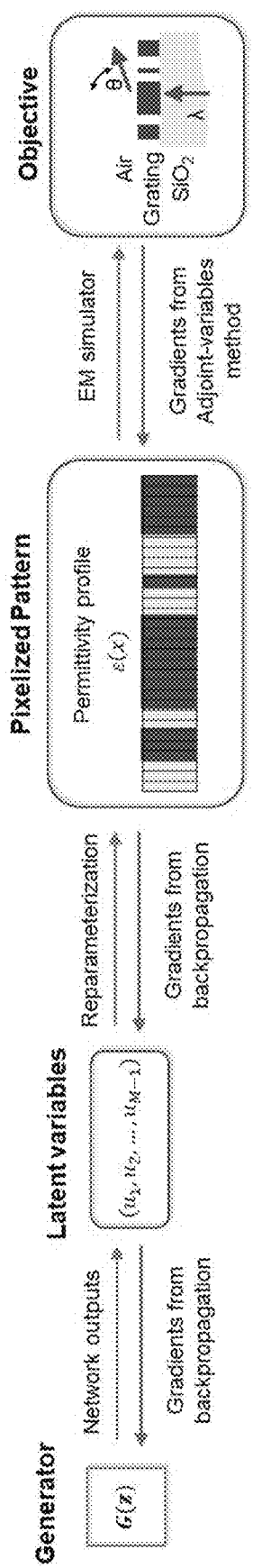
FIG. 13 illustrates a schematic for an inverse design method with reparameterization which receives input from a generator in accordance with an embodiment of the invention.

FIG. 13 illustrates a schematic for an inverse design method with reparameterization which receives input from a generator in accordance with an embodiment of the invention. This inverse design method is similar to the method described in connection with FIG. 3 and the overlapping steps will not be repeated. A generator may be used to generate base parameters ($u_1, u_2, \ldots, u_{N-1}$) without constraints, and constraints may be naturally imposed through mapping from base parameters to device patterns. Instead of directly generating a distribution of pixelized patterns, the generator uses generative networks to generate a distribution of devices in the latent variable space $\{u_i\}$. The generator iteratively trains with gradients backpropagated from the latent variables. Since the dimensionality of the latent variable space is reduced by orders of magnitude when compared to the original device space described with pixels, the generative network may be trained with a reduced batch size while still maintaining a thorough search of the design space. The differentiable nature of all the reparameterization functions improves the feasibility of gradient backpropagation in the proposed scheme.

Figure 14B:
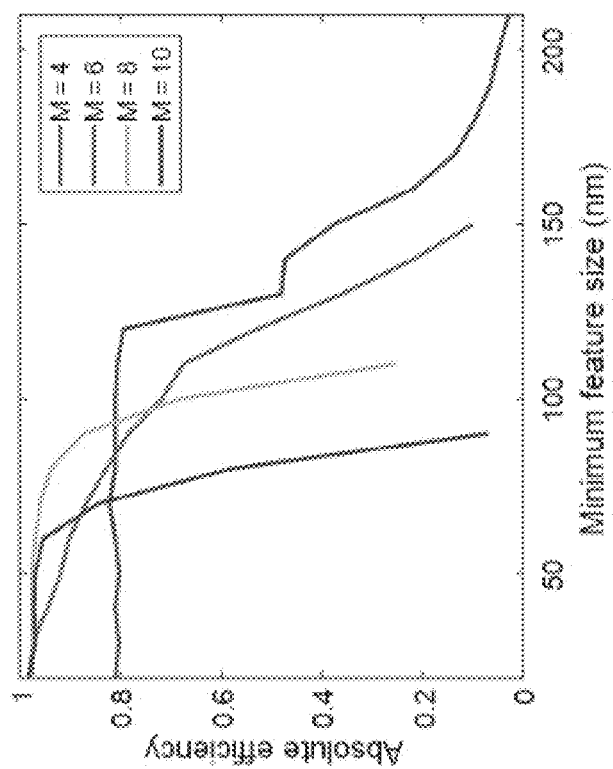
FIG. 14B illustrates globally optimized device efficiencies as a function of minimum feature size.
Figure 14A:
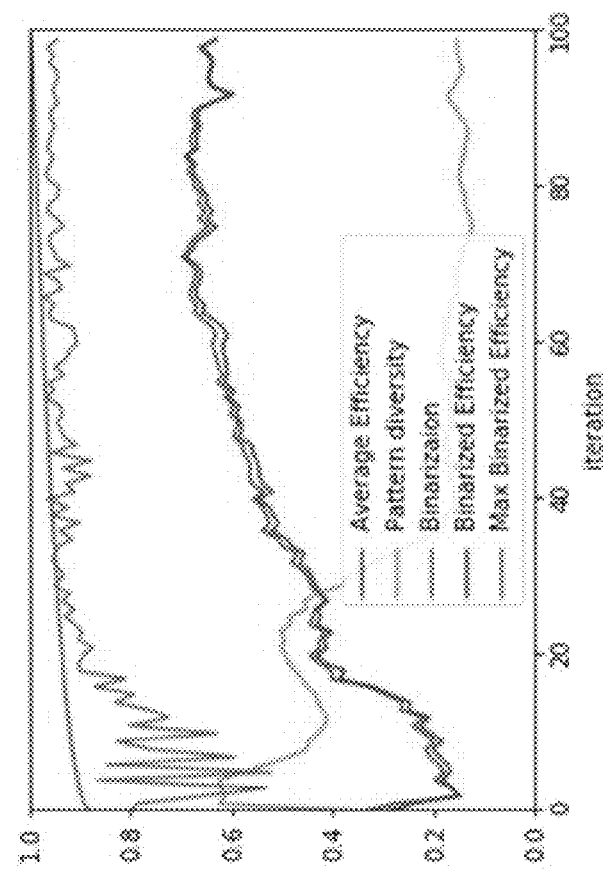
FIG. 14A shows an example generator training process for a 65° deflector at wavelength 850 nm with a minimum feature size of 30 nm.

FIG. 14A shows an example generator training process for a 65° deflector at wavelength 850 nm with a minimum feature size of 30 nm. The purple curve shows the efficiency of the best performed device out of a batch of 100 devices over the course of training. By the end of a 100-itertation-training, the maximal efficiency goes to above 0.95. Meanwhile, the binarization of the device shown as the green curve ends at 1, indicating a fully binarized pattern.

Figure 14D:
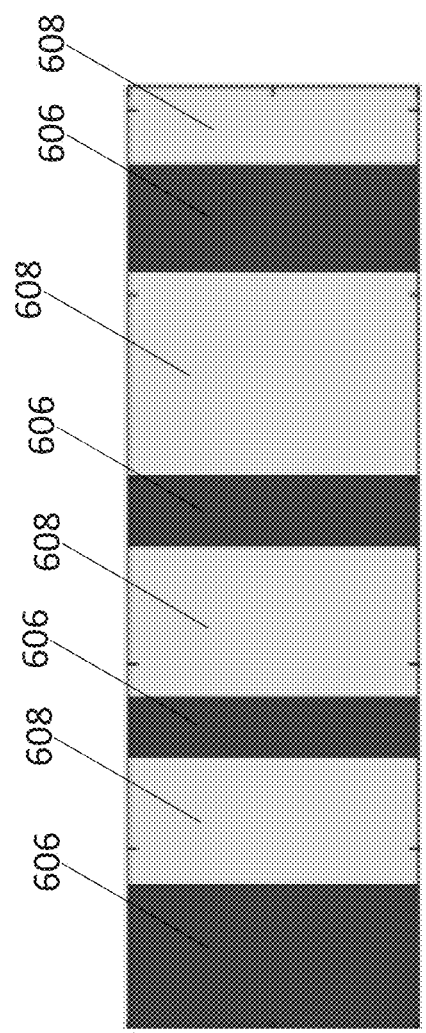
FIG. 14D illustrates a plan view of an optimized metagrating with minimum feature size of 50 nm with the highest absolute efficiency.
Figure 14C:
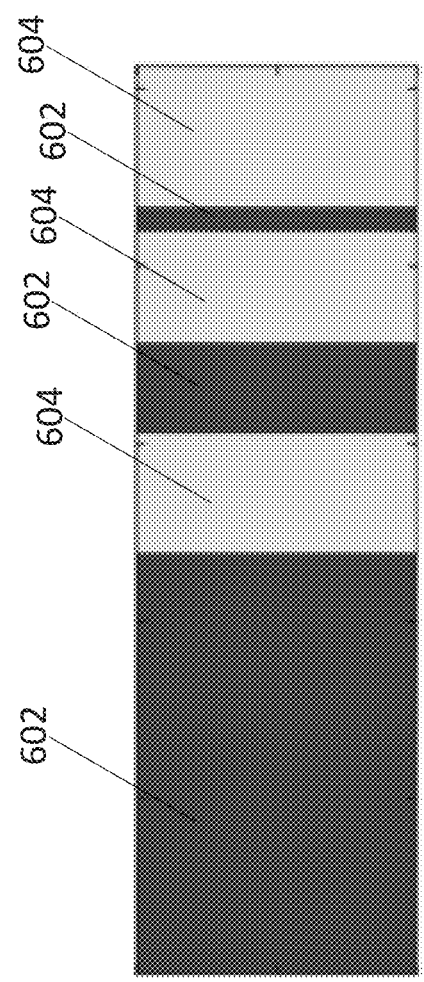
FIG. 14C illustrates a plan view of an optimized metagrating with minimum feature size of 20 nm with the highest absolute efficiency.

FIGS. 14B-14D illustrates various results of reparametrized with various minimum feature sizes. FIG. 14B illustrates globally optimized device efficiencies as a function of minimum feature size. Different colored curves indicate different topologies of the metagrating where M=the total number of bars of air and silicon. As illustrated, with a fixed topology, the efficiency of the globally optimized devices may decrease as the minimum feature size constraint increases. With different minimum feature size constraint, the globally optimized devices can have different topology, and certain topology may be favored at certain minimum feature sizes. For example, the globally optimized devices has three silicon bars or ridges (M=6) at 20 nm minimum feature size and four silicon bars or ridges (M=8) at 50 nm minimum feature size.

FIG. 14C illustrates a plan view of an optimized metagrating with minimum feature size of 20 nm with the highest absolute efficiency. This metagrating has three silicon bars 602 and three air bars 604 and has an absolute efficiency of 98.1%.

FIG. 14D illustrates a plan view of an optimized metagrating with minimum feature size of 50 nm with the highest absolute efficiency. This metagrating has four silicon bars 606 and four air bars 608 and has an absolute efficiency of 96.5%.

Fabrication Imperfections Enforced with Reparameterization

Devices that satisfy MFS constraints still may not guarantee good experimental performance as the device could be sensitive to other types of fabrication imperfections. Robustness to fabrication imperfections can be readily incorporated into reparameterized GLOnets. In some embodiments robustness may be incorporated in fixed-topology reparameterized GLOnets. In some embodiments, robustness may be incorporated in variable-topology reparameterized GLOnets. Robustness criteria are practically important due to geometric imperfections arising from all experimental fabrication processes. In some cases, geometrically eroded and dilated versions of the devices in the FoM may be used to account for fabrication imperfections.

Figure 15A:
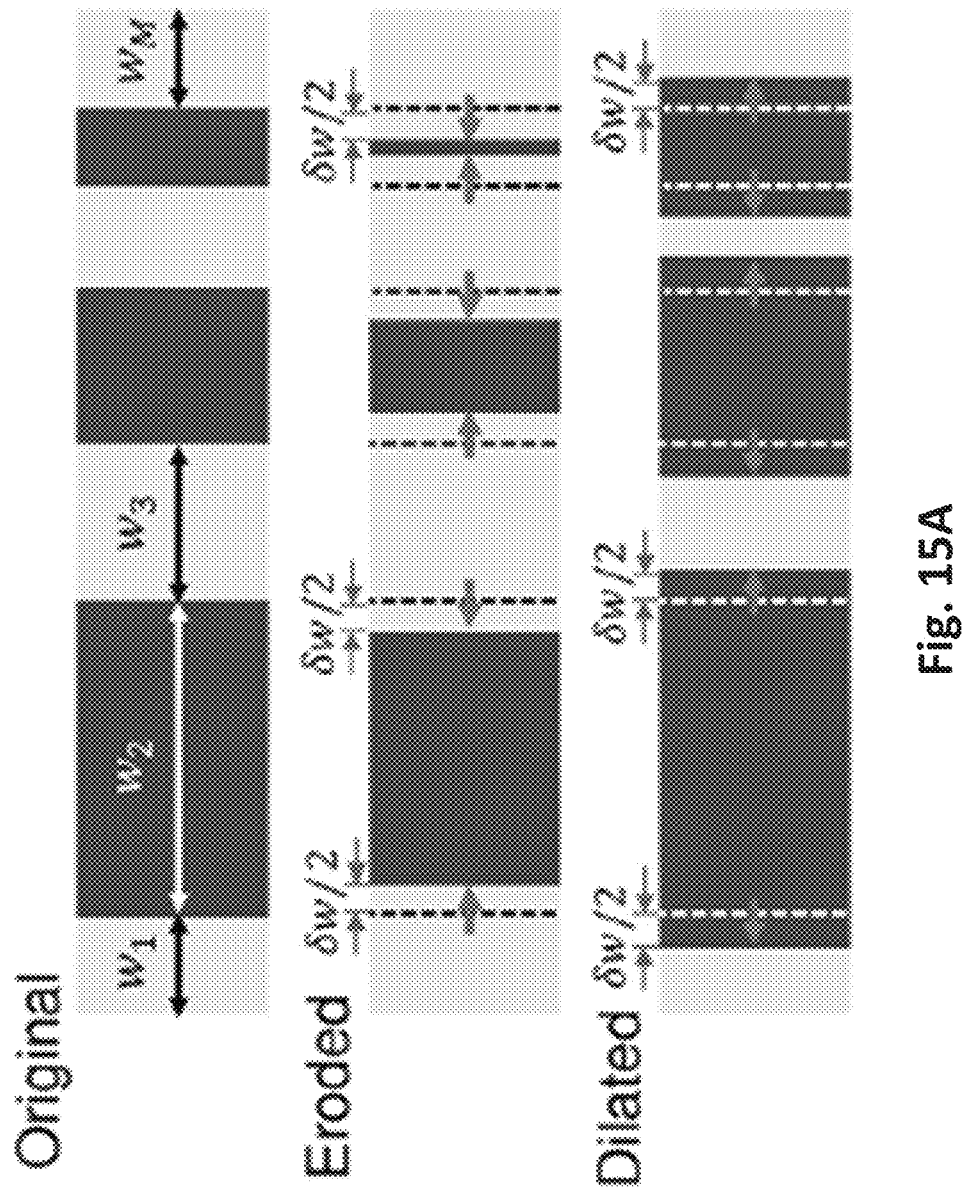
FIG. 15A illustrates various schematics of metagratings including fabrication imperfections modeled by the erosion and dilation of device layouts, which is parametrized by δw.

FIG. 15A illustrates various schematics of metagratings including fabrication imperfections modeled by the erosion and dilation of device layouts, which is parametrized by δw. The pixelized patterns ε(x) generated from the width vector w, eroded devices may be realized by decreasing the silicon ridge widths by a width variation εw and increasing the air gap widths by Ow, and they may be represented by width vector $w_e$. Dilated devices may be realized by performing the opposite geometric transformations and are represented by width vector $w_d$. The new FoM used in the GLOnets loss function is the weighted average deflection efficiency and is defined to be:

$$Eff_{avg} = 0.5 \times Eff_{original} + 0.25 \times Eff_{eroded} + 0.25 \times Eff_{dilated} \quad (7)$$

$$Eff_{avg} = 0.5 \times Eff(w) + 0.25 \times Eff(w_e) + 0.25 \times Eff(w_d) \quad (11)$$

Fixed-topology reparameterized GLOnets with robustness may be used to globally optimize a metagrating with a MFS constraint of 30 nm and δw=10 nm. The device may operate with a wavelength of 850 nm and deflection angle of 65 deg, and the topology may be fixed to contain three silicon ridges.

Figure 15B:
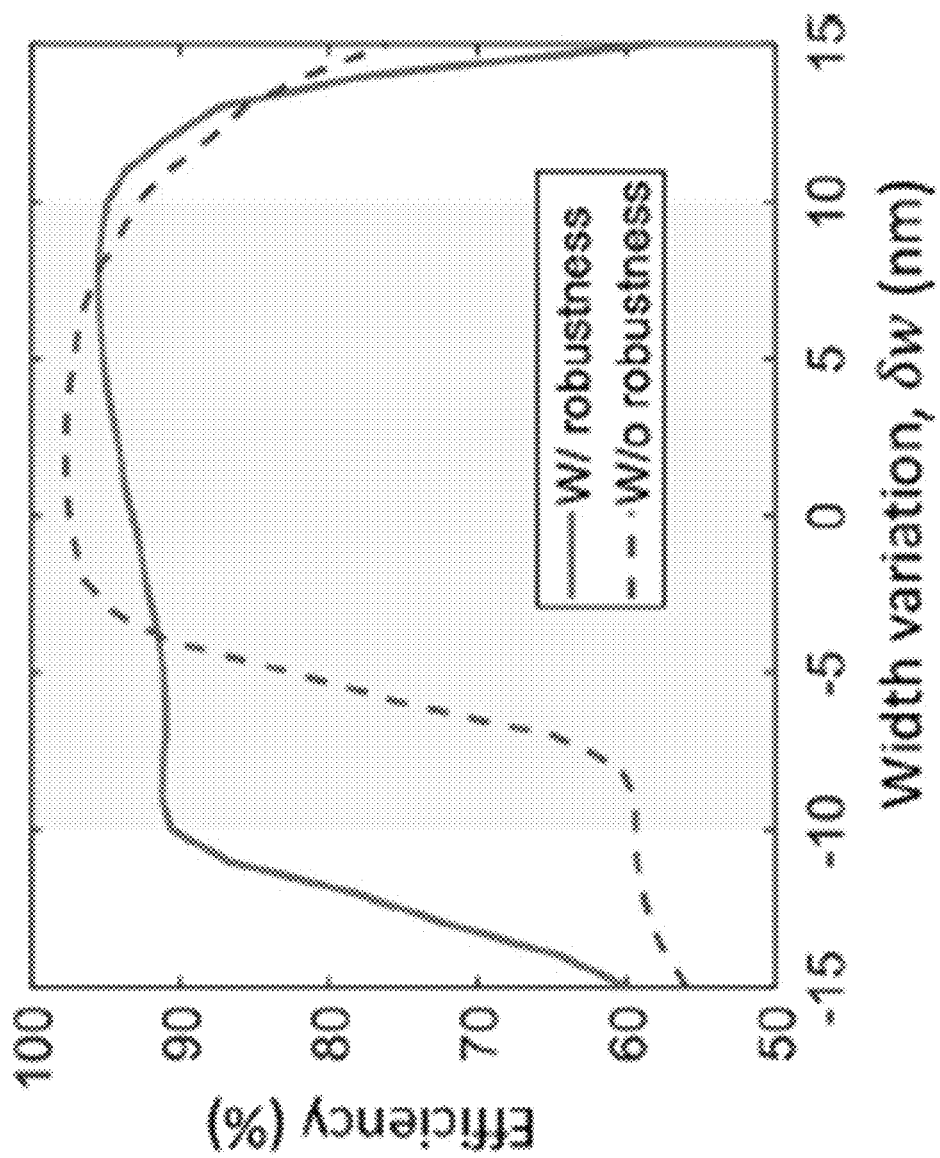
FIG. 15B illustrates various plots comparing performance of devices globally optimized with and without robustness.

FIG. 15B illustrates various plots comparing performance of devices globally optimized with and without robustness. The device has a minimum feature size constraint of 30 nm, wavelength of 850 nm, and a deflection angle of 65 deg, and the robust devices are designed to accommodate δw=10 nm. The deflection efficiency of the globally optimized device as a function of width variation is plotted in FIG. 15B and shows that the device operates with a relatively high efficiency above 90% for width variations within ±10 nm. In comparison, the globally optimized device without robustness has a higher overall peak efficiency when no width variation is present, but the efficiency rapidly decreases for negative width variations. Variable-topology reparameterized GLOnets with robustness may be as effective as fixed-topology reparameterized GLOnets with robustness at generating robust devices.

Given that the final pixelized pattern ε(x) may be generated from the width space {$w_i$}, fabrication imperfections may be defined in terms of pattern erosion (width of Si ridge decreases and width of air gap increases) and dilation (width of Si ridge increases and width of air gap decreases). In some embodiments, an averaged deflection efficiency may be defined as the figure of merit to reflect fabrication robustness where during each iteration the efficiency of multiple devices (e.g. three devices) may be averaged. The multiple devices may include:

The device with the original pattern,

The device with width of Si ridges increasing 10 nm each, and

The device with width of air gaps increasing 10 nm each.

Figure 16A:
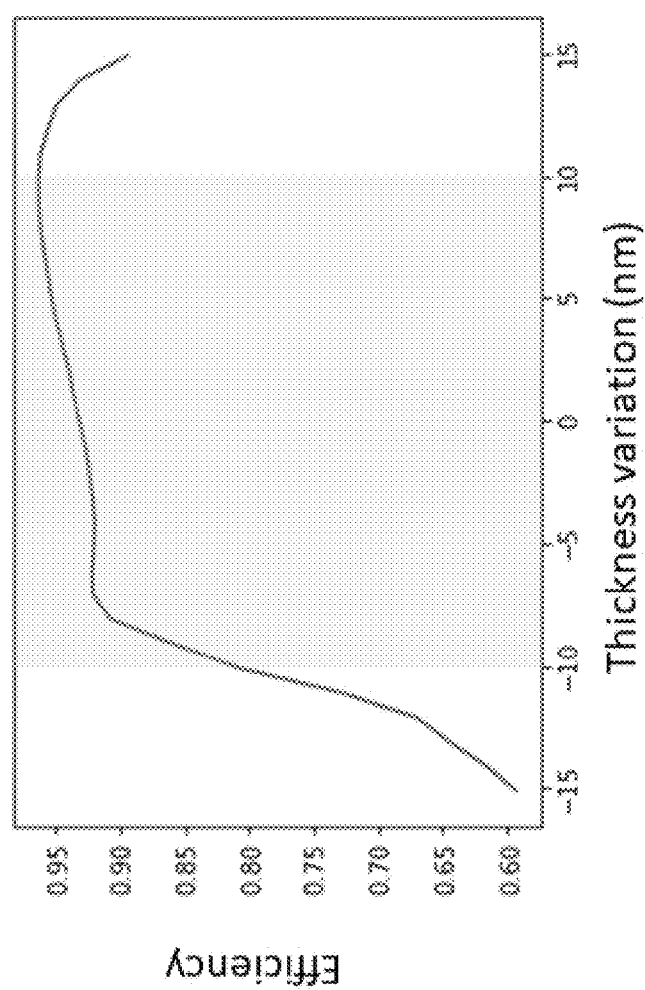
FIG. 16A is a plot illustrating efficiency of a globally optimized device generated with reparameterization and accounting for fabrication imperfections at a minimum feature size of 30 nm.
Figure 16B:
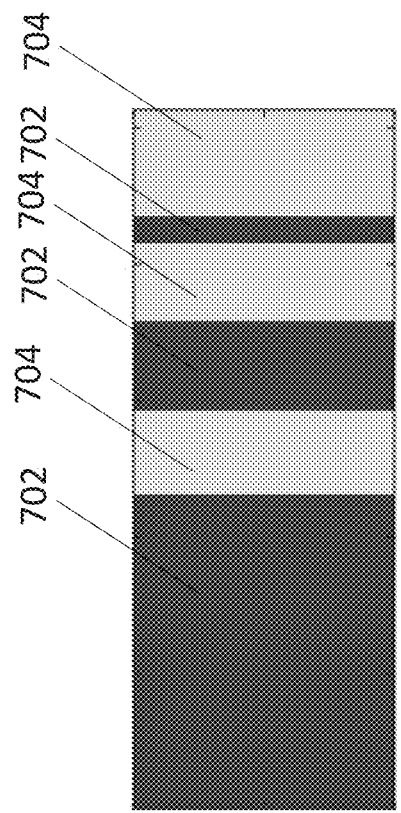
FIG. 16B illustrates a plan view of the optimized device without fabrication robustness.

In this way, robustness to fabrication imperfections may be introduced to the design space constrained with minimum feature size. FIG. 16A is a plot illustrating efficiency of a globally optimized device generated with reparameterization and accounting for fabrication imperfections at a minimum feature size of 30 nm. FIG. 16B illustrates a plan view of the optimized device without fabrication robustness. The device includes three silicon bars 702 which are interleaved with three air bars 704. This optimized device includes an absolute efficiency of 97.7%.

Figure 16C:
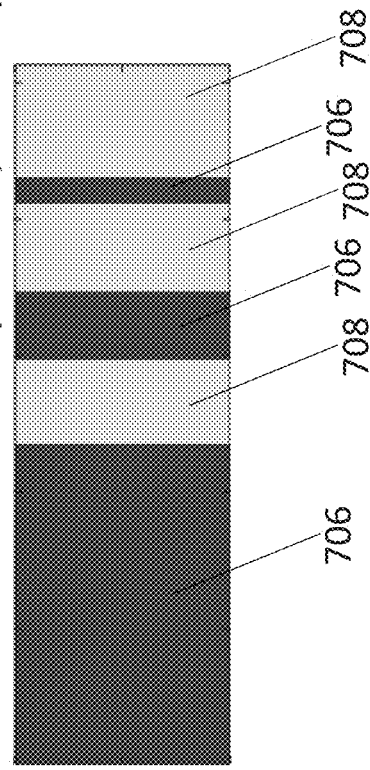
FIG. 16C illustrates a plan view of the optimized device with fabrication robustness and a minimum feature size of 30 nm.

FIG. 16C illustrates a plan view of the optimized device with fabrication robustness and a minimum feature size of 30 nm. The device includes three silicon bars 706 which are interleaved with three air bars 708. Comparing with the non-robust device, the robust device shares a very similar pattern and maintains a high-level performance of 0.928 average efficiency within ±10 nm of pattern variation.

Optimization of Photonics Thin Film Stacks

Figure 17:
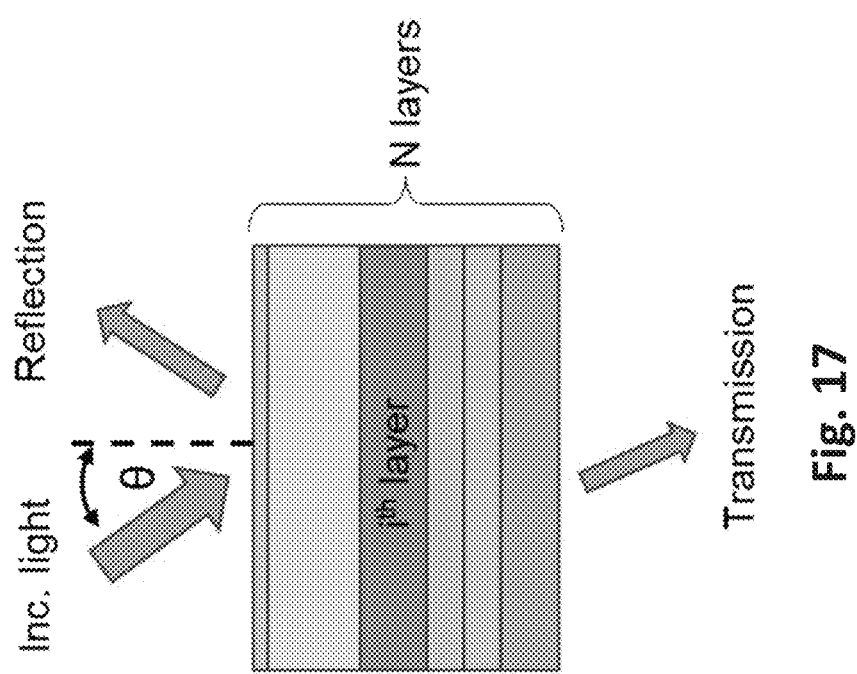
FIG. 17 illustrates an example schematic of a photonic thin film stack.

In some embodiments, the optimization techniques may be used to optimize optical devices such as photonic thin film stacks. Thin film stacks have been used in many optical systems. FIG. 17 illustrates an example schematic of a photonic thin film stack. The materials and thickness of thin film layers may be optimized to achieve an advantageous reflection spectrum. The number of thin film layers may be fixed to be N. The refractive indices of N-layer thin film stack are denoted as a vector $n(\lambda)=(n_1(\lambda), n_2(\lambda), \ldots, n_N(\lambda))^T$, while the thicknesses are $t=(t_1, t_2, \ldots, t_N)^T$. Each layer may be one of M types of materials $n_i(\lambda) \in \{m_1(\lambda), m_2(\lambda), \ldots, m_M(\lambda)\}$. Optimization may be performed to determine the proper n and t to achieve advantageous reflection over the wavelength bandwidth, incident angle range and specified polarization based on Equation 5:

$$\{n^*, t^*\} = \arg\min_{\{n,t\}} \Sigma_{\lambda,\theta,pol}(\mathcal{R}(n,t|\lambda,\theta,pol) - \mathcal{R}^*(\lambda,\theta,pol))^2 \quad (5)$$

The desired reflection spectrum is denoted as $\mathcal{R}^*(\lambda,\theta,pol)$. The objective may be described to determine Equation 6:

$$O(n,t) = \Sigma_{\lambda,\theta,pol}(\mathcal{R}(n,t|\lambda,\theta,pol) - \mathcal{R}^*(\lambda,\theta,pol))^2 \quad (6)$$

Figure 18:
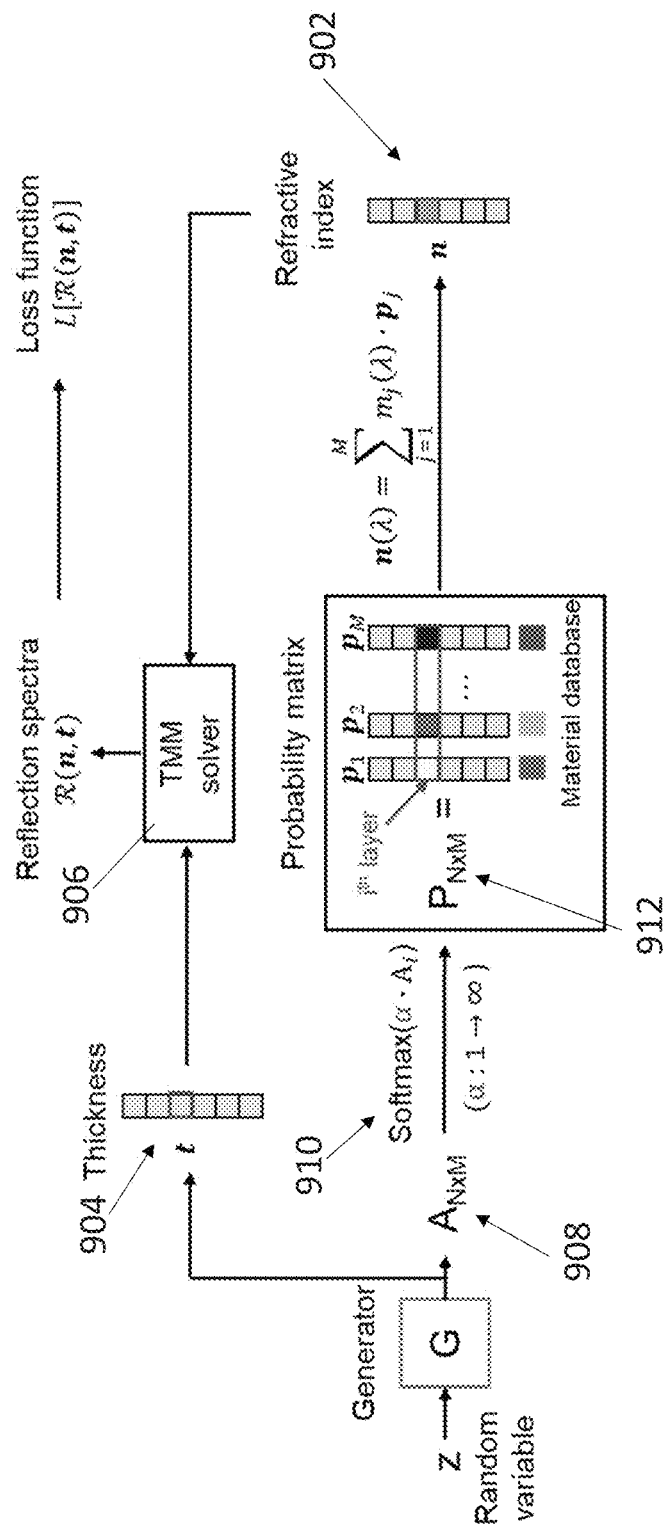
FIG. 18 illustrates a flow chart of an example global optimization algorithm using a TMM in accordance with an embodiment of the invention.

To determine the optimization, a global optimization algorithm may be used. In some embodiments the optimization algorithm may be a transfer matrix method (TMM). FIG. 18 illustrates a flow chart of an example global optimization algorithm using a TMM in accordance with an embodiment of the invention. The first step may be to figure out the calculation of the reflection gradient with respect to refractive indices 902 and the thicknesses 904. Since the reflection spectrum of the thin film stack can be calculated using TMM, the gradient can be directly obtained by the chain rule. Therefore, a TMM solver 906 may be programmed using an auto-differentiation package such as Pytorch.

Figure 19:
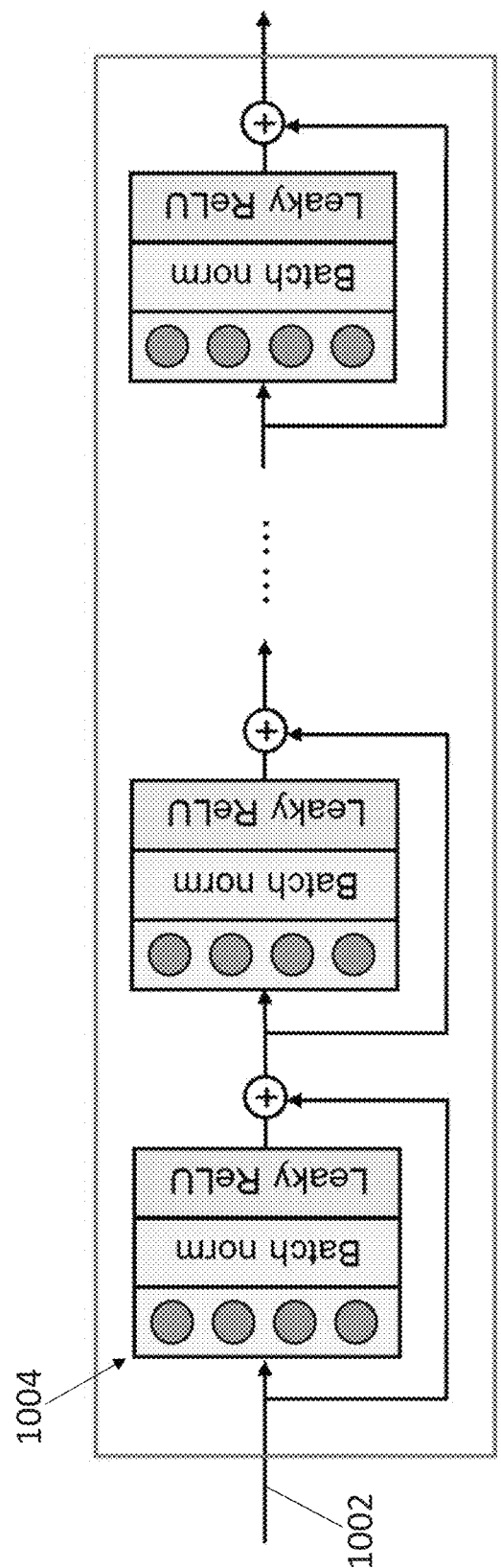
FIG. 19 illustrates a generative neural network used to produce a distribution of thin film stack configurations.

In some embodiments, a generative neural network may be used to determine a distribution of thin film stack configurations. FIG. 19 illustrates a generative neural network used to produce a distribution of thin film stack configurations. An input 1002 may be a uniformly distributed random vector z. Different $z^{(k)}$ may map onto different thin film stack configurations specified as refractive indices and thicknesses, denoted as $\{n^{(k)}, t^{(k)}\}$. And their reflection spectra $\mathcal{R}(n^{(k)}, t^{(k)}|\lambda, \theta, pol)$ may then be calculated by the TMM solver 906. The global optimization problem may be reframed as optimizing the distribution of outputted configurations. The optimization objective or the loss function may be defined by Equation 7:

$$L = \mathbb{E}\left[\exp\left(-\frac{o(n,t)}{\sigma}\right)\right] \approx \frac{1}{K}\sum_{k=1}^{K}\exp\left(-\frac{o(n^{(k)}, t^{(k)})}{\sigma}\right) \quad (7)$$

The gradient of the loss function with respect to the neuron weights may be calculated by propagation, and the generator may then be optimized by gradient descent. After optimization, the distribution of thin film stack configurations may converge to a delta function located at the global optimum.

In practice, the refractive indices of thin film layers may not take arbitrary values and may be chosen from a material database and thus n may be a categorical variable. However, the gradients may not be calculated for categorical variables. To overcome this issue, a new scheme to generate refractive indices is illustrated in FIG. 18. As illustrated, the network first maps the random vector z onto an N-by-M matrix A 908 and then applies a Softmax function 910 to each row of matrix A 908 to generate a probability matrix P 912. An example Softmax function 910 is represented as Equation 8:

$$P_{ij} = \frac{\exp(\alpha \cdot A_{ij})}{\sum_{j=1}^{M}\exp(\alpha \cdot A_{ij})} \quad (8)$$

α is a hyperparameter to tune the sharpness of the Softmax function 910. The $i^{th}$ row of probability matrix P 912 is a 1×M vector, which represents the probability distribution over the material database for the $i^{th}$ layer. Then the expected refractive index of each layer given by this probability distribution is calculated by $n_i(\lambda)=\Sigma_{j=1}^{M} m_j(\lambda)\cdot P_{ij}$, which is a continuous variable with the valid gradient. As such, the gradient with respect to the refractive index $n_i$ may be backpropagated to the probability matrix P 912 and then the neurons. In addition, to ensure the material probability distribution of each layer converges to only one material, the hyperparameter a may increase over the course of optimization.

Since the desired reflection spectra usually cover a wide range of wavelengths and incident angles, finding the proper thin film configuration may be complex and challenging. A deep neural network may be beneficial to produce complex distributions in the design space in the early stage of optimization, while the ability to express a relatively simple distribution is also important for smooth convergence at the end. FIG. 19 illustrates an example deep residual network for the generator architecture. The generator may include many residual blocks 1004. The input and the output of each residual block 1004 may have the same dimension and a skip connection. The skip connection may be represented as $x_{out}=f(x_{in})+x_{in}$, where $f(x_{in})$ represents the fully connected layer, batch normalization layer, and a non-linear activation layer. In some embodiments, the non-linear activation layer may be a Leaky ReLU. Skip connections may allow a deep neural network to degrade to a shallow neural network by skipping many network layers.

Examples Optimization of Photonic Thin-Film Stack

Figure 20:
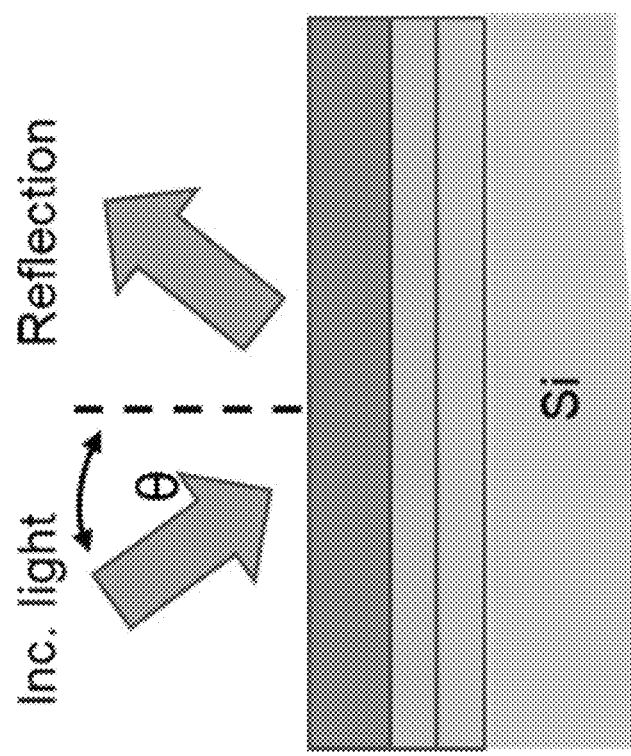
FIG. 20 illustrates a cross sectional view of the resultant structure from the optimization.
Figure 21:
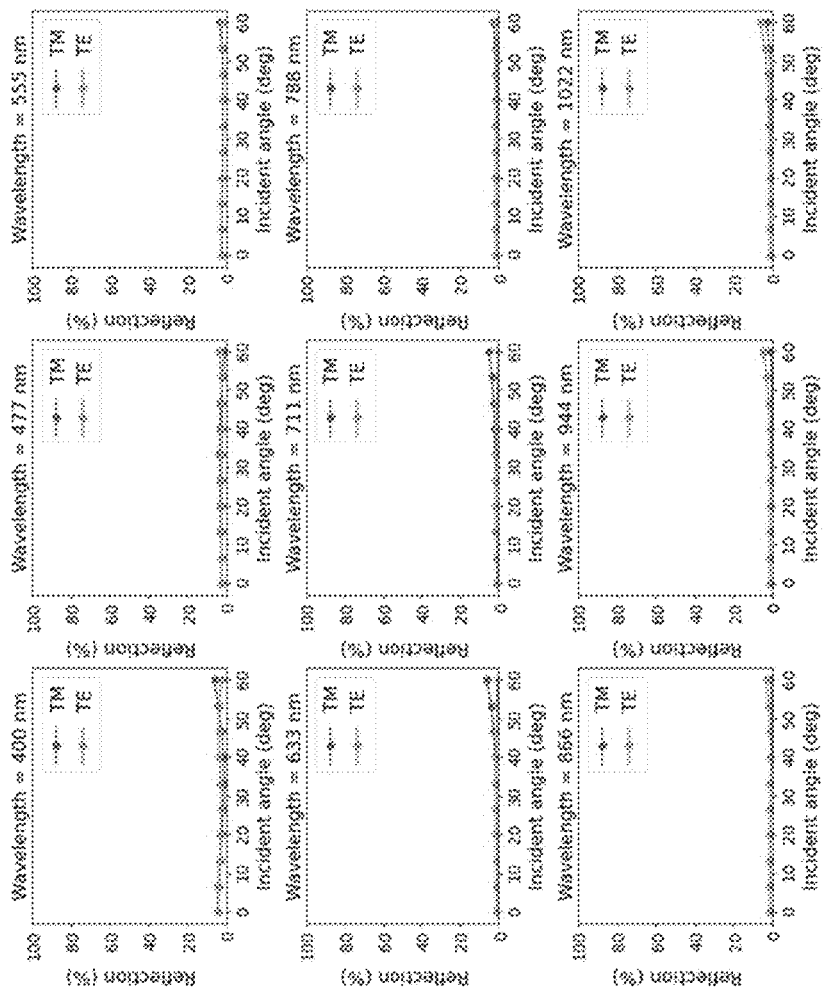
FIG. 21 illustrates various plots of the results for various wavelengths across angles between 0° and 60°.

A 3-layer thin film stack forming a three-layer AR coating for Si was designed to minimize average reflection from silicon over the incident angle range between 0° and 60° and the wavelength range between 400 nm and 1100 nm. The refractive index was between 1.09 and 2.60 and the thicknesses were between 0 nm and 200 nm of each layer. FIG. 20 illustrates a cross sectional view of the resultant structure from the optimization. FIG. 21 illustrates various plots of the results for various wavelengths across angles between 0° and 60°. Other algorithms have been observed to take over 19 days of CPU computation for the optimization. A multistart gradient optimizer may take 15 minutes to find the global optimum. The disclosed generative neural network solved for the global optimum in less than one minute with a single GPU, demonstrating its efficiency and efficacy.

Figure 22:
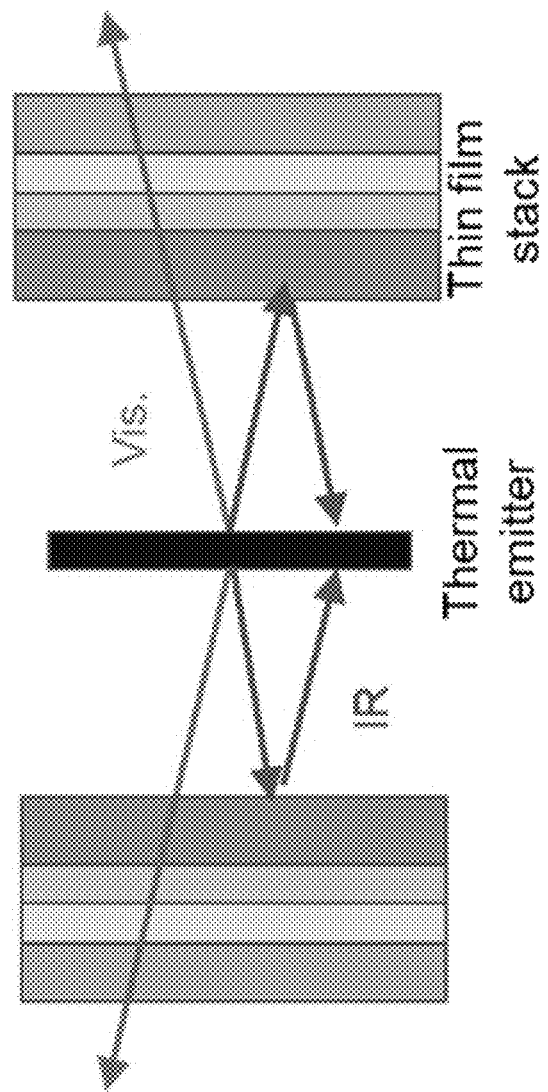
FIG. 22 illustrates the results from another example optimization performed to an incandescent light bulb filter that transmits visible light and reflects infrared light.
Figure 23:
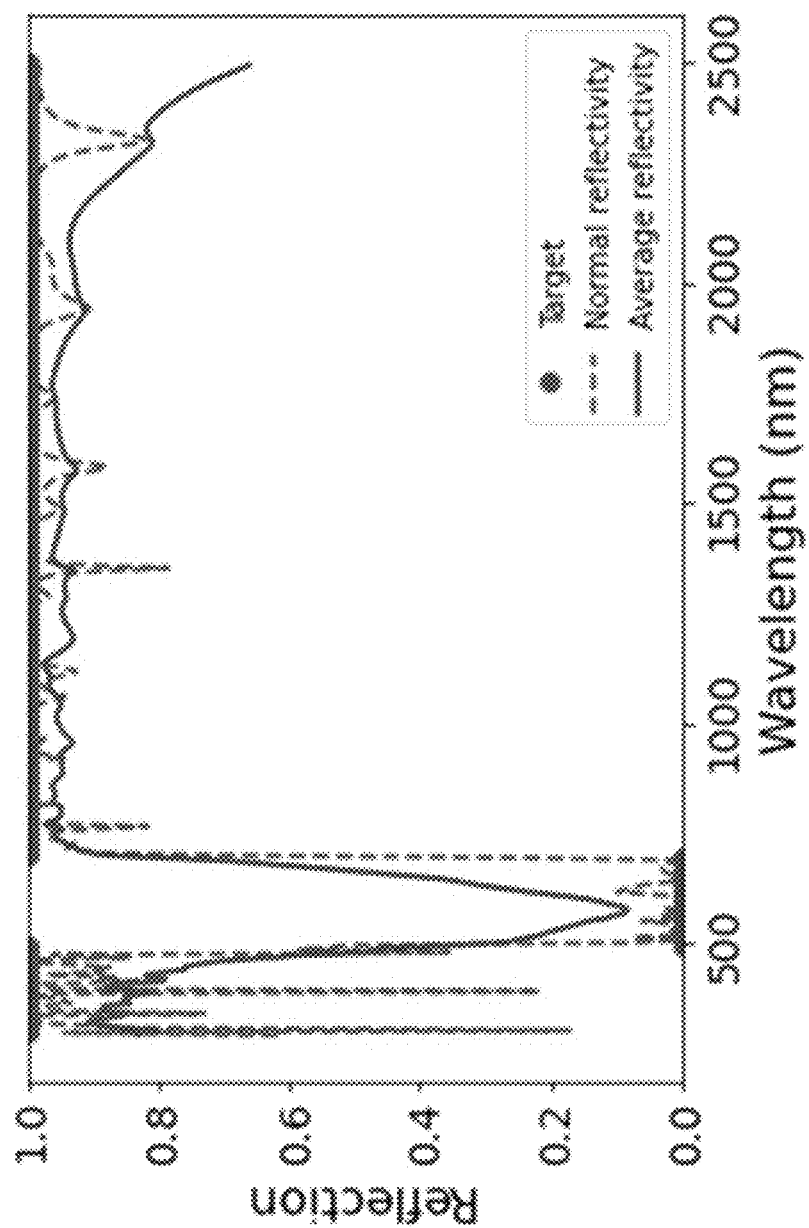
FIGS. 23 and 24 illustrate the broadband reflection characteristics of a 45-layer generative neural network optimized device.
Figure 24:
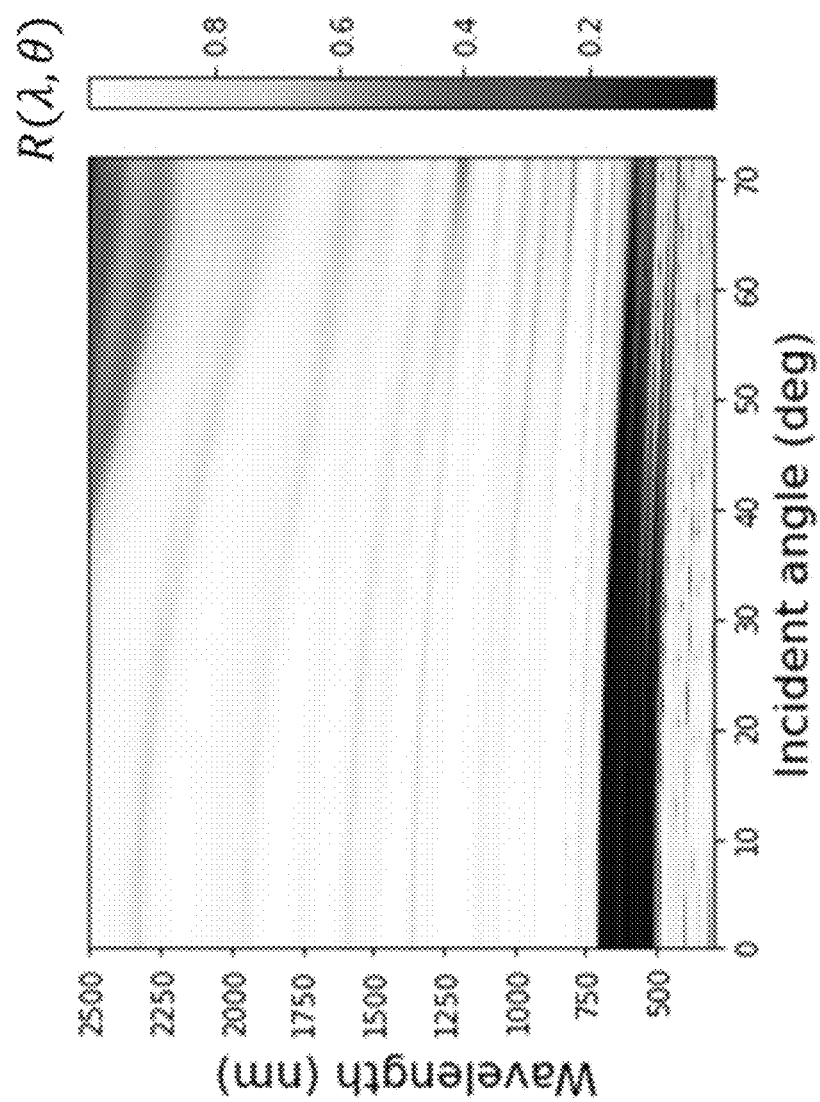
Figure 25:
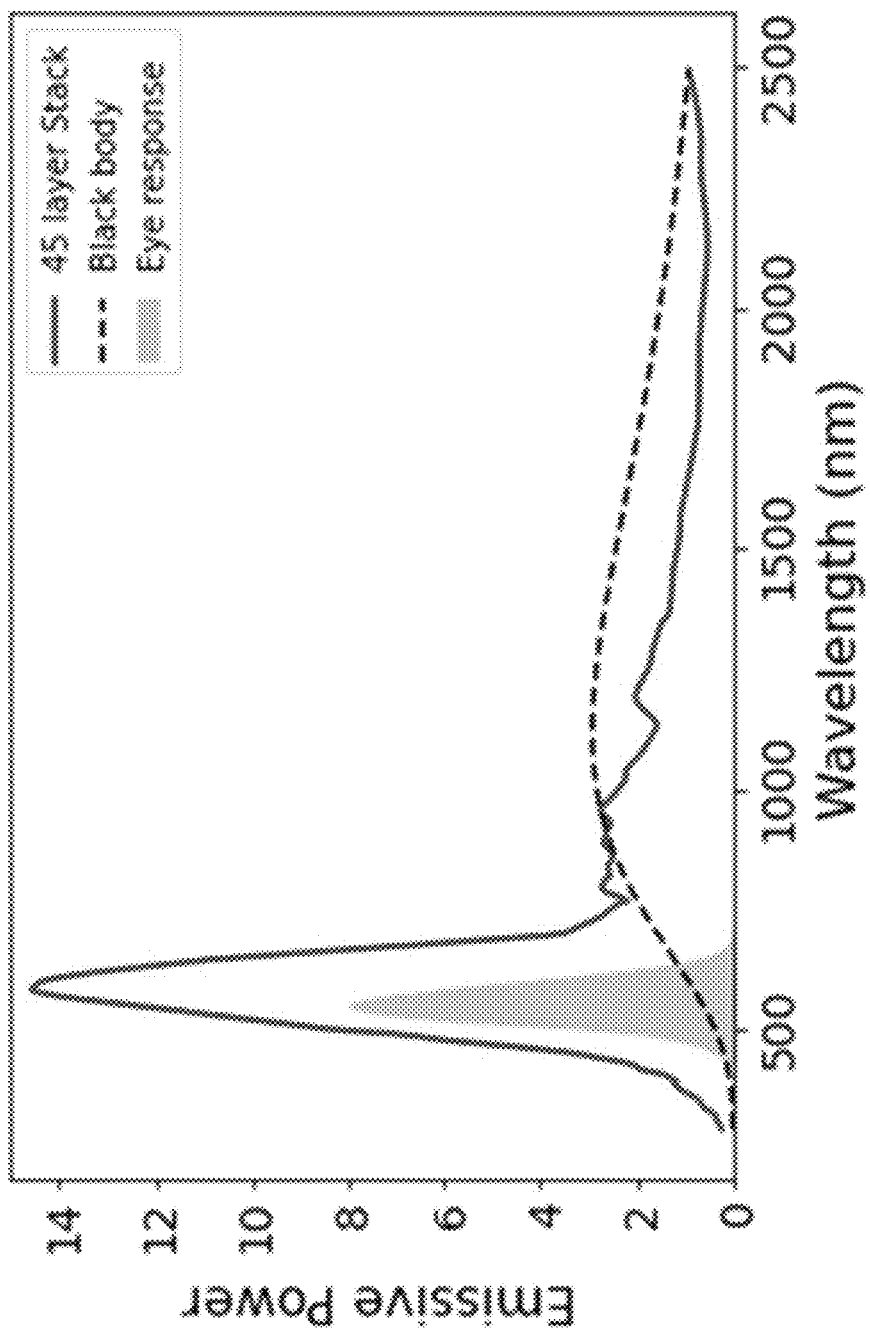
FIG. 25 illustrates the emission intensity spectrum of the light bulb with and without the thin film filter.

FIG. 22 illustrates the results from another example optimization performed to an incandescent light bulb filter that transmits visible light and reflects infrared light. The reflected infrared light can be recycled to heat up the thermal emitter and thus the emitter is able to achieve a higher temperature while consuming a lower input power. The emission efficiency in the visible range can be enhanced in this way. The material database includes seven different dielectric material types: magnesium fluoride, silicon dioxide, silicon carbide, silicon mononitride, aluminum oxide, hafnium dioxide, and titanium dioxide. FIGS. 23 and 24 illustrate the broadband reflection characteristics of a 45-layer generative neural network optimized device. As illustrated, the device operates with nearly ideal transmission at wavelengths between 500 nm and 700 nm and nearly ideal reflection at near-infrared wavelengths, for both normal incidence and for incidence angles averaged over all possible solid angles. FIG. 25 illustrates the emission intensity spectrum of the light bulb with and without the thin film filter. To measure the enhancement of visible light emission due to the thin film filter, the emissivity enhancement factor $\chi$ is computed:

$$\chi = \frac{\int_0^\infty E_{emitter+stack}(P_0, \lambda)V(\lambda)d\lambda}{\int_0^\infty E_{emitter}(P_0, \lambda)V(\lambda)d\lambda}$$

$P_0$ is the input power and $V(\lambda)$ denotes the eye's sensitivity spectrum. The generative neural network optimized device achieved $\chi$ of 18.0 compared with a genetic algorithm optimized device which achieved $\chi$ of 14.8. The generative neural network improved the performance by 22%.

Figure 26:
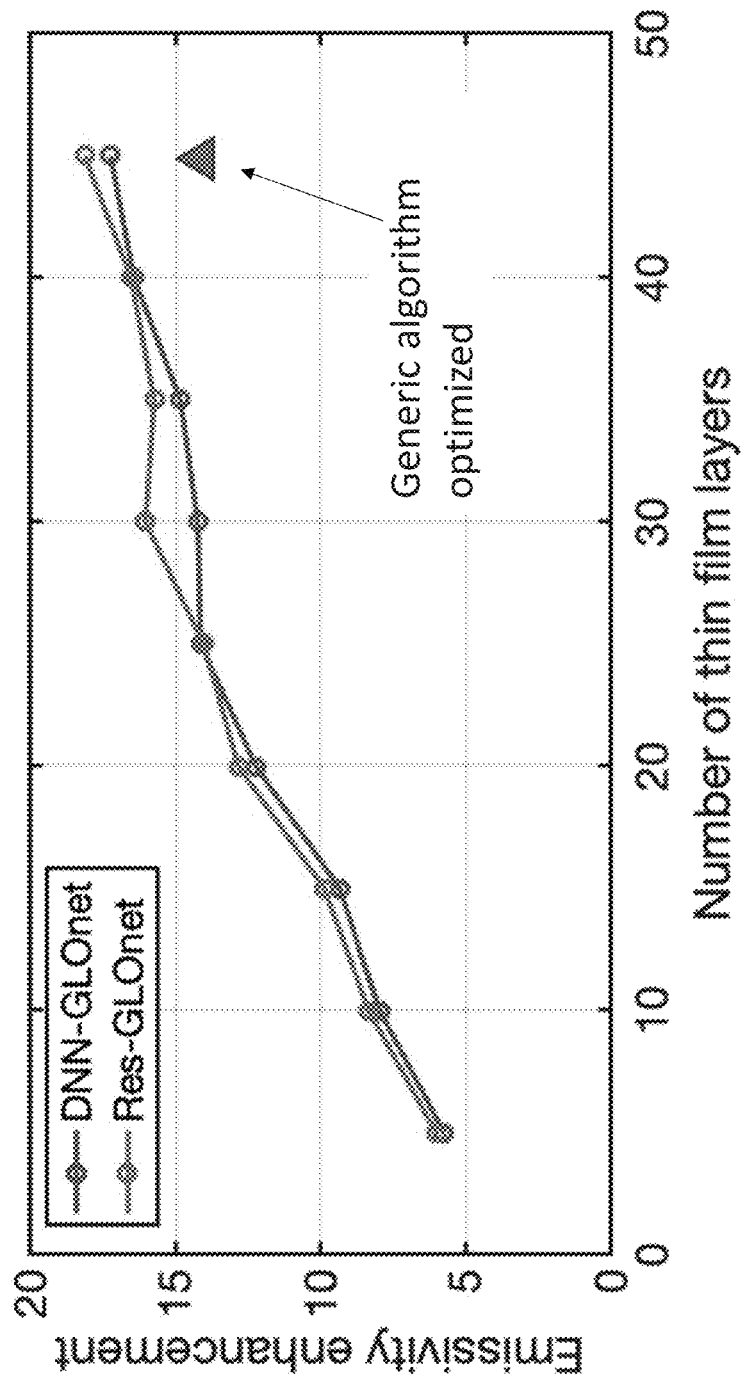
FIG. 26 is a chart comparing the results of a comparison of thin film filters generated using a residual global neural network, a deep global neural network, and a generic algorithm.

FIG. 26 is a chart comparing the results of a comparison of thin film filters generated using a residual global neural network, a deep global neural network, and a generic algorithm. The application of residual neural network to thin film filters including different number of layers and a comparison with a fully connected deep neural networks shows that residual neural network perform better in terms of finding optimized devices for non-convex problems. And for optimized devices with 45 layers, the neural network based algorithms clearly outperformed the genetic algorithm in optimization of the thin film filters. Furthermore, the neural network based algorithms optimizes devices with similar performance as devices optimized with the genetic algorithm with approximately two thirds the number of layers, which may allow for high levels of optimization with less layers thus decreasing manufacturing complexity.

Embodiments Including Optimization with Variable Topology

A global optimizer may benefit from the ability to search for the proper device topology as well as the detailed layout for that topology. Optimizers for fixed-topology devices can perform this task by parametrically sweeping across a wide range of topologies, as performed in FIG. 12B. But this route can be computationally intractable when scaling to complex systems. In some embodiments, reparameterized global optimization can combine concepts in boundary and topology optimization to globally optimize geometrically constrained devices with variable topology.

FIG. 27A illustrates a flowchart of a reparameterization process for a variable-topology global optimizer. Two separate generators 2702a, 2702b are used to produce distributions of width vectors 2704a and permittivity vectors 2704b, which are combined to produce constrained physical devices. As before, with fixed-topology optimization, the device permittivity profile is subdivided into $\hat{M}$ sections. However, instead of assuming that a given section is either silicon or air, each section was defined to have the parameters $(w_i, \hat{\varepsilon}_i)$, where $w_i$ denotes the section width 2706a and $\hat{\varepsilon}_i$ denotes the permittivity 2706b at the center of the section. A range of topologies can now arise because adjacent sections in the final binarized devices can have either the same or different permittivity value. The generalized permittivity profile 2708 of a device with the new scheme is calculated from the mapping function $\varepsilon=\hat{h}(x, w, \hat{\varepsilon}, T)$, where $\hat{h}$ is a piece-wise transformation.

FIG. 27B illustrates schematics of the piecewise transformation used for device reparameterization. The permittivity profile of the entire structure may be calculated by smoothly connecting the permittivity at the center of each section using a function similar to in Equation 4. It is advantageous to have the mapping function $\varepsilon=\hat{h}(x, w, \hat{\varepsilon}, T)$ work in a way such that the permittivity profile is a continuous and differentiable function of x that connects the permittivity at the center of each section, as shown in FIG. 27B. The permittivity profile may be used to determine a device efficiency as described above.

Figure 28:
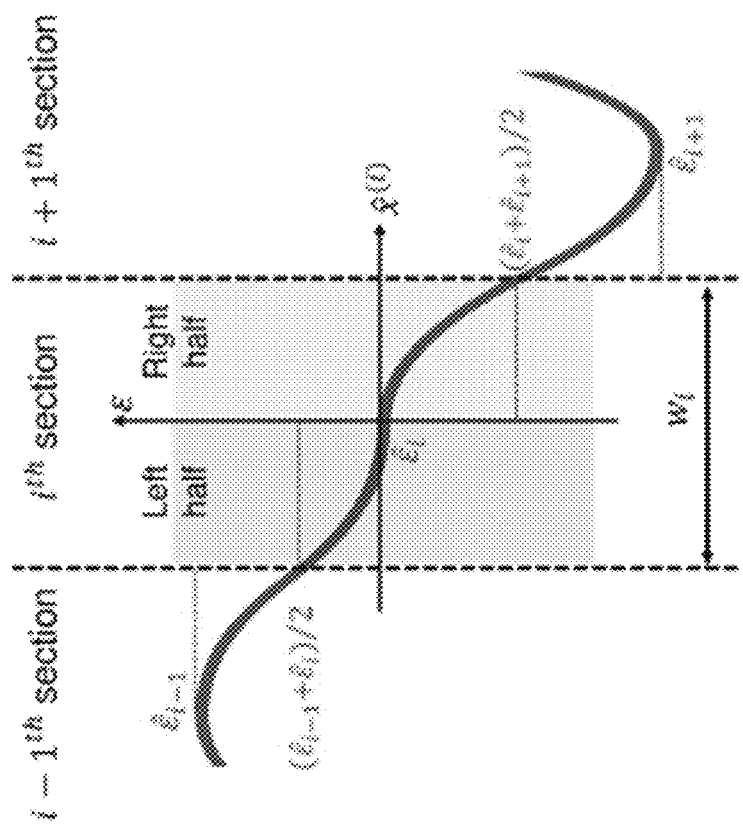
FIG. 28 illustrates a piecewise transformation used in variable-topology reparameterized GLOnets.

FIG. 28 illustrates a piecewise transformation used in variable-topology reparameterized GLOnets. The piecewise transformation $\hat{h}$ deals with each section piece $(w_i, \hat{\varepsilon}_i)$ by separately determining the left half and the right half of the permittivity profile of the corresponding section. The left half lies from the interface between the $i-1^{th}$ and the $i^{th}$ section to the center of the $i^{th}$ section, e.g.

$$\tilde{x}^{(i)} \in \left[-\frac{w_i}{2}, 0\right],$$

with its function defined as:

$$\hat{h}(x, w, \hat{\varepsilon}, T) = \hat{\varepsilon}_{i-1} + (\hat{\varepsilon}_i - \hat{\varepsilon}_{i-1}) \cdot \frac{h_+(\tilde{x}^{(i)}, w_i, T) + h_+(0, w_i, T) - 1}{2 \cdot h_+(0, w_i, T) - 1},$$

if $\hat{\varepsilon}_{i-1} \leq \hat{\varepsilon}_i$ $$\hat{h}(x, w, \hat{\varepsilon}, T) = \hat{\varepsilon}_i + (\hat{\varepsilon}_{i-1} - \hat{\varepsilon}_i) \cdot \frac{h_-(\tilde{x}^{(i)}, w_i, T)}{2 \cdot -(0, w_i, T)}, \text{ if } \hat{\varepsilon}_{i-1} > \hat{\varepsilon}_i$$

where $$h_\pm(\tilde{x}^{(i)}, w_i, T) = \frac{1}{\exp\left(\pm \frac{(\tilde{x}^{(i)})^2 - \left(\frac{w_i}{2}\right)^2}{T} \cdot \left(\frac{L}{w_i M}\right)^2\right) + 1}$$

The right half is defined in a similar way on $\tilde{x}^{(i)} \in$ $$\left[0, \frac{w_i}{2}\right],$$

from the center location to the interface between the $i^{th}$ and the i+1th section:

$$\hat{h}(x, w, \hat{\varepsilon}, T) = \hat{\varepsilon}_i + (\hat{\varepsilon}_{i+1} - \hat{\varepsilon}_i) \cdot \frac{h_-(\tilde{x}^{(i)}, w_i, T)}{2 \cdot h_-(0, w_i, T)}, \text{ if } \hat{\varepsilon}_{i-1} \leq \hat{\varepsilon}_i \quad (i)$$

$$\hat{h}(x, w, \hat{\varepsilon}, T) = \hat{\varepsilon}_i + (\hat{\varepsilon}_i - \hat{\varepsilon}_{i+1}) \cdot \frac{h_+(\tilde{x}^{(i)}, w_i, T) + h_+(0, w_i, T) - 1}{2 \cdot h_+(0, w_i, T) - 1},$$

if $\hat{\varepsilon}_{i-1} > \hat{\varepsilon}_i$

Thus, a continuous and differentiable mapping function $\hat{h}$ is defined to transform from the piecewise vectors $(w, \hat{\varepsilon})$ to the device's permittivity profile $\varepsilon$, such that the gradient can be backpropagated during the optimization process. In some embodiments, a gradient based on the width vector $(w_i)$ and the center permittivity vector $(\hat{\varepsilon}_i)$ may be solved for. A process such as gradient descent may be used to optimize each of these vectors in order to optimize the device. In some embodiments, these width and permittivity may be solved for simultaneously. In some embodiments, the optimum width of the elements may be solved for followed by the optimum permittivity or vice versa.

Figure 29:
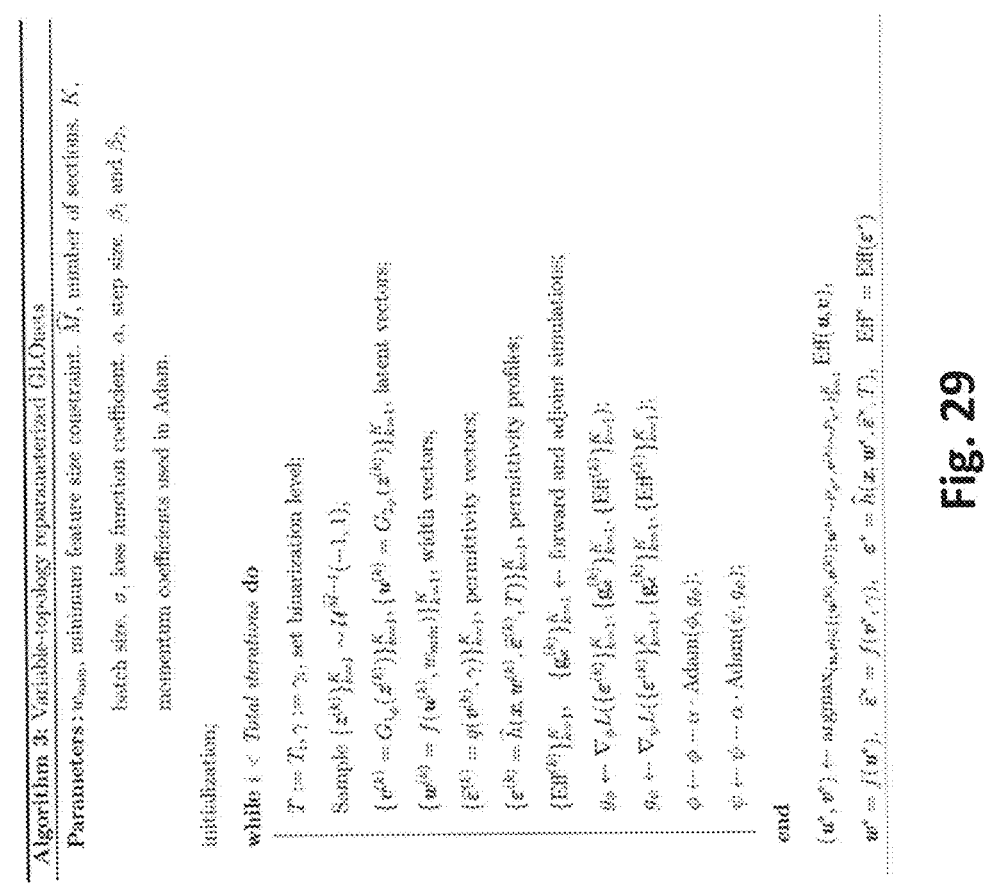

FIG. 29 illustrates an example algorithm for newly configured GLOnets where physical devices in this form are generated using two separate generative networks, one for section widths and the other for refractive indices being optimized. The widths w may be produced the same way as with fixed-topology reparameterized GLOnets, where latent vectors u generated from $G_{1_\phi}(z)$ are reparametrized to w with MFS constraints. The permittivity vector $\hat{\varepsilon} \in \mathbb{R}^{\hat{M}}$, which determines the permittivity at the center of each section, results from latent vectors $v \in \mathbb{R}^{\hat{M}}$ generated from $G_{2_\psi}(z)$, followed by the transformation $\hat{\varepsilon}=q(v,\gamma)$:

$$\hat{\varepsilon}_i = \text{sigmoid}(\gamma v_i) = \frac{e^{\gamma v_i}}{e^{\gamma v_i} + 1}, i = 1, \ldots, \hat{M} \quad (9)$$

$\gamma$ is a tunable hyperparameter that controls the binarization of the permittivity vector $\hat{\varepsilon}$ and is analogous to the hyperparameter T used to control the binarization of the device widths. As with T, $\gamma$ is initially set to produce grayscale refractive index values and is manually increased in a gradual manner so that the final device possesses binary refractive index values of silicon or air. $\hat{M}$ specifies the total number of sections and sets the upper limit in the topological complexity of generated devices. For example, if $\hat{M}=10$, physical devices with up to five nanoridges can be generated. In some embodiments, the physical device may include less than $$\frac{\hat{M}}{2}$$

nanoridges. For example, it $\hat{M}=10$, the physical device may have 4 nanoridges.

Figure 27C:
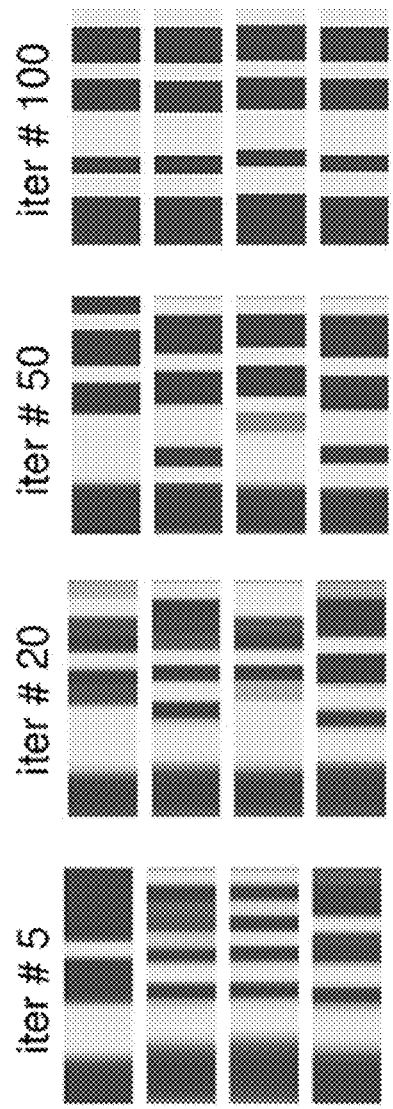
FIG. 27C illustrates various device layouts over the course of GLOnets training for a representative optimization run.

The ability for variable-topology reparameterized GLOnets to search across different device topologies is demonstrated for metagratings with the same operating parameters specified in FIGS. 7A and 10. FIG. 27C illustrates various device layouts over the course of GLOnets training for a representative optimization run. The devices are initially grayscale with varying topology and they converge to a narrow distribution of binary devices. The network is trained using a total of 100 iterations with a batch size of 100, and device layouts at different stages of optimization are shown in FIG. 27C. Near the beginning of the optimization at iteration no. 5, GLOnets generate a wide range of random devices with different topologies. As the training process evolves, the device distribution gradually converges to a narrow range of topologies, and by iteration no. 50, $G_{2_\psi}(z)$ has collapsed onto a single device topology. GLOnets subsequently focus only on boundary optimization to refine the four-ridge device layout. At the end of training, the generated devices are clustered around the same global optimum as that achieved with Algorithm 2 of FIG. 9 for M=8.

Figure 27D:
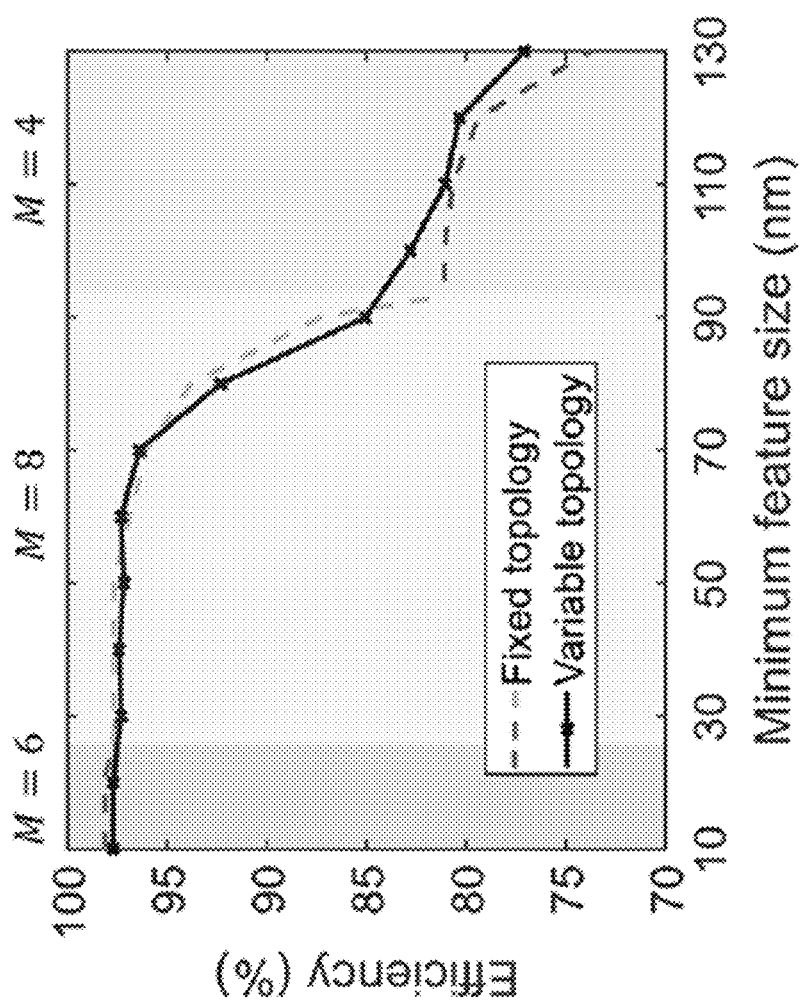
FIG. 27D illustrates a plot of device efficiencies as a function of the minimum feature size (MFS) constraint, designed using fixed-topology and variable-topology reparameterized GLOnets.

FIG. 27D illustrates a plot of device efficiencies as a function of the minimum feature size (MFS) constraint, designed using fixed-topology and variable-topology reparameterized GLOnets. To perform a more systematic benchmark analysis of the variable-topology reparameterized GLOnets, metagratings with parameters matching those in FIG. 12B were designed for a wide range of MFS constraints. The parameters match those in FIG. 7A. The results are plotted in FIG. 27D together with the efficiencies of the best overall devices from FIG. 12B, and they show that variable-topology reparameterized GLOnets are able to search for the correct device topology for a given MFS constraint. Furthermore, the best variable-topology devices (solid black line) largely follow the performance of the best fixed-topology devices (dashed color lines), indicating that this new variant of GLOnets can effectively perform reparameterized boundary optimization.

Variable-topology reparameterized GLOnets were benchmarked with two other methods. The first is local adjoint based optimization, where 200 unconstrained topology optimization iterations are first performed to produce binary devices from random grayscale devices, followed by 50 boundary optimization iterations to refine the binary device layouts and incorporate MFS constraints. The second is the original GLOnets, where a Gaussian filter is used at the network output in an attempt to impose a MFS constraint. The device designs are benchmarked by two criteria, deflection efficiency and the MFS in the physical device.

Figure 27E:
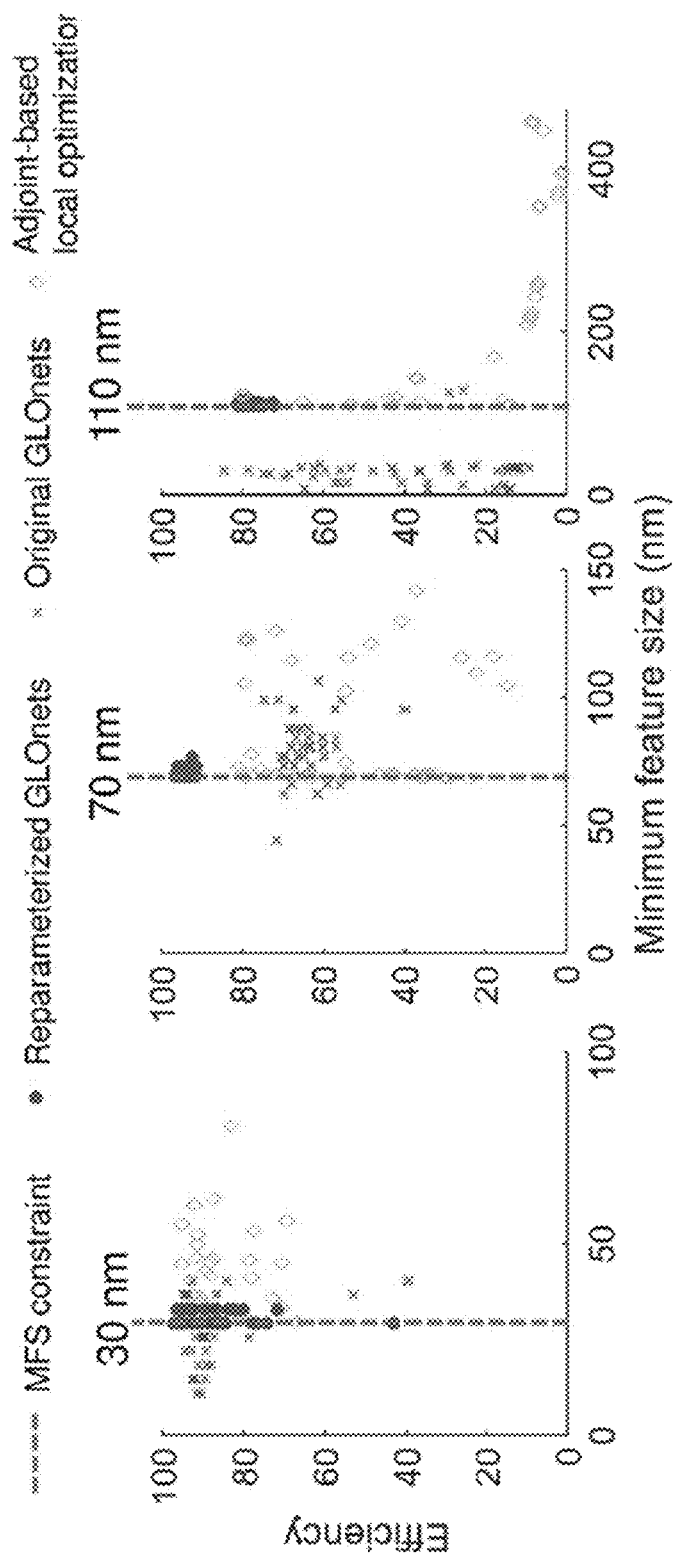
FIG. 27E illustrates scatter plots of device efficiency and MFS for devices designed using variable-topology reparameterized GLOnets, original GLOnets, and adjoint-based local optimization, for three different MFS constraints.

FIG. 27E illustrates scatter plots of device efficiency and MFS for devices designed using variable-topology reparameterized GLOnets, original GLOnets, and adjoint-based local optimization, for three different MFS constraints. The scatter plots illustrate the efficiencies and MFSs of devices designed using the three aforementioned techniques, for three MFS constraints. Variable-topology reparameterized GLOnets generate devices that are clustered around high efficiency values and that strictly satisfy the MFS constraint. The original GLOnets are also able to find clusters of devices with high deflection efficiency. However, these devices do not consistently satisfy the hard MFS constraints because the Gaussian filter is a soft constraint. The combination of local topology and boundary optimization may be able to produce devices that strictly satisfy the MFS constraint, but may not guarantee high performance. For small MFS constraints, the efficiencies of the best locally optimized devices are comparable with those of the best reparameterized GLOnets devices, as the globally optimal unconstrained and constrained devices are in similar design space regions. As such, enough instances of unconstrained local topology optimization may produce some devices near the globally optimal constrained device. However, for large MFS constraints, the local optimization approach may have difficulty in reliably finding the global optimum. The reason is because the topology of devices with large MFS constraints can be very different from the unconstrained devices (see FIG. 12B), so that performing unconstrained topology optimization followed by local boundary optimization may not be effective.

Embodiments Including all Binary Devices

In the version of reparameterization discussed above in connection with FIGS. 3-5, the pattern obtained from the latent vector may gradually binarize over the iterative optimization process depending on the hyperparameter T which controls the degree of binarization (see Equation 4). In this manner, only the device from the very last step (where T=1) after completion of the optimization process may be completely binary, while devices from all the intermediate steps are represented in grayscale. This gradual tuning of the grayscale level can post several challenges to the inverse design process: 1) the hyperparameter T may benefit from being tuned in a judicious manner such that it is neither too fast nor too slow to guarantee a stable and smooth transition between grayscale and binary structures. 2) Since all the intermediate devices are not binary, only the device from the very last step may be used based on the design constraints on material choices due to fabrication concerns (for example, in the case when the device is constrained between air and silicon).

Figure 30:
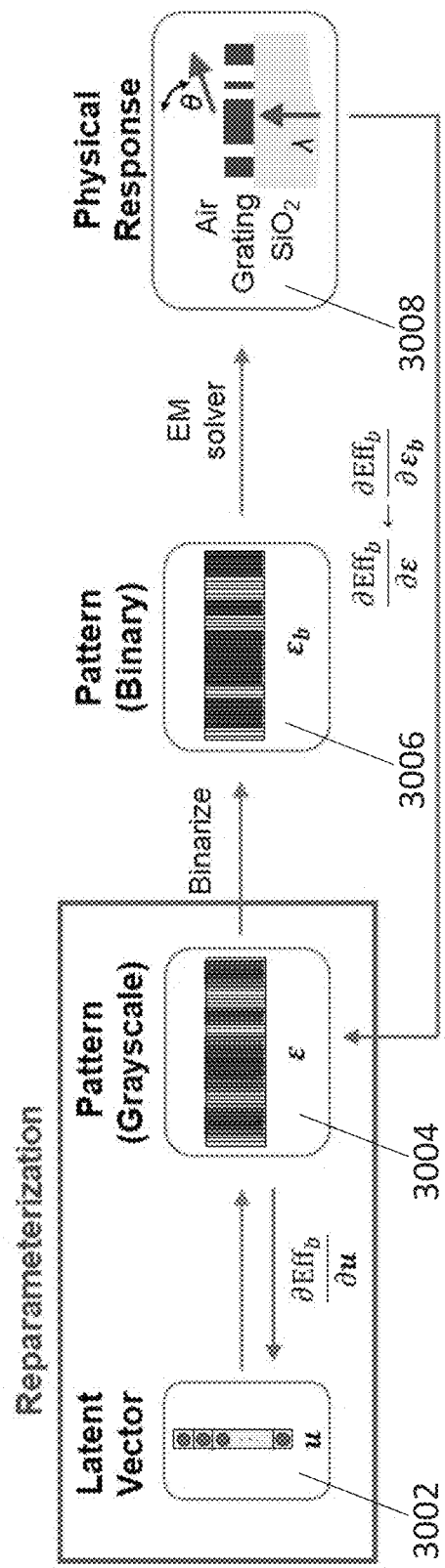
FIG. 30 illustrates a schematic for an optimization process including a binarization step in accordance with an embodiment of the invention.

In some embodiment, the binary devices may be obtained and evaluated at each step during the iterative optimization. Unlike the reparameterization process described in connection with FIGS. 3-5 where the grayscale pattern is used to directly solve for the efficiency (Eff) and efficiency-permittivity gradient $$\left(\frac{\partial Eff}{\partial \varepsilon}\right),$$

the grayscale pattern may be binarized. FIG. 30 illustrates an example process including a binarization step in accordance with an embodiment of the invention. Similar to the reparameterization process of FIGS. 3-5, first a set of latent variables 3002 is reparametrized into a grayscale pattern (ε) 3004. The grayscale pattern (ε) 3004 may be binarized into a binary pattern ($\varepsilon_b$) 3006 by thresholding the dielectric constant. Then, an efficiency ($Eff_b$) 3008 of the binary pattern and gradient $$\left(\frac{\partial Eff_b}{\partial \varepsilon_b}\right)$$

of the binary pattern may be simulated with an EM solver. Lastly, the gradient evaluated using the binary device may be directly applied onto the grayscale pattern to update the grayscale pattern, and eventually backpropagate onto the latent vector. The gradient may be used to optimize the latent vector through processes such as gradient descent. In some embodiments, the gradient on the binary device $$\left(\frac{\partial Eff_b}{\partial \varepsilon_b}\right)$$

may be directly applied to the grayscale device because the grayscale device is close enough to the binary device under a small T. In this manner, the EM simulation at each step may be performed for the binary device. The hyperparameter T can be set as a constant value throughout the optimization as long as the binary device is similar enough to its corresponding grayscale version.

Figure 31:
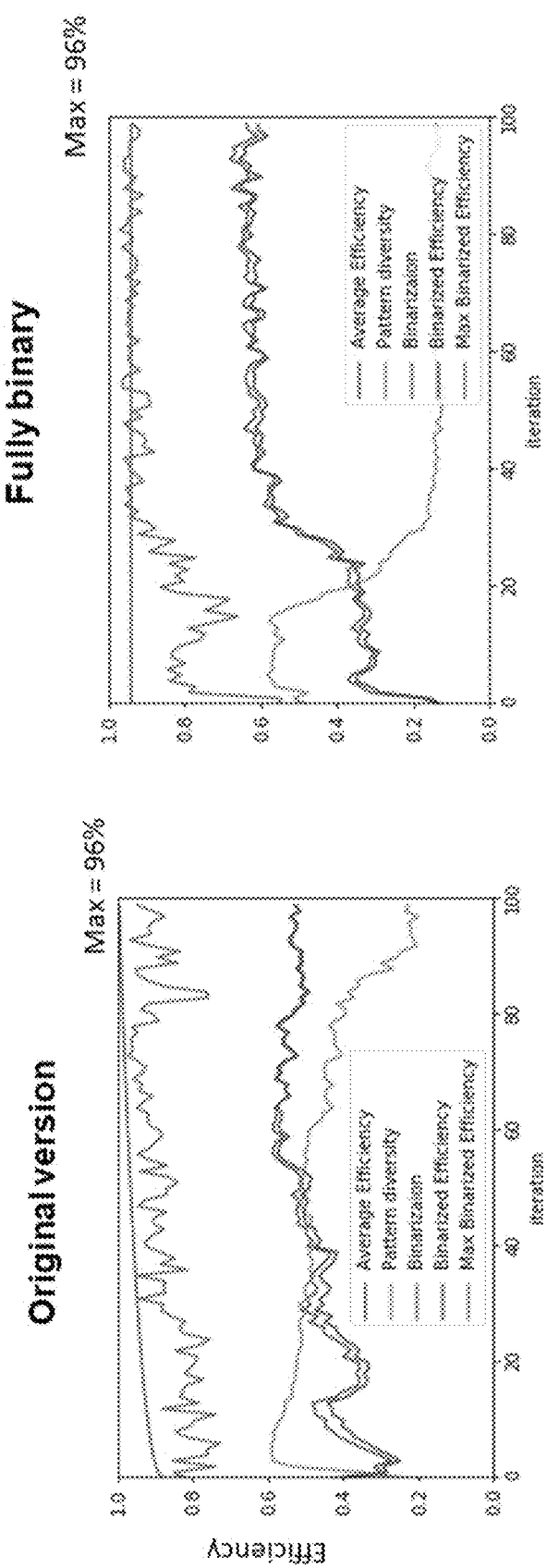
FIGS. 31A and 31B illustrate a comparison between the reparameterization processes described in connection with FIGS. 3-5 and the reparameterization process described in connection with FIG. 30.

FIGS. 31A and 31B illustrate a comparison between the reparameterization process described in connection with FIGS. 3-5 and the reparameterization process utilizing all binary devices of FIG. 30. Here a 65 degree silicon metagrating that works at 850 nm wavelength with a minimum feature size constraint of 30 nm was optimized using GLOnets. FIG. 31A illustrates results from the reparameterization process described in connection with FIGS. 3-5 whereas FIG. 31B illustrates results from the reparameterization process including the binarization step described in connection with FIG. 30. These methods were able to obtain a similar performing output device efficiency of 96% after a similar number of iterations. Unlike the original version where T gradually decreases, the fully binary version has a constant T, which can be seen from the flat binarization (green) curve on the right panel. In this example, the binarization hyperparameter was set at 0.95. Moreover, since devices from each iteration are all binary, the optimization routine may be paused at any step with a fully binary device obtained at any step, for example as earlier as the 50 iteration step where the best device curve (purple) becomes relatively flat, the iteration may be paused.

Example Network System

Figure 32:
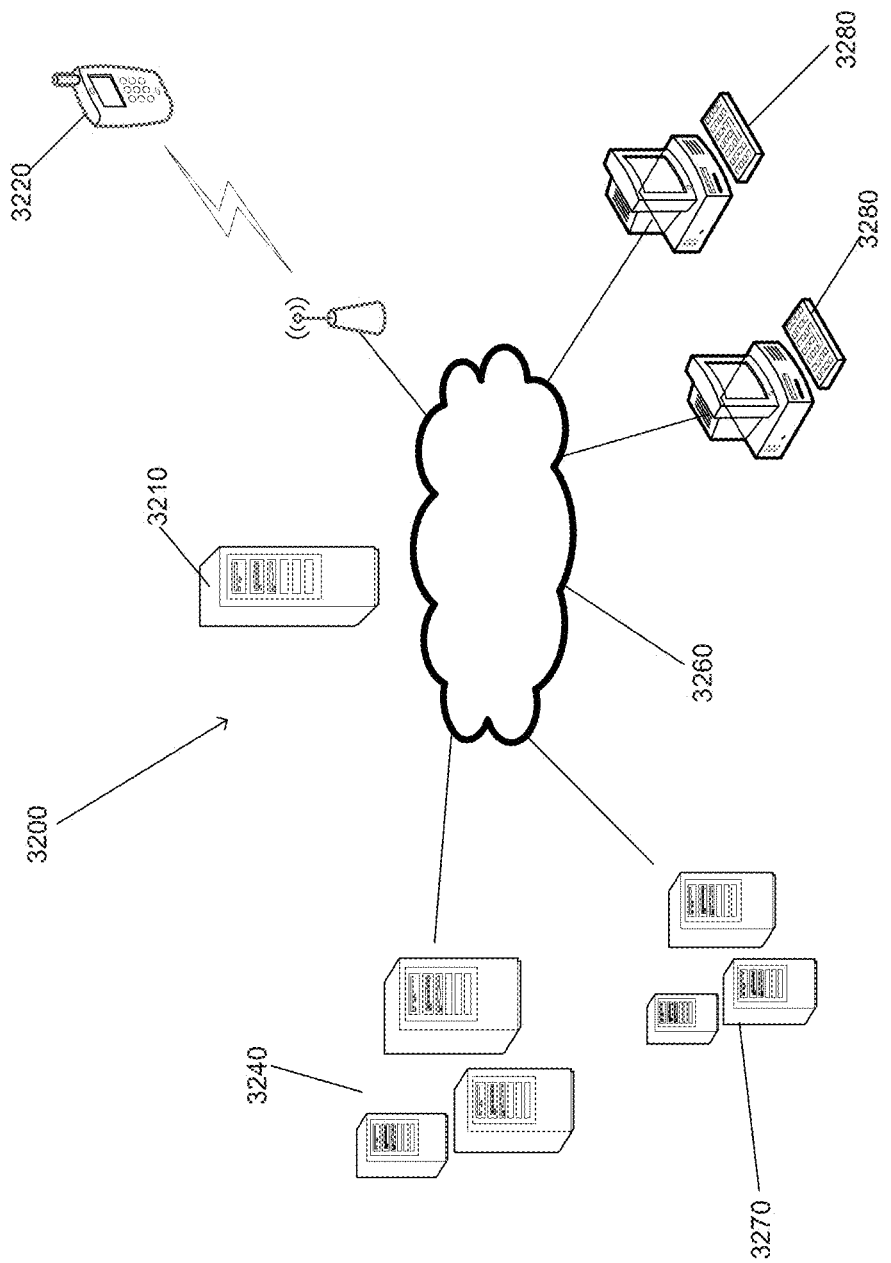
FIG. 32 illustrates an example of optimization system that optimizes photonic devices while enforcing fabrication constraints in accordance with an embodiment of the invention.

FIG. 32 illustrates an example of optimization system that optimizes photonic devices while enforcing fabrication constraints in accordance with an embodiment of the invention. Network 3200 includes a communications network 3260. The communications network 3260 is a network such as the Internet that allows devices connected to the network 3260 to communicate with other connected devices. Server systems 3210, 3240, and 3270 are connected to the network 3260. Each of the server systems 3210, 3240, and 3270 is a group of one or more servers communicatively connected to one another via internal networks that execute processes that provide cloud services to users over the network 3260. One skilled in the art will recognize that the optimization system may exclude certain components and/or include other components that are omitted for brevity without departing from this invention.

For purposes of this discussion, cloud services are one or more applications that are executed by one or more server systems to provide data and/or executable applications to devices over a network. The server systems 3210, 3240, and 3270 are shown each having three servers in the internal network. However, the server systems 3210, 3240 and 3270 may include any number of servers and any additional number of server systems may be connected to the network 3260 to provide cloud services. In accordance with various embodiments of this invention, the optimization system that uses systems and methods that optimizes photonic devices while enforcing fabrication constraints in accordance with an embodiment of the invention may be provided by a process being executed on a single server system and/or a group of server systems communicating over network 3260.

Users may use personal devices 3280 and 3220 that connect to the network 3260 to perform processes that optimizes photonic devices while enforcing fabrication constraints in accordance with various embodiments of the invention. In the shown embodiment, the personal devices 3280 are shown as desktop computers that are connected via a conventional "wired" connection to the network 3260. However, the personal device 3280 may be a desktop computer, a laptop computer, a smart television, an entertainment gaming console, or any other device that connects to the network 3260 via a "wired" connection. The mobile device 3220 connects to network 3260 using a wireless connection. A wireless connection is a connection that uses Radio Frequency (RF) signals, Infrared signals, or any other form of wireless signaling to connect to the network 3260. In the example of this figure, the mobile device 3220 is a mobile telephone. However, mobile device 3220 may be a mobile phone, Personal Digital Assistant (PDA), a tablet, a smartphone, or any other type of device that connects to network 3260 via wireless connection without departing from this invention.

As can readily be appreciated the specific computing system used to optimizes photonic devices while enforcing fabrication constraints is largely dependent upon the requirements of a given application and should not be considered as limited to any specific computing system(s) implementation.

Example Optimizer

Figure 33:
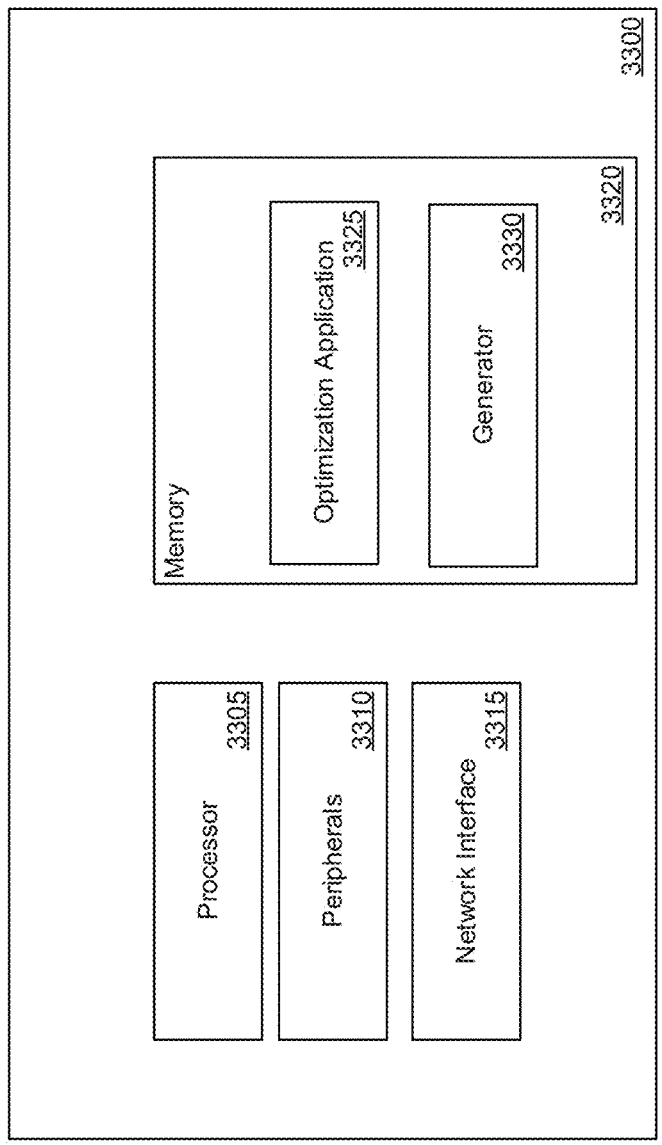
FIG. 33 illustrates an example of an optimizer element that executes instructions to perform processes that optimizes photonic devices while enforcing fabrication constraints in accordance with an embodiment of the invention.

FIG. 33 illustrates an example of an optimizer element that executes instructions to perform processes that optimizes photonic devices while enforcing fabrication constraints in accordance with an embodiment of the invention. Optimizer elements in accordance with many embodiments of the invention can include (but are not limited to) one or more of mobile devices, cameras, and/or computers. Optimizer element 3300 includes processor 3305, peripherals 3310, network interface 3315, and memory 3320. One skilled in the art will recognize that the optimizer element may exclude certain components and/or include other components that are omitted for brevity without departing from this invention.

The processor 3305 can include (but is not limited to) a processor, microprocessor, controller, or a combination of processors, microprocessor, and/or controllers that performs instructions stored in the memory 3320 to manipulate data stored in the memory. Processor instructions can configure the processor 3305 to perform processes in accordance with certain embodiments of the invention.

Peripherals 3310 can include any of a variety of components for capturing data, such as (but not limited to) cameras, displays, and/or sensors. In a variety of embodiments, peripherals can be used to gather inputs and/or provide outputs. The optimizer element 3300 can utilize network interface 3315 to transmit and receive data over a network based upon the instructions performed by processor 3305. Peripherals and/or network interfaces in accordance with many embodiments of the invention can be used to gather inputs that can be used to optimize photonic devices while enforcing fabrication constraints.

Memory 3320 includes an optimization application 3325 and generator 3330. The optimization application 3325 and the generator 3330 in accordance with several embodiments of the invention can be used to optimize photonic devices while enforcing fabrication constraints.

The optimization application 3325 and generator 3330 may be used to perform the methods described above and the methods described below in FIG. 33. For example, the optimization application 3325 may receive a set of unconstrained latent variables; map the set of unconstrained latent variables to a constrained space to generate a constrained device; calculate the permittivity across each element of the constrained device; determine a permittivity-constrained width gradient based at least partially on the permittivity across each element; and optimize the set of unconstrained latent variables by at least partially using the permittivity-constrained width gradient.

In some embodiments, mapping the unconstrained space to a constrained space may include reparameterization of the unconstrained latent variables.

In some embodiments, calculating the permittivity across each element of the constrained device may include performing a gray-space relaxation of the set of constrained width space to determine a function of refractive index across each element in the set of constrained width space.

In some embodiments, the optimization application 3325 may further determine an efficiency-constrained width gradient of the constrained device based on the permittivity-constrained width gradient. The efficiency-constrained width gradient is further based on an efficiency-permittivity efficiency gradient.

In some embodiments, the generator 3330 may generate the set of unconstrained latent variables; and the generator 3330 may be iteratively updated at least partially based on the permittivity-constrained width gradient.

In various embodiments, the optimization application 3325 may receive a set of variables including a set of refractive indices including a set of corresponding thicknesses; calculate a reflection gradient with respect to the set of refractive indices and their set of corresponding thicknesses; optimize the set of variables at least partially using the reflection gradient to obtain an optimized device including a set of optimized refractive indices with corresponding optimized thicknesses.

In some embodiments, the optimization application 3325 may further calculate the reflection spectrum of the set of variables, where calculating the reflection gradient comprises calculating a partial differential of the reflection spectrum. Calculating the reflection spectrum may include using a transfer matrix method.

In some embodiments, the generator 3330 may be used to generate the set of variables; the set of variables may be used to calculate a corresponding reflection gradient; and the generator 3330 may be iteratively update at least partially using the reflection gradient.

Although a specific example of element 3300 is illustrated in this figure, any of a variety of optimizer elements can be utilized to perform processes optimize photonic devices while enforcing fabrication constraints similar to those described herein as appropriate to the requirements of specific applications in accordance with embodiments of the invention.

Example Optimization Method

Figure 34:
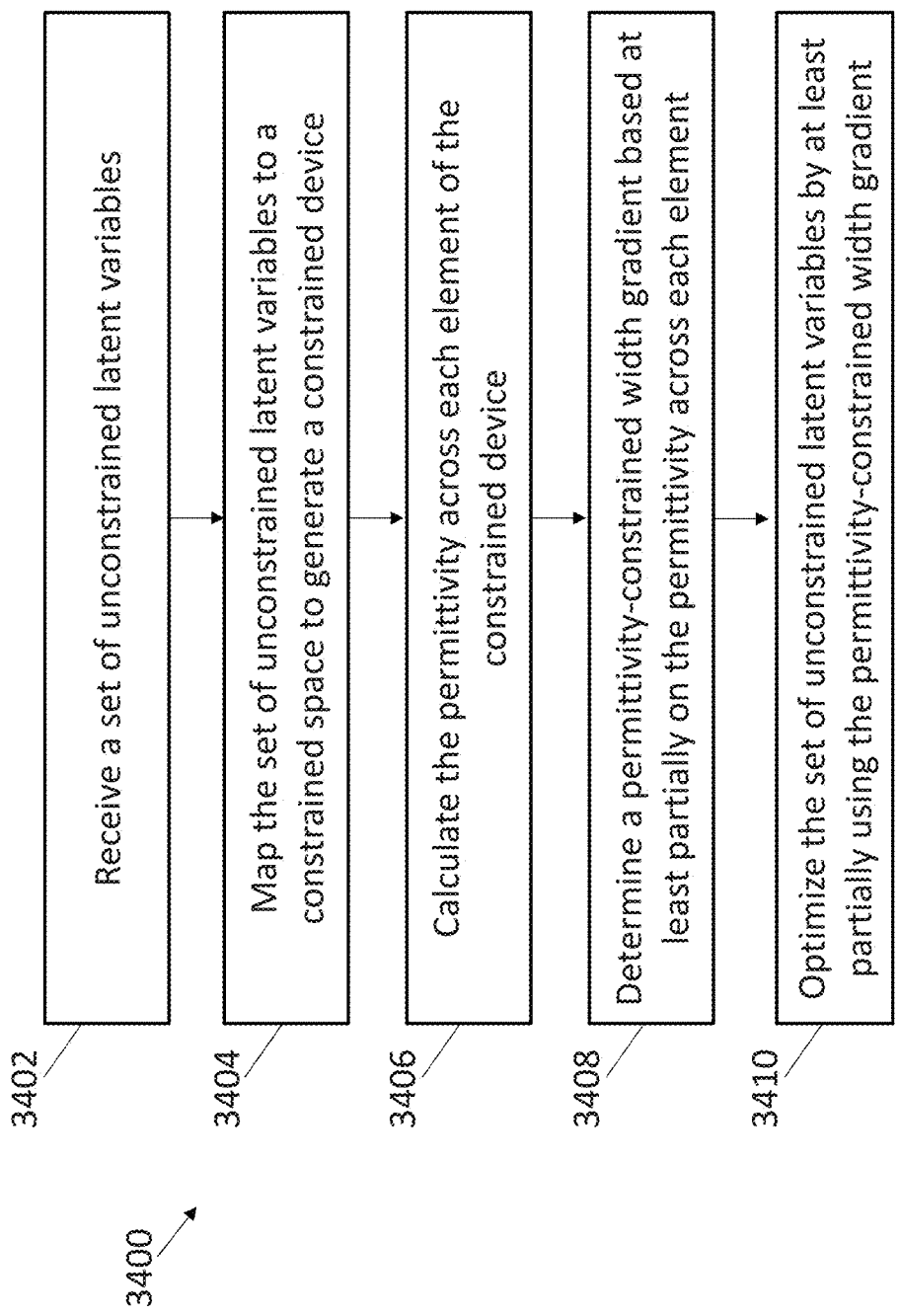
FIG. 34 illustrates an example optimization method in accordance with embodiments of the invention.

FIG. 34 illustrates an example optimization method 3400 in accordance with embodiments of the invention. The optimization method 3400 includes receiving (3402) a set of unconstrained latent variables. A generator may be used to generate the set of unconstrained latent variables. The generator may be updated at least partially based on a permittivity-constrained width gradient. The set of unconstrained latent variables may be initially randomly generated.

The optimization method 3400 may further include mapping (3404) the set of unconstrained latent variables to a constrained space to generate a constrained device. The mapping may include reparameterization of the unconstrained latent variables. the reparameterization of the unconstrained latent variables may include solving for a set of constrained width space $\{w_i\}$ through the following equations:

$$v_i = \text{Sigmoid}(u_i), v_M = 1;$$

$$k_i = v_i\sqrt{1 - \sum_{j=1}^{i-1} k_j^2}, k_1 = v_1; \text{ and}$$

$$w_i = \frac{k_i}{\sum_{j=1}^{M} k_j}(L - Mw_{min}) + w_{min},$$

where the set of unconstrained latent variables are $\{u_i\}$ and wherein $w_{min}$ is a minimum width of each feature of the constrained width space, M is the total number of features, and $\sum_{i=1}^{M} w_i = L$.

The optimization method 3400 may further include calculating (3406) the permittivity across each element of the constrained device. Calculating the permittivity across each element of the constrained device may include performing a gray-space relaxation of the set of constrained width space to determine a function of refractive index across each element in the set of constrained width space. The gray-space relaxation may include solving for:

$$n_i(x) = \left[\exp\left(\pm\frac{x^2 - \left(\frac{w_i}{2}\right)^2}{T}\right) + 1\right]^{-1},$$

where x is the position across the width of a certain element, where x=0 is at the middle of the element, and T controls the binarization of the pattern.

The optimization method 3400 may further include determining (3408) a permittivity-constrained width gradient based at least partially on the permittivity across each element. The optimization method 3400 may further include optimizing (3410) the set of unconstrained latent variables at least partially using the permittivity-constrained width gradient. The permittivity-constrained width gradient may be at least partially used to calculate the efficiency-constrained width gradient.

In embodiments where a generator is used to generate the set of unconstrained latent variables, the generator may be iteratively updated at least partially based on the permittivity-constrained width gradient. The generator may be used to generate another set of unconstrained latent variables which may be used to update the constrained device.

DOCTRINE OF EQUIVALENTS

While the above description contains many specific embodiments of the invention, these should not be construed as limitations on the scope of the invention, but rather as an example of one embodiment thereof. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method of manufacturing photonic devices, the method comprising:
using a generator to generate a set of unconstrained latent variables;
mapping the set of unconstrained latent variables to a constrained space to generate a constrained photonic device;
calculating the permittivity across each element of the constrained photonic device;
determining a permittivity-constrained variable gradient based at least partially on the permittivity across each element of the constrained photonic device;
iteratively updating the generator at least partially based on the permittivity-constrained variable gradient;
generating using the generator an optimized set of unconstrained latent variables; and
manufacturing the generated constrained photonic device.

2. The method of claim 1, wherein mapping the unconstrained space to a constrained space comprises reparameterization of the unconstrained latent variables.

3. The method of claim 2, wherein the reparameterization of the unconstrained latent variables comprises solving for a set of constrained width space $\{w_i\}$ through the following equations:

$$v_i = \text{Sigmoid}(u_i), v_M = 1;$$

-continued $$k_i = v_i\sqrt{1 - \sum_{j=1}^{i-1} k_j^2}, k_1 = v_1; \text{ and}$$

$$w_i = \frac{k_i}{\sum_{j=1}^{M} k_j}(L - Mw_{min}) + w_{min},$$

wherein the set of unconstrained latent variables are $\{u_i\}$ and wherein $w_{min}$ is a minimum width of each feature of the constrained width space, M is the total number of features, and $\Sigma_{i=1}^{M} w_i = L$.

4. The method of claim 3 wherein calculating the permittivity across each element of the constrained device comprises performing a gray-space relaxation of the set of constrained width space to determine a function of refractive index across each element in the set of constrained width space.

5. The method of claim 4, wherein the gray-space relaxation comprises solving for $$n_i(x) = \left[\exp\left(\pm\frac{x^2 - \left(\frac{w_i}{2}\right)^2}{T}\right) + 1\right]^{-1},$$

wherein x is the position across the width of a certain element, where x=0 is at the middle of the element, and T controls the binarization of the pattern.

6. The method of claim 4, further comprising determining an efficiency-constrained variable gradient of the constrained device based on the permittivity-constrained variable gradient.

7. The method of claim 6, wherein the efficiency-constrained variable gradient is further based on an efficiency-permittivity gradient.

8. The method of claim 7, wherein the efficiency-constrained variable gradient is calculated using the following equation:

$$\frac{\partial Eff}{\partial w} = \frac{\partial Eff}{\partial \varepsilon} \times \frac{\partial \varepsilon}{\partial w}$$

where $$\frac{\partial \varepsilon}{\partial w}$$

is permittivity-constrained width gradient and $$\frac{\partial Eff}{\partial \varepsilon}$$

is the efficiency-permittivity gradient.

9. The method of claim 8, wherein an efficiency-latent variable gradient is calculated at least partially using a latent variable gradient of the unconstrained latent variables in relation to constrained device calculated using the following equations:

$$v_i = \text{Sigmoid}(u_i), v_M = 1;$$

$$k_i = v_i\sqrt{1 - \sum_{j=1}^{i-1} k_j^2}, k_1 = v_1; \text{ and}$$

$$w_i = \frac{k_i}{\sum_{j=1}^{M} k_j}(L - Mw_{min}) + w_{min},$$

wherein the set of unconstrained latent variables are $\{u_i\}$ and wherein $w_{min}$ is a minimum width of each feature of the constrained width space, M is the total number of features, and $\Sigma_{i=1}^{M} w_i = L$.

10. The method of claim 9, wherein the efficiency grating in relation to the unconstrained latent variables is calculated at least partially using the following equation:

$$\frac{\partial Eff}{\partial u} = \frac{\partial Eff}{\partial w} \times \frac{\partial w}{\partial u},$$

where $$\frac{\partial w}{\partial u}$$

is the constrained width-latent variables gradient and $$\frac{\partial Eff}{\partial w}$$

is the efficiency-constrained variable gradient.

11. The method of claim 10, wherein the efficiency-permittivity gradient is calculated using an adjoint variable method.

12. The method of claim 11, wherein the adjoint variable method comprises forward and adjoint simulation.

13. The method of claim 1, wherein the set of unconstrained latent variables comprise unconstrained latent widths, and wherein mapping the set of unconstrained latent variables comprises mapping the unconstrained latent widths to the constrained space to generate constrained widths, and the method further comprises:
receiving a set of unconstrained latent permittivities; and
mapping the set of unconstrained latent permittivities to a constrained space to generate constrained average permittivities of the constrained device,
wherein calculating the permittivity profile across each element of the constrained device is further based on the constrained widths and the constrained average permittivities of the constrained device.

14. The method of claim 13, further comprising:
determining a permittivity-constrained average permittivity gradient of the constrained device, and
optimizing the set of unconstrained latent permittivities at least partially based on the permittivity-constrained average permittivity gradient of the constrained device.

15. The method of claim 1, further comprising binarizing the permittivity across each element of the constrained device, wherein determining a permittivity-constrained variable gradient is based on the binarized permittivity across each element.

16. A method for manufacturing photonic devices, the method comprising:
- using a generator to generate a set of variables including a set of refractive indices and a set of thicknesses, wherein each of the refractive indices of the set of refractive indices corresponds to a thickness of the set of thicknesses;
- calculating a reflection gradient with respect to the set of refractive indices and the set of thicknesses;
- optimizing the set of variables at least partially using the reflection gradient to obtain an optimized device including a set of optimized refractive indices with corresponding optimized thicknesses;
- iteratively updating the generator at least partially using the reflection gradient; and
- manufacturing the optimized device including the set of optimized refractive indices with corresponding optimized thicknesses.

17. The method of claim 16, further comprising calculating the reflection spectrum of the set of variables, wherein calculating the reflection gradient comprises calculating a partial differential of the reflection spectrum.

18. The method of claim 17, wherein calculating the reflection spectrum comprises using a transfer matrix method.

* * * * *